United States Patent
Takeshita

(10) Patent No.: US 11,314,412 B2
(45) Date of Patent: Apr. 26, 2022

(54) MEMORY SYSTEM INCLUDING A NONVOLATILE MEMORY AND CONTROL METHOD

(71) Applicant: Kioxia Corporation, Tokyo (JP)

(72) Inventor: Masahiro Takeshita, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/120,536

(22) Filed: Dec. 14, 2020

(65) Prior Publication Data
US 2022/0066640 A1 Mar. 3, 2022

(30) Foreign Application Priority Data

Sep. 2, 2020 (JP) .............................. JP2020-147619

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,003,161 B2* | 4/2015 | Hatfield | ................ G06F 12/145 |
| | | | 711/206 |
| 2012/0011329 A1 | 1/2012 | Nonaka | |
| 2017/0351462 A1 | 12/2017 | Fan et al. | |
| 2019/0081930 A1* | 3/2019 | Hunt, IV | ................ H04L 63/06 |
| 2019/0324677 A1 | 10/2019 | Oe | |
| 2020/0026687 A1 | 1/2020 | Dayan et al. | |

FOREIGN PATENT DOCUMENTS

JP 2019-191886 A 10/2019

* cited by examiner

*Primary Examiner* — Jane Wei
(74) *Attorney, Agent, or Firm* — Oblon, McClelland, Maier & Neustadt, L.L.P.

(57) ABSTRACT

According to one embodiment, a memory system includes a memory system includes a first nonvolatile memory and a controller. The controller controls the first nonvolatile memory. The second memory system includes a second nonvolatile memory. The controller manages information indicative of correspondences between private logical addresses and public logical addresses. The private logical addresses include first private logical addresses and second private logical addresses. Each of the first private logical addresses specifies a location in a first logical address space corresponding to the first nonvolatile memory. Each of the second private logical addresses specifies a location in a second logical address space corresponding to the second nonvolatile memory.

20 Claims, 41 Drawing Sheets

```
=====Discovery Log Entry 0======
subnqn:nqn.2014-08.con.example:nvme:nvm-subsystem-sn-abcde
traddr:192.168.1.2

=====Discovery Log Entry 1======
subnqn:nqn.2014-08.com.example:nvme:nvm-subsystem-sn-fghij
traddr:192.168.1.3
```

FIG. 2

| Private logical address | Physical address |
|---|---|
| ****0000h | X |
| ****0010h | Y |
| ****0020h | Z |
| ⋮ | ⋮ |

FIG. 4

| Public logical address | Drive identification information and private logical address | empty flag | Number of accesses |
|---|---|---|---|
| **0000h | First SSD:**0000h | 0 | 5 |
| **0010h | First SSD:**0010h | 0 | 3 |
| **0020h | First SSD:**0020h | 0 | 1 |
| **0030h | First SSD:**0030h | 0 | 4 |
| **0040h | First SSD:**0040h | 0 | 5 |
| **0050h | First SSD:**0050h | 0 | 3 |
| **0060h | First SSD:**0060h | 0 | 1 |
| **0070h | First SSD:**0070h | 1 | 0 |
| ⋮ | ⋮ | ⋮ | ⋮ |
| **XX00h | Second SSD:**0000h | 1 | 0 |
| **XX10h | Second SSD:**0010h | 1 | 0 |
| **XX20h | Second SSD:**0020h | 1 | 0 |
| **XX30h | Second SSD:**0030h | 1 | 0 |
| **XX40h | Second SSD:**0040h | 1 | 0 |
| **XX50h | Second SSD:**0050h | 1 | 0 |
| **XX60h | Second SSD:**0060h | 1 | 0 |
| **XX70h | Second SSD:**0070h | 1 | 0 |
| ⋮ | ⋮ | ⋮ | ⋮ |

FIG. 5

| Private logical address | Data |
|---|---|
| ****0000h | data0 |
| ****0010h | data1 |
| ****0020h | data2 |
| ****0030h | data3 |
| ****0040h | data4 |
| ****0050h | data5 |
| ****0060h | data6 |
| ****0070h | empty |
| ⋮ | ⋮ |

F I G. 6A

| Private logical address | Data |
|---|---|
| ****0000h | empty |
| ****0010h | empty |
| ****0020h | empty |
| ****0030h | empty |
| ****0040h | empty |
| ****0050h | empty |
| ****0060h | empty |
| ****0070h | empty |
| ⋮ | ⋮ |

Logical address conversion table

| Public logical address | Drive identification information and private logical address | empty flag | Number of accesses |
|---|---|---|---|
| ****0000h | First SSD: ****0000h | 0 | 5 |
| ****0010h | First SSD: ****0010h | 0 | 3 |
| ****0020h | First SSD: ****0020h | 0 | 2 |
| ****0030h | First SSD: ****0030h | 0 | 4 |
| ****0040h | First SSD: ****0040h | 0 | 5 |
| ****0050h | First SSD: ****0050h | 0 | 3 |
| ****0060h | First SSD: ****0060h | 0 | 1 |
| ****0070h | First SSD: ****0070h | 1 | 0 |
| ... | ... | ... | ... |
| ****XX00h | Second SSD: ****0000h | 1 | 0 |
| ****XX10h | Second SSD: ****0010h | 0 | 3 |
| ****XX20h | Second SSD: ****0020h | 1 | 0 |
| ****XX30h | Second SSD: ****0030h | 1 | 0 |
| ****XX40h | Second SSD: ****0040h | 1 | 0 |
| ****XX50h | Second SSD: ****0050h | 0 | 5 |
| ****XX60h | Second SSD: ****0060h | 1 | 0 |
| ****XX70h | Second SSD: ****0070h | 1 | 0 |
| ... | ... | ... | ... |

(3) Write data11 to private logical address ****0020h
(4) Update logical address conversion table

First SSD

| Private logical address | Data |
|---|---|
| ****0000h | data0 |
| ****0010h | data1 |
| ****0020h | data11 |
| ****0030h | data3 |
| ****0040h | data4 |
| ****0050h | data5 |
| ****0060h | data6 |
| ****0070h | empty |
| ... | ... |

Second SSD

| Private logical address | Data |
|---|---|
| ****0000h | empty |
| ****0010h | data9 |
| ****0020h | empty |
| ****0030h | empty |
| ****0040h | empty |
| ****0050h | data10 |
| ****0060h | empty |
| ****0070h | empty |
| ... | ... |

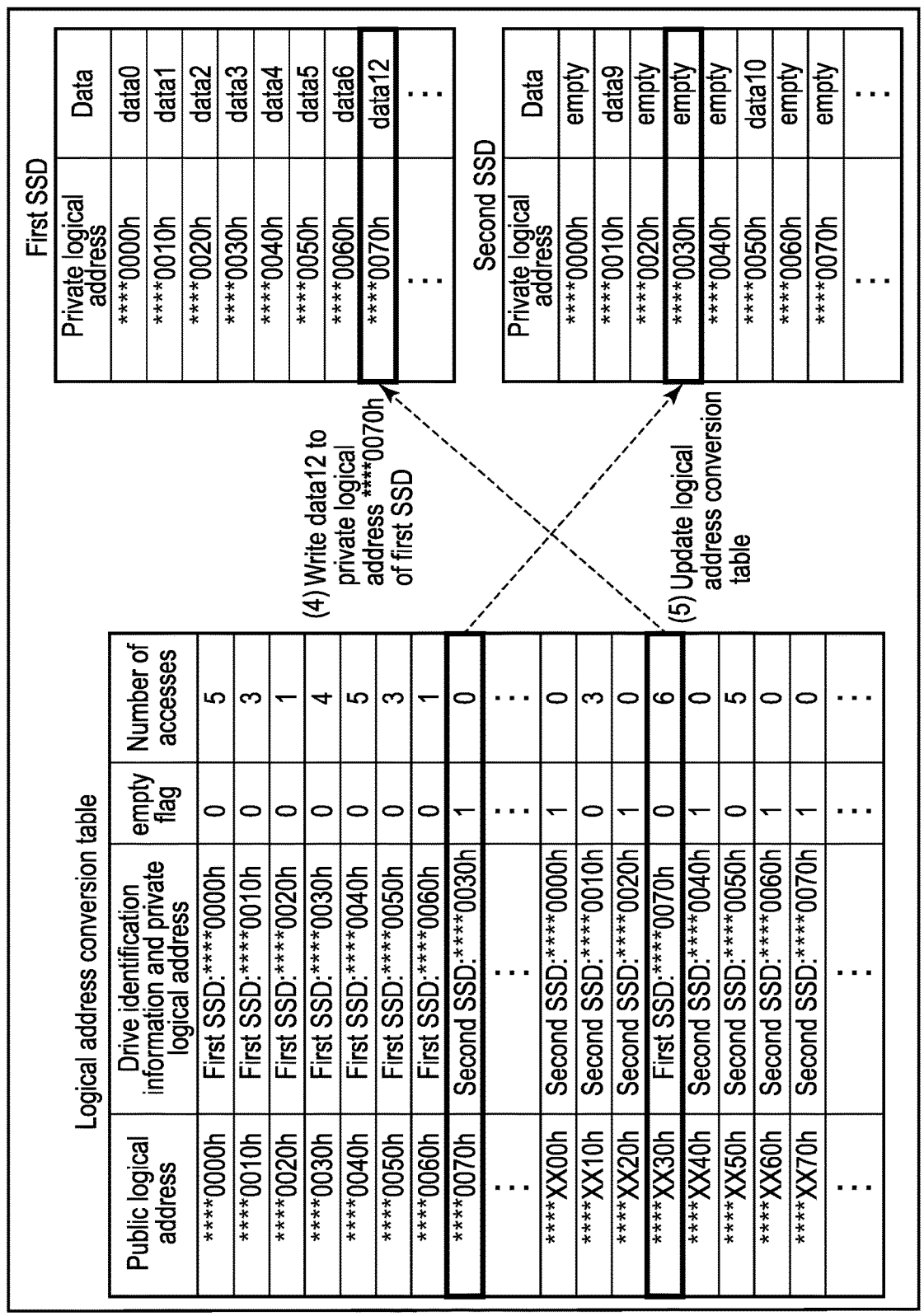
F I G. 12

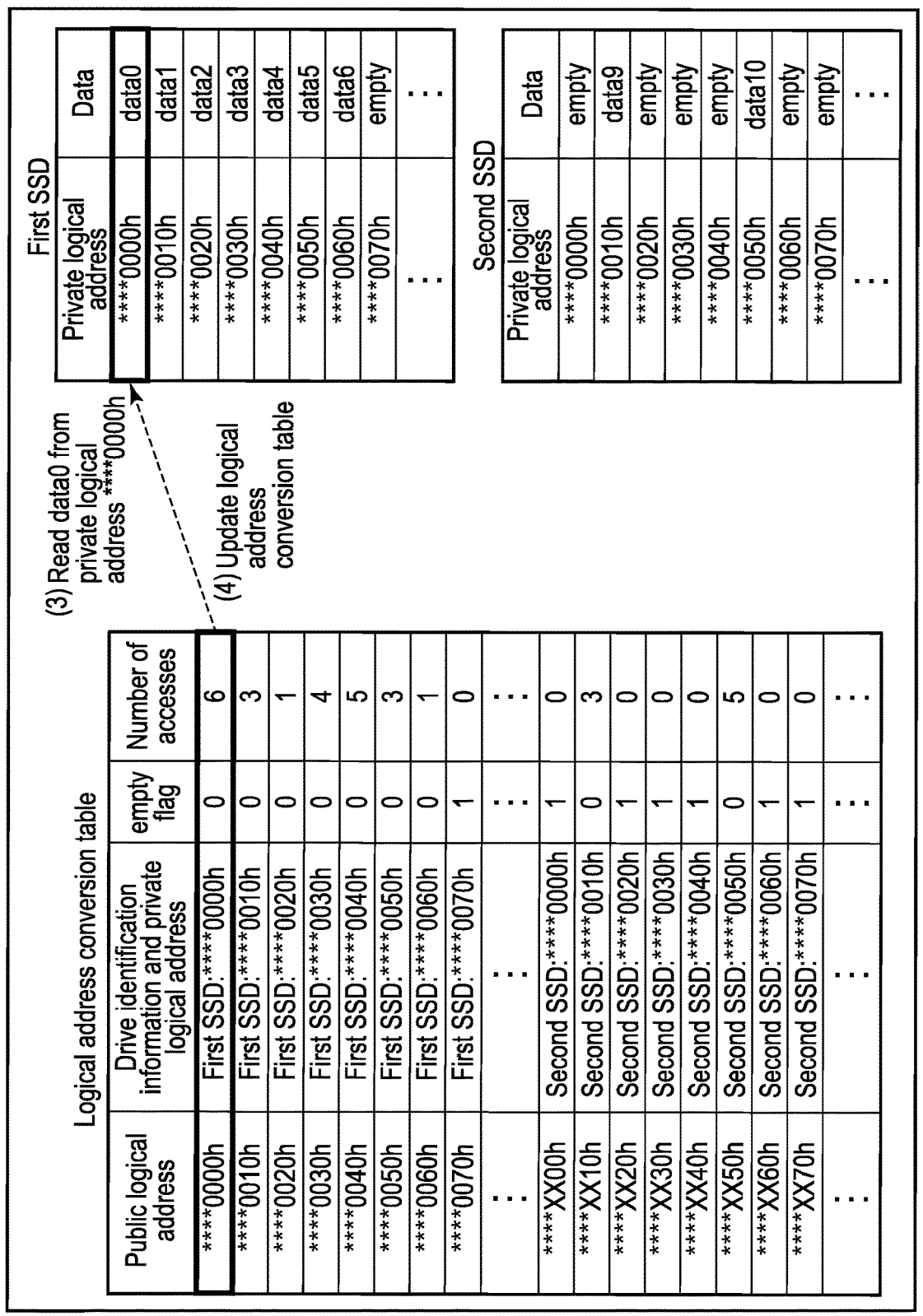
F I G. 14

(1) Receive read command to request reading of data from public logical address ****XX10h Logical address conversion table

| Public logical address | Drive identification information and private logical address | empty flag | Number of accesses |
|---|---|---|---|
| **0000h | First SSD:**0000h | 0 | 5 |
| **0010h | First SSD:**0010h | 0 | 3 |
| **0020h | First SSD:**0020h | 0 | 1 |
| **0030h | First SSD:**0030h | 0 | 4 |
| **0040h | First SSD:**0040h | 0 | 5 |
| **0050h | First SSD:**0050h | 0 | 3 |
| **0060h | First SSD:**0060h | 0 | 1 |
| **0070h | First SSD:**0070h | 1 | 0 |
| ... | ... | ... | ... |
| **XX00h | Second SSD:**0000h | 1 | 0 |
| **XX10h | Second SSD:**0010h | 0 | 3 |
| **XX20h | Second SSD:**0020h | 1 | 0 |
| **XX30h | Second SSD:**0030h | 1 | 0 |
| **XX40h | Second SSD:**0040h | 1 | 0 |
| **XX50h | Second SSD:**0050h | 0 | 5 |
| **XX60h | Second SSD:**0060h | 1 | 0 |
| **XX70h | Second SSD:**0070h | 1 | 0 |
| ... | ... | ... | ... |

First SSD

| Private logical address | Data |
|---|---|
| ****0000h | data0 |
| ****0010h | data1 |
| ****0020h | data2 |
| ****0030h | data3 |
| ****0040h | data4 |
| ****0050h | data5 |
| ****0060h | data6 |
| ****0070h | empty |
| ... | ... |

Second SSD

| Private logical address | Data |
|---|---|
| ****0000h | empty |
| ****0010h | data9 |
| ****0020h | empty |
| ****0030h | empty |
| ****0040h | empty |
| ****0050h | data10 |
| ****0060h | empty |
| ****0070h | empty |
| ... | ... |

(2) Specify corresponding private logical address

F I G. 15

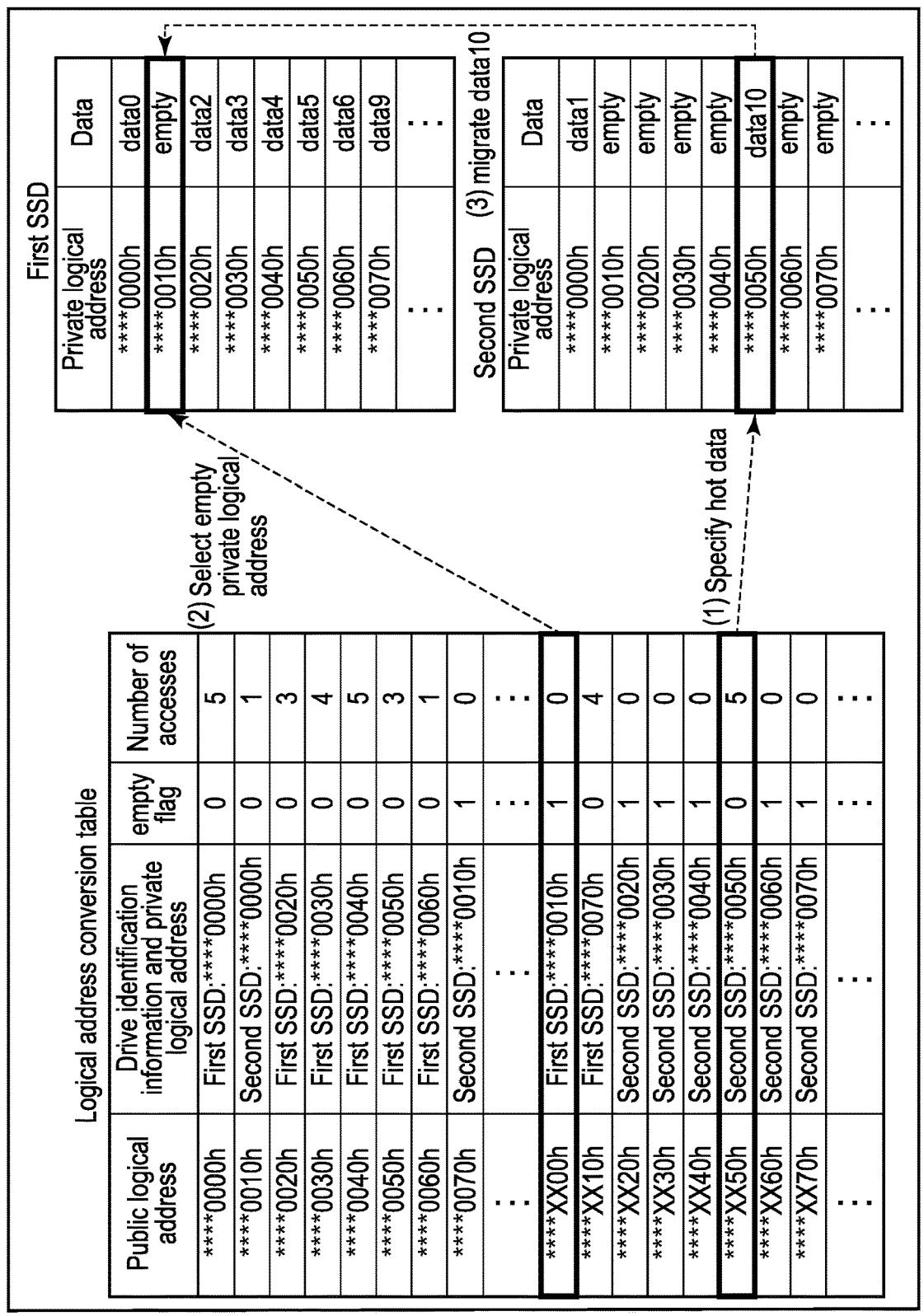
F I G. 21

Logical address conversion table

| Public logical address | Drive identification information and private logical address | empty flag | Number of accesses |
|---|---|---|---|
| **0000h | First SSD:**0000h | 0 | 15 |
| **0010h | Second SSD:**0000h | 0 | 1 |
| **0020h | First SSD:**0020h | 0 | 33 |
| **0030h | First SSD:**0030h | 0 | 24 |
| **0040h | Second SSD:**0020h | 0 | 1 |
| **0050h | Second SSD:**0070h | 0 | 1 |
| **0060h | Second SSD:**0040h | 0 | 2 |
| **0070h | Second SSD:**0010h | 0 | 1 |
| ... | ... | ... | ... |
| **XX00h | Second SSD:**0050h | 0 | 1 |
| **XX10h | First SSD:**0070h | 0 | 24 |
| **XX20h | First SSD:**0040h | 0 | 32 |
| **XX30h | Second SSD:**0030h | 0 | 1 |
| **XX40h | First SSD:**0060h | 0 | 41 |
| **XX50h | First SSD:**0010h | 0 | 35 |
| **XX60h | Second SSD:**0060h | 0 | 1 |
| **XX70h | First SSD:**0050h | 0 | 31 |
| ... | ... | ... | ... |

Only cold data is stored in second SSD

First SSD

| Private logical address | Data |
|---|---|
| ****0000h | data0 |
| ****0010h | data10 |
| ****0020h | data2 |
| ****0030h | data3 |
| ****0040h | data13 |
| ****0050h | data20 |
| ****0060h | data21 |
| ****0070h | data9 |
| ... | ... |

Second SSD

| Private logical address | Data |
|---|---|
| ****0000h | data1 |
| ****0010h | data50 |
| ****0020h | data4 |
| ****0030h | data31 |
| ****0040h | data6 |
| ****0050h | data26 |
| ****0060h | data18 |
| ****0070h | data5 |
| ... | ... |

F I G. 23

Logical address conversion table

| Public logical address | Drive identification information and private logical address | empty flag | Number of accesses |
|---|---|---|---|
| **0000h | First SSD:***0000h | 0 | 15 |
| ****0010h | | | |
| **0020h | First SSD:***0020h | 0 | 33 |
| **0030h | First SSD:***0030h | 0 | 24 |
| ****0040h | | | |
| ****0050h | | | |
| ****0060h | | | |
| ****0070h | | | |
| ... | ... | ... | ... |
| ****XX00h | | | |
| **XX10h | First SSD:***0070h | 0 | 24 |
| **XX20h | First SSD:***0040h | 0 | 32 |
| ****XX30h | | | |
| **XX40h | First SSD:***0060h | 0 | 41 |
| **XX50h | First SSD:***0010h | 0 | 35 |
| ****XX60h | | | |
| **XX70h | First SSD:***0050h | 0 | 31 |
| ... | ... | ... | ... |

Only cold data is stored in second SSD

⇒ Delete information of second SSD from logical address conversion table and detach second SSD from network First SSD

| Private logical address | Data |
|---|---|
| ****0000h | data0 |
| ****0010h | data10 |
| ****0020h | data2 |
| ****0030h | data3 |
| ****0040h | data13 |
| ****0050h | data20 |
| ****0060h | data21 |
| ****0070h | data9 |
| ... | ... |

F I G. 24

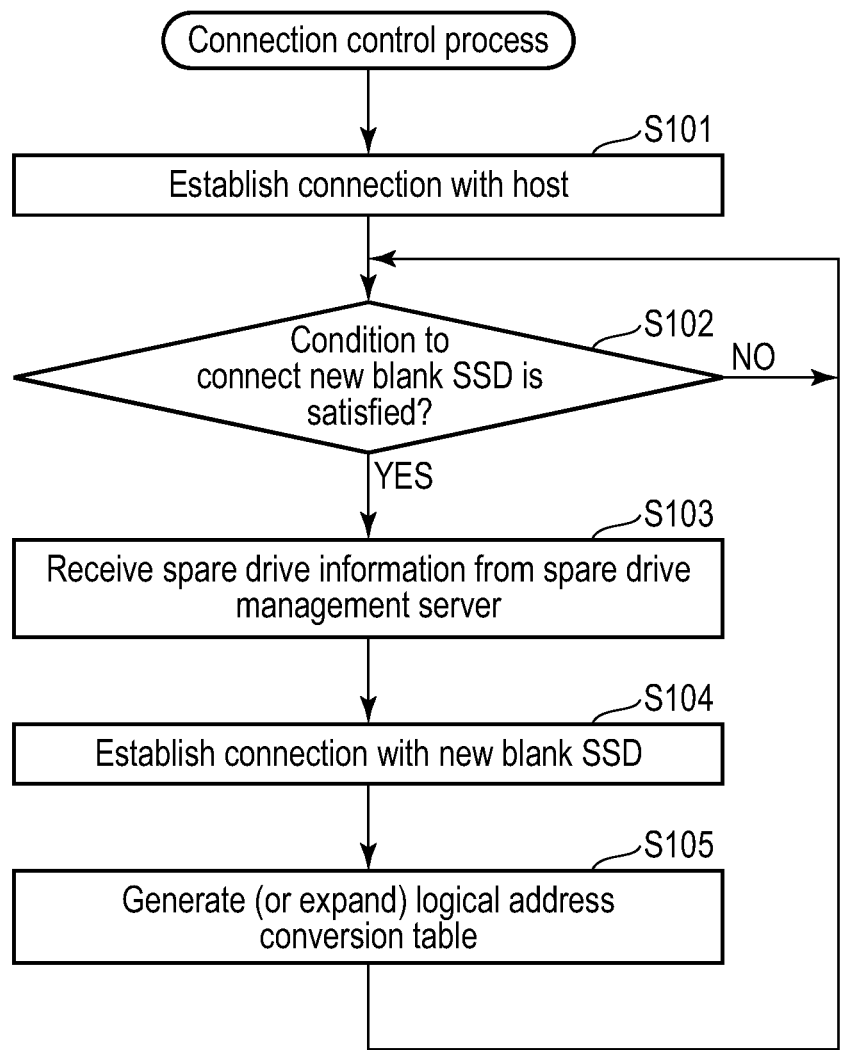
F I G. 25

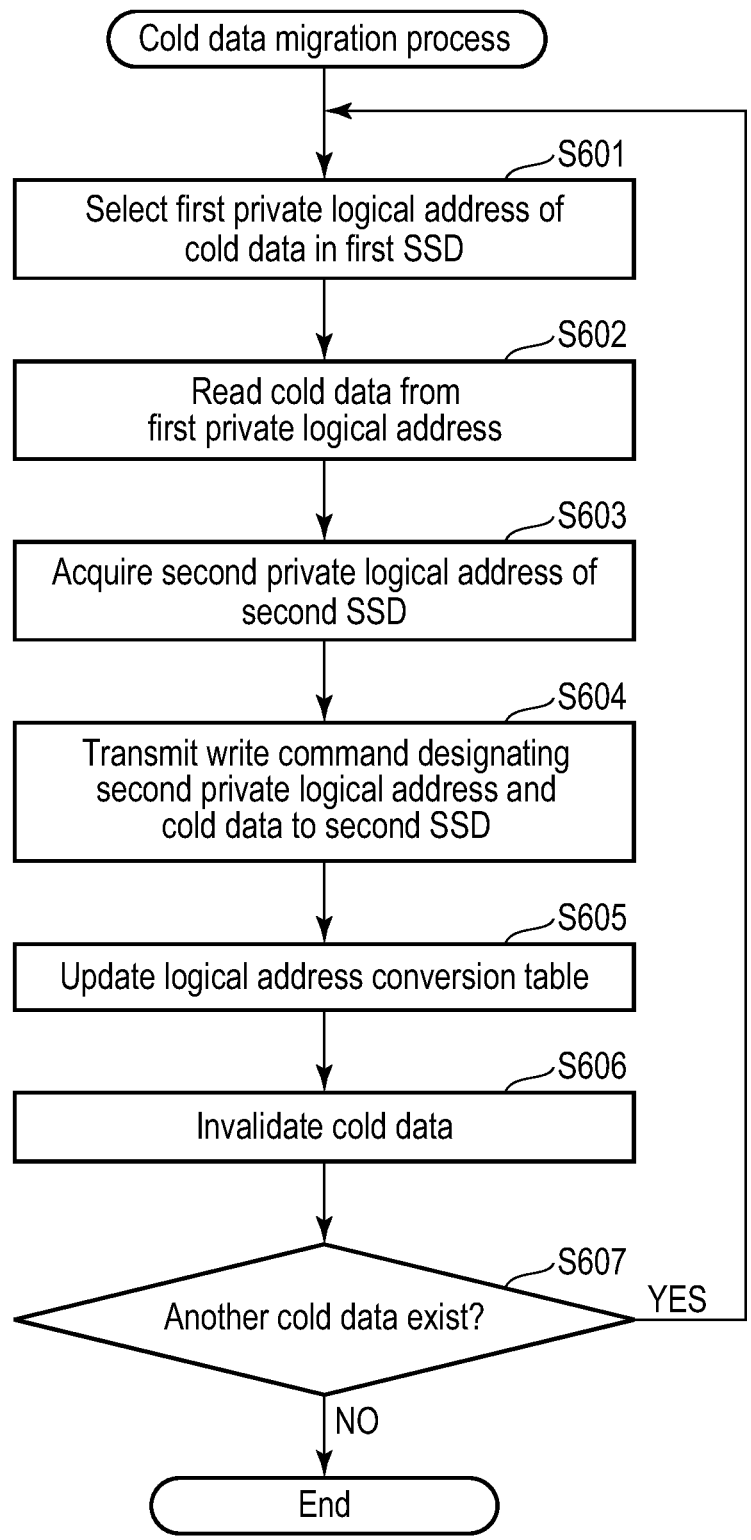
F I G. 30

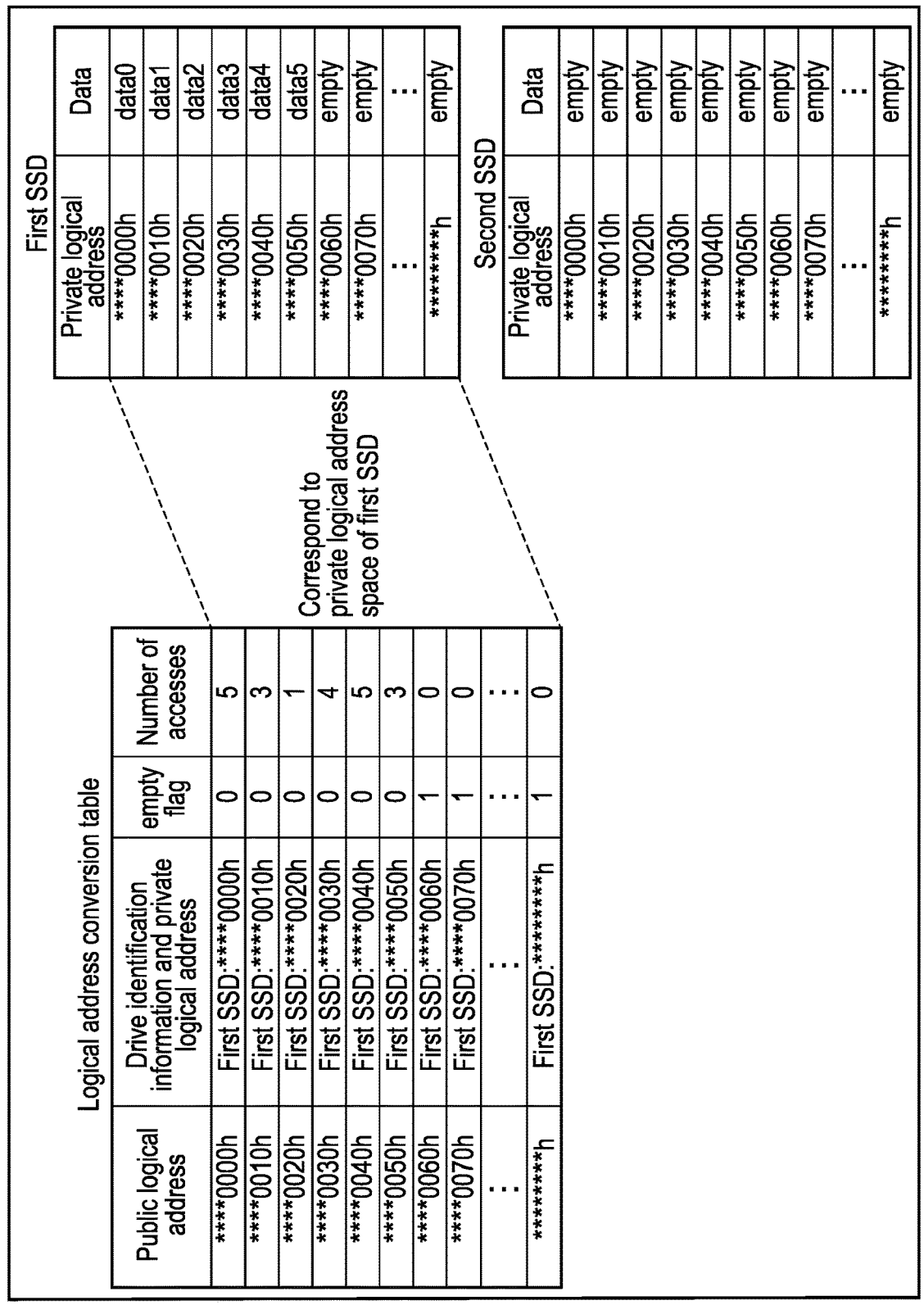
F I G. 32

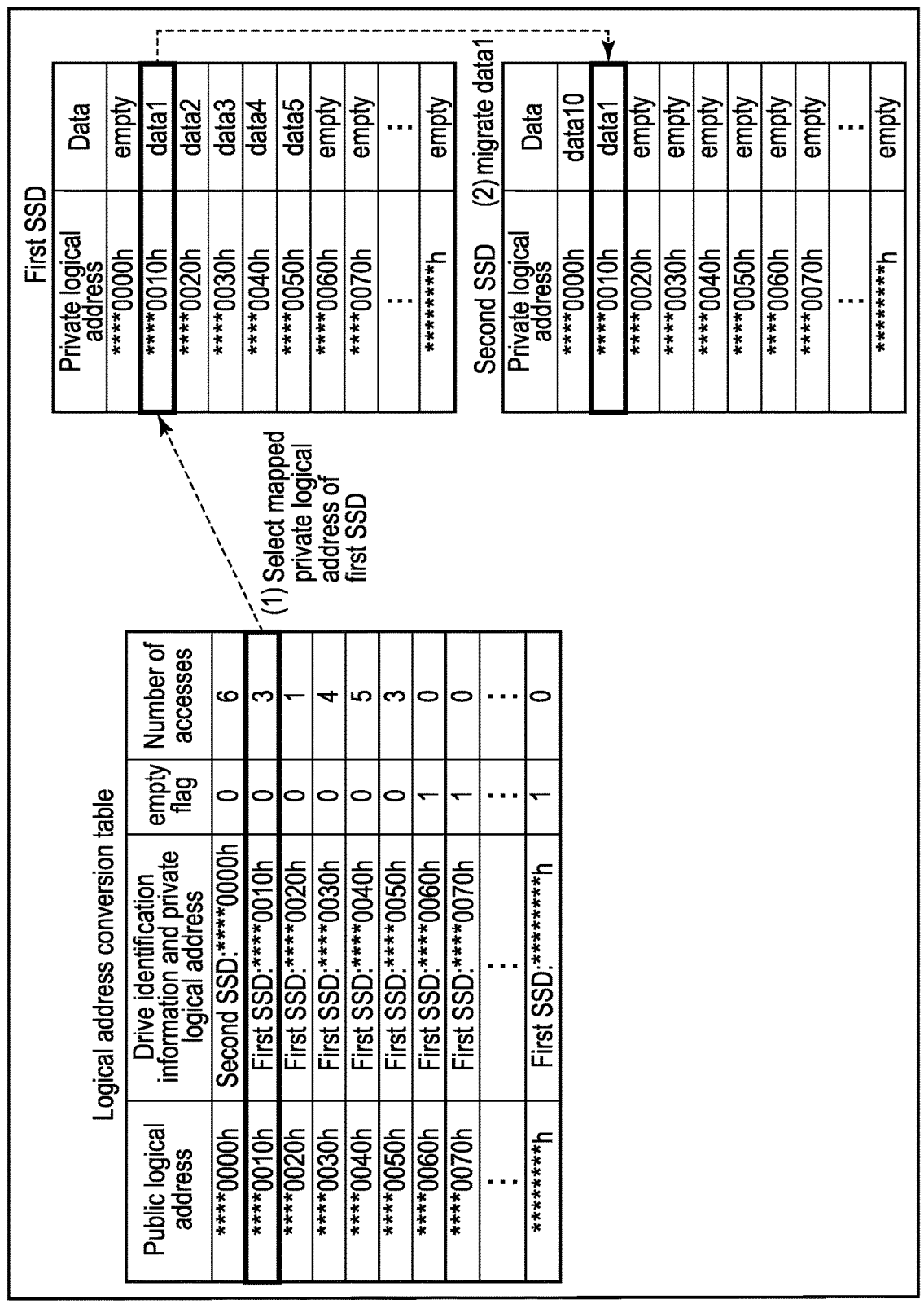
F I G. 35

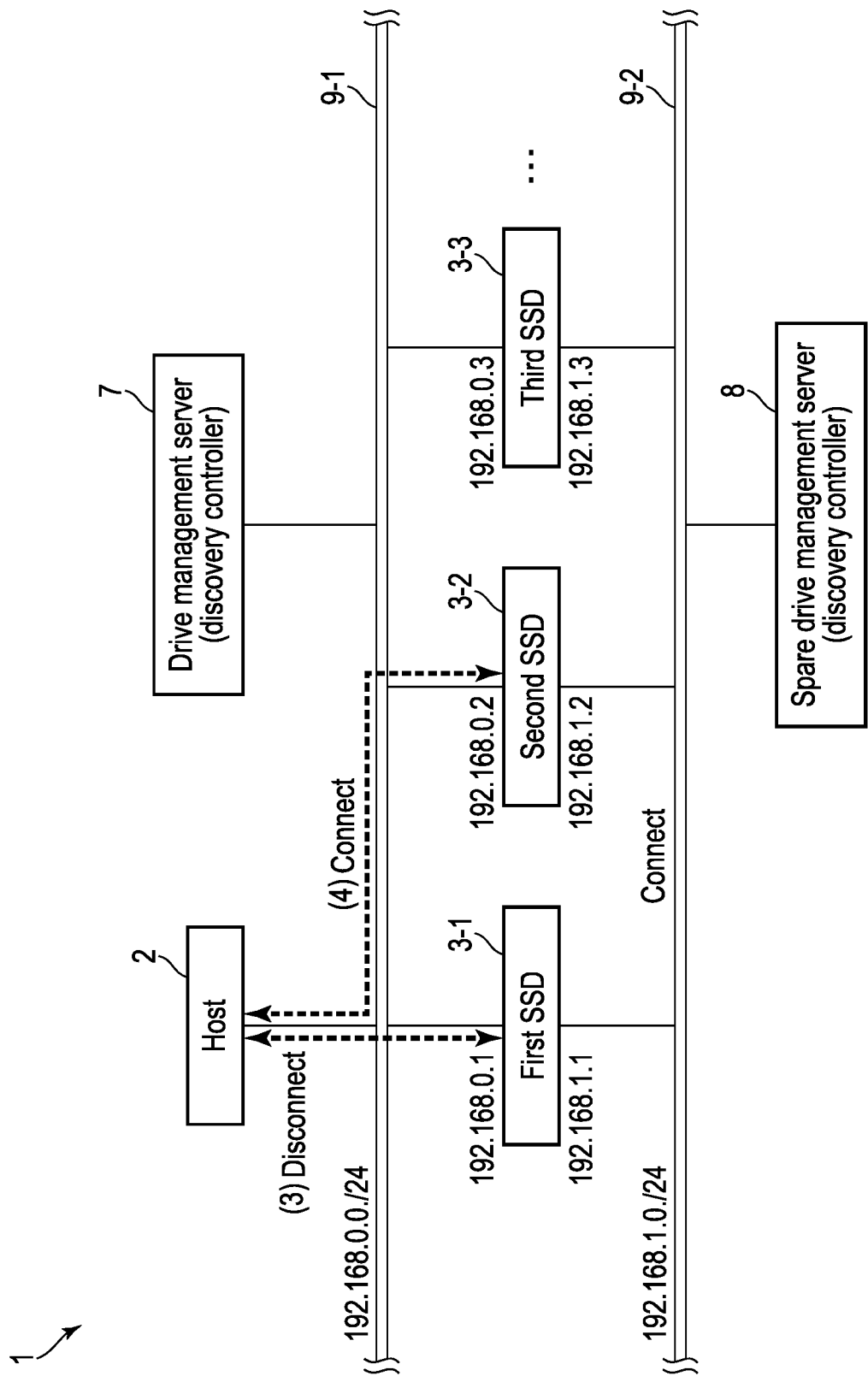
F I G. 39

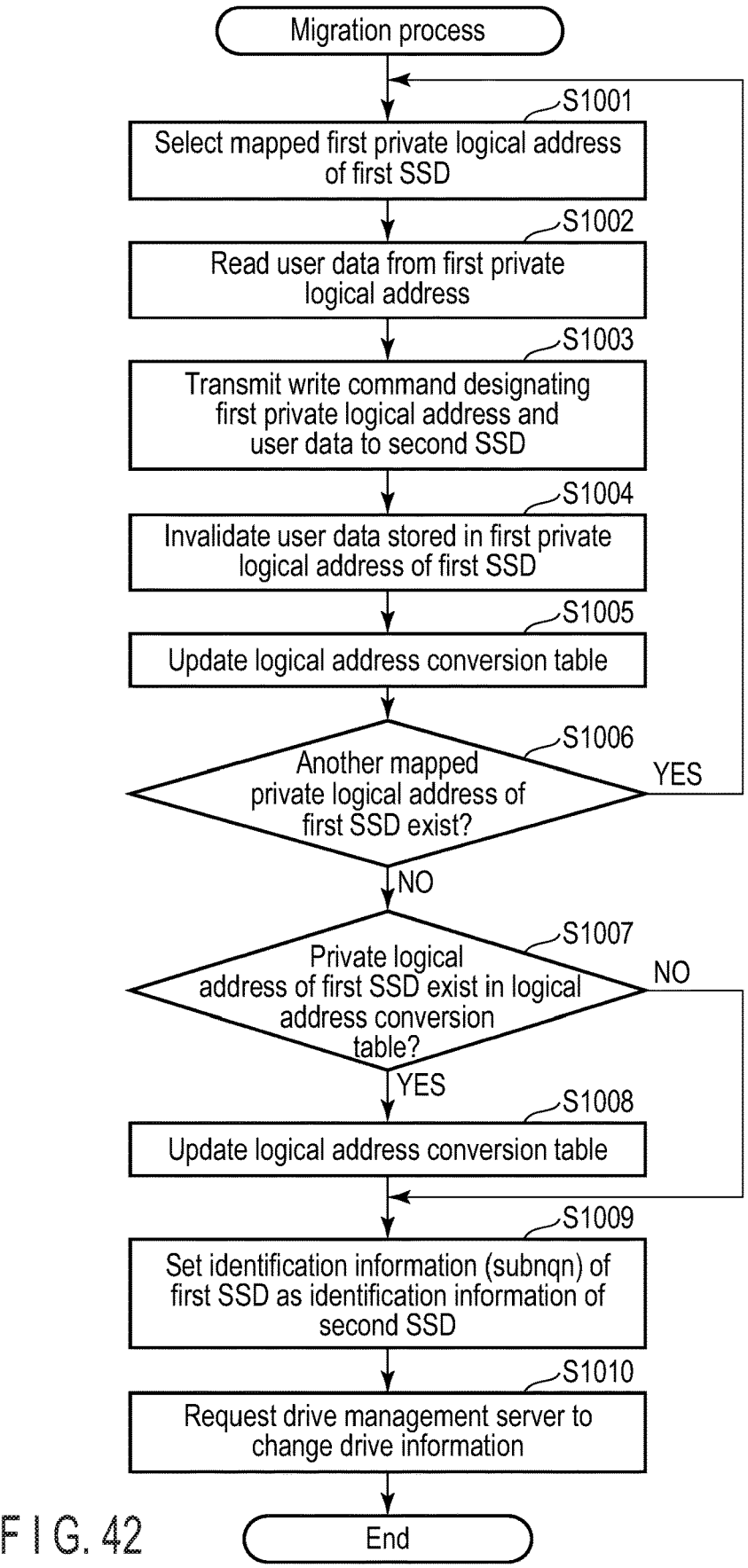
F I G. 42

MEMORY SYSTEM INCLUDING A NONVOLATILE MEMORY AND CONTROL METHOD

CROSS-REFERENCE TO RELATED APPLICATIONS

This application is based upon and claims the benefit of priority from Japanese Patent Application No. 2020-147619, filed Sep. 2, 2020, the entire contents of which are incorporated herein by reference.

FIELD

Embodiments described herein related generally to a memory system including a nonvolatile memory and a control method thereof.

BACKGROUND

In recent years, memory systems including a nonvolatile memory are widely used.

One type of such memory systems is a solid state drive (SSD) including a NAND flash memory. SSDs are used as a main storage of various computing devices.

One of interface standards used for connection between a host and a memory system is NVM Express (NVMe). Currently, there is NVM Express over Fabrics (NVMe-oF) as a standard to transfer NVMe commands via a network such as Ethernet (registered trademark).

When a host accesses multiple memory systems on a network, the host needs to manage, for example, an address space of each memory system. Furthermore, when data is transferred from a memory system to another memory system, a processing device is required on the network to read the data from one memory system and to write the data to the other memory system.

BRIEF DESCRIPTION OF THE DRAWINGS

FIG. 2 is a diagram illustrating an example of spare drive information used in the memory system of the first embodiment.

FIG. 4 is a diagram illustrating a configuration example of a logical-to-physical address conversion table used in the memory system of the first embodiment.

FIG. 5 is a diagram illustrating a configuration example of a logical address conversion table used in the memory system of the first embodiment.

FIG. 6A is a diagram illustrating an example of a storage state of data with respect to private logical addresses in the memory system according to the first embodiment.

FIG. 6B is a diagram illustrating an example of a storage state of data with respect to private logical addresses in another memory system according to the first embodiment.

FIG. 8 is a diagram illustrating an example of an operation subsequent to the operation of FIG. 7.

FIG. 12 is a diagram illustrating an example of an operation subsequent to the operation of FIG. 11.

FIG. 14 is a diagram illustrating an example of an operation subsequent to the operation of FIG. 13.

FIG. 15 is a diagram illustrating another example of an operation in accordance with a read request with respect to the memory system of the first embodiment.

FIG. 21 is a diagram illustrating an operation to migrate hot data from the memory system to another memory system according to the first embodiment.

FIG. 23 is a diagram illustrating an example of another memory system that is connected to the memory system and stores cold data according to the first embodiment.

FIG. 24 is a diagram illustrating an example of detaching the other memory system of FIG. 23 from a network.

FIG. 25 is a flowchart illustrating an example of a procedure of a connection control process executed in the memory system of the first embodiment.

FIG. 30 is a flowchart illustrating an example of a procedure of a cold data migration process executed in the memory system of the first embodiment.

FIG. 32 is a diagram illustrating an example of a relationship of logical addresses before data migration in a memory system and another memory system according to a second embodiment.

FIG. 35 is a diagram illustrating an example of a data migration operation from the memory system of the second embodiment to another memory system.

FIG. 39 is a diagram illustrating an example of an operation subsequent to the operation of FIG. 38.

FIG. 42 is a flowchart illustrating an example of a procedure of a migration process executed in the memory system of the second embodiment.

DETAILED DESCRIPTION

Various embodiments will be described hereinafter with reference to the accompanying drawings.

In general, according to one embodiment, a memory system includes a first nonvolatile memory and a controller. The controller controls the first nonvolatile memory and is capable of communicating with a host and a second memory system via a network. The second memory system includes a second nonvolatile memory. The controller manages information indicative of correspondences between private logical addresses and public logical addresses. The private logical addresses include first private logical addresses and second private logical addresses. Each of the first private logical addresses specifies a location in a first logical address space corresponding to the first nonvolatile memory. Each of the second private logical addresses specifies a location in a second logical address space corresponding to the second nonvolatile memory. Each of the public logical addresses specifies a location in a third logical address space over the first nonvolatile memory and the second nonvolatile memory. The controller receives a first write request designating a first public logical address or a first read request designating the first public logical address from the host. The controller specifies a third private logical address corresponding to the first public logical address. The controller performs, in a case where the third private logical address is included in the first private logical addresses, a write process with respect to the third private logical address or a read process with respect to the third private logical address. The controller transmits, in a case where the third private logical address is included in the second private logical addresses, a second write request designating the third private logical address or a second read request designating the third private logical address to the second memory system.

First Embodiment

Figure 1:
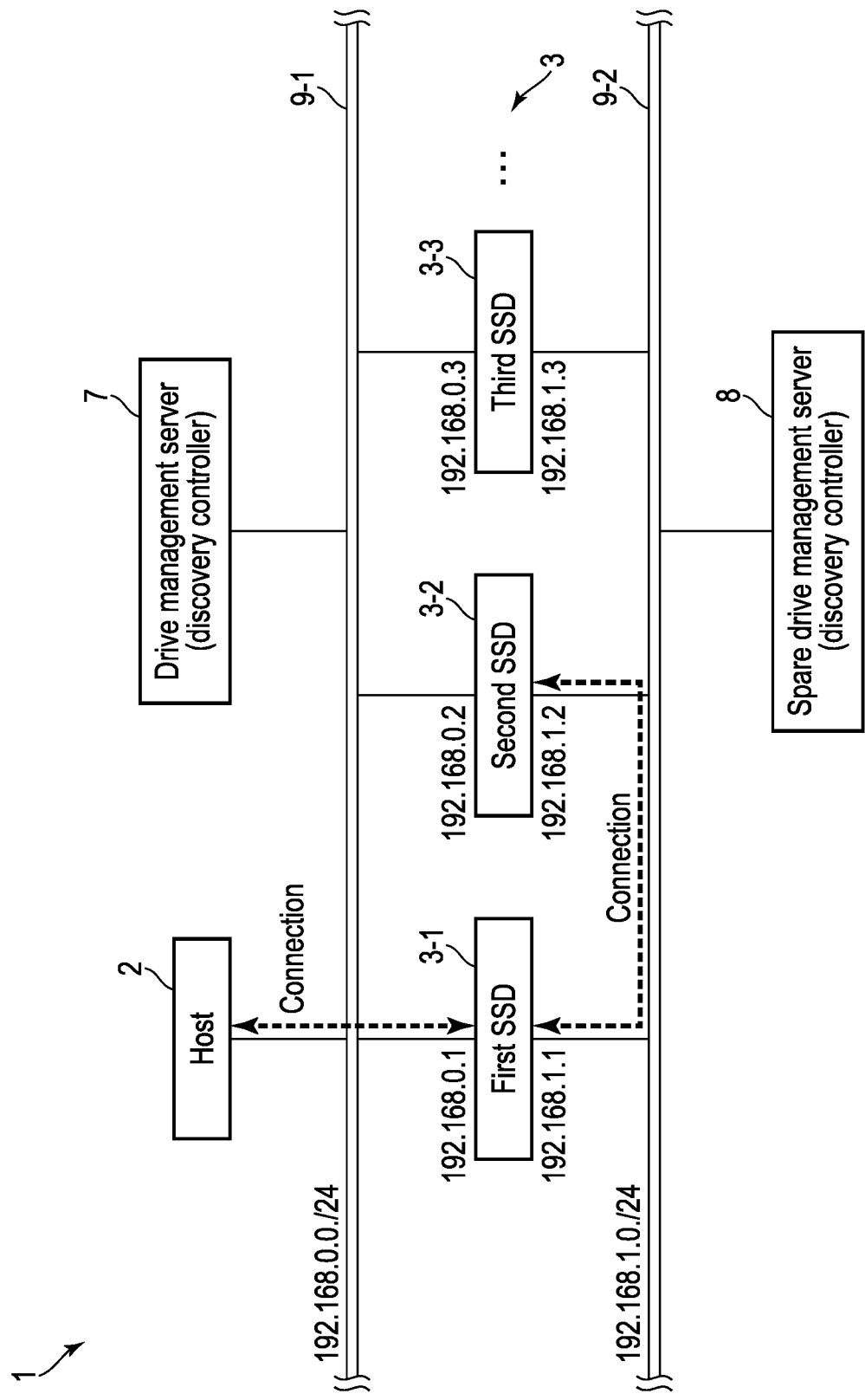
FIG. 1 is a block diagram of a configuration example of an information processing system including a memory system according to a first embodiment.

FIG. 1 is a block diagram illustrating a configuration example of an information processing system 1 including an SSD 3 as a memory system according to a first embodiment. The memory system is configured to write data into a nonvolatile memory such as a NAND flash memory (hereinafter referred to as NAND memory) and to read data from the nonvolatile memory. The memory system may be referred to as a semiconductor storage device or a storage device. The memory system is capable of connecting with a network. In the following description, a case where the memory system is realized as a solid state drive (SSD) including a NAND memory will be explained. The memory system may be realized as a memory device such as Universal Flash Storage (UFS) device or memory card instead of the SSD.

The information processing system 1 includes a host device 2 (hereinafter referred to as host 2), multiple SSDs 3, a drive management server 7, and a spare drive management server 8. In the example of FIG. 1, the information processing system 1 includes three SSDs 3-1, 3-2, and 3-3; however, the number of the SSDs 3 included in the information processing system 1 is freely determined. Furthermore, the number of the hosts 2 included in the information processing system 1 is also freely determined.

The host 2, each of the SSDs 3, and the drive management server 7 are mutually connectable via a first network 9-1. Furthermore, each of the SSDs 3 and the spare drive management server 8 are mutually connectable via a second network 9-2.

Each of the networks 9-1 and 9-2 conforms to interface standards such as Ethernet (registered trademark), Fibre channel, Infiniband, NVM Express (NVMe (registered trademark)), and NVM Express over Fabrics (NVMe-oF). In the following description, a case where each of the networks 9-1 and 9-2 conforms to Ethernet, NVMe, and NVMe-oF will be mainly exemplified. That is, each of the SSDs 3 is an Ethernet SSD that natively supports NVMe-oF.

In the example of FIG. 1, a network address of the first network 9-1 is 192.168.0.0/24. In the first network 9-1, IP addresses of the first SSD 3-1, the second SSD 3-2, and the third SSD 3-3 are 192.168.0.1, 192.168.0.2, and 192.168.0.3, respectively.

Further, a network address of the second network 9-2 is 192.168.1.0/24. In the second network 9-2, IP addresses of the first SSD 3-1, the second SSD 3-2, and the third SSD 3-3 are 192.168.1.1, 192.168.1.2, and 192.168.1.3, respectively.

The host 2 is an information processing apparatus physically connectable to the SSDs 3 via the first network 9-1. The host 2 establishes a connection with one of the SSDs 3 (for example, the first SSD 3-1) using the IP address of the SSD 3 on the first network 9-1. The host 2 can communicate with the SSD 3 with which the connection based on the IP address has been established. The host 2 may use the SSDs 3 as a storage via the SSD 3 with which the connection has been established. The host 2 may be a server (storage server) that stores bulk and various data in the SSDs 3, or may be a personal computer. Note that, in the following description, establishing a connection with an SSD 3 based on an IP address by the host 2 (or an SSD 3) may be referred to as connecting with an SSD 3.

The drive management server 7 manages information related to each of the SSDs 3 that can establish a connection with the host 2 (hereinafter may be referred to as drive information). The drive management server 7 may provide the drive information for a node (for example, the host 2) on the first network 9-1. The driver management server 7 may notify, when the drive information managed thereby is updated, nodes on the first network 9-1 of the update.

A function to provide the drive information for a node on the first network 9-1 will be referred to as a discovery service in the NVMe-oF. Furthermore, the drive information may be referred to as discovery information. The drive management server 7 functions, in the first network 9-1, as a discovery controller defined in NVMe-oF.

In this example, a case where an SSD 3 that can establishes a connection with the host 2 is the first SSD 3-1 is explained. The drive management server 7 manages drive information of the first SSD 3-1. The drive information includes information by which the first SSD 3-1 (specifically, a controller 4 of the first SSD 3-1) is identifiable and which is unique per drive, and an IP address of the first SSD 3-1 on the first network 9-1 (for example, 192.168.0.1). The information by which the first SSD 3-1 is identifiable is, for example, NVM Subsystem NVMe Qualified Name (subnqn) defined in NVMe-oF.

The host 2 receives the drive information of the first SSD 3-1 from the drive management server 7. As a query of the drive information with respect to the drive management server 7, a Get Log Page command of NVMe-oF may be used, for example. The host 2 uses the drive information to establish a connection (e.g., connection conforming to NVMe-oF) with the first SSD 3-1. For the establishment of connection, a Connect command of NVMe-oF may be used, for example.

The spare drive management server 8 manages information related to blank SSDs 3 (for example, second SSD 3-2, third SSD 3-3) each of which can establish a connection with a currently used SSD 3 (for example, first SSD 3-1), and such information may be referred to as spare drive information. The currently used SSD 3 is an SSD already connected with the host 2. The blank SSD 3 is an SSD that is not connected with the host 2 or the currently used SSD 3 and has not stored any user data yet. An SSD 3 newly connected to the second network 9-2 multicasts spare drive information to, for example, the second network 9-2. The spare drive information is registered or stored in the spare drive management server 8.

The spare drive management server 8 may provide the spare drive information for a node on the second network 9-2 (for example, the first SSD 3-1). For example, the first SSD 3-1 may inquire the drive information of the spare drive management server 8 by using a Get Log Page command of NVMe-oF, and receives the spare drive information. The spare drive management server 8 may notify, when the spare drive information managed thereby is updated, nodes on the second network 9-2 of the update. That is, the spare drive management server 8 functions as a discovery controller in the second network 9-2. Note that the spare drive management server 8 and the drive management server 7 may be realized as one server performing two services of serving the drive information and serving the spare drive information.

In this example, a case where blank SSDs 3 that can establish connections with a currently used SSD 3 are the second SSD 3-2 and the third SSD 3-3 is explained. The second SSD 3-2 and the third SSD 3-3 are blank memory systems. The spare drive management server 8 manages spare drive information of the second SSD 3-2 and spare drive information of the third SSD 3-3.

The spare drive information of the second SSD 3-2 includes information by which the second SSD 3-2 is identifiable (subnqn) and an IP address of the second SSD 3-2 on the second network 3-2 (for example, 192.168.1.2). The spare drive information of the third SSD 3-3 includes information by which the third SSD 3-3 is identifiable (subnqn) and an IP address of the third SSD 3-3 on the second network 9-2 (for example, 192.168.1.3).

The first SSD 3-1 receives the spare drive information of the second SSD 3-2 from the spare drive management server 8. The first SSD 3-1 uses the spare drive information to establish a connection with the second SSD 3-2. While the connection between the first SSD 3-1 and the second SSD 3-2 is established, the first SSD 3-1 can directly (that is, not via another information processing apparatus) access a memory area of a NAND memory 5 in the second SSD 3-2 via the second network 9-2.

Similarly, the first SSD 3-1 receives the spare drive information of the third SSD 3-3 from the spare drive management server 8. The first SSD 3-1 uses the spare drive information to establish a connection with the third SSD 3-3. While the connection between the first SSD 3-1 and the third SSD 3-3 is established, the first SSD 3-1 can directly access a memory area of a NAND memory 5 in the third SSD 3-3 via the second network 9-2.

When the connection between the first SSD 3-1 and one or more other SSDs 3, which are different from the first SSD 3-1, is established, the first SSD 3-1 performs address management of an entire address space including not only a logical address space of the first SSD 3-1 but also logical address spaces of the one or more other SSDs 3. Thereby, by establishing the connection with the first SSD 3-1, the host 2 can use not only the memory area of the first SSD 3-1 but also the memory areas of the one or more other SSDs 3. That is, by accessing the first SSD 3-1, the host 2 can indirectly access the one or more other SSDs 3 that work cooperatively with the first SSD 3-1. Furthermore, such address management can be applied when the first SSD 3-1 performs automatically data migration between the SSDs 3.

FIG. 2 illustrates the spare driver information provided by the spare drive management server 8. The spare drive information may include entries (for example, Discovery Log Entry) corresponding to the SSDs 3. Each of the entries includes, for example, subnqn and an IP address.

In the example FIG. 2, Discovery Log Entry 0 corresponds to the second SSD 3-2. Discovery Log Entry 0 includes subnqn "nqn.2014-08.com.example:nvme:nvm-subsystem-sn-abcde" and IP address "192.168.1.2" of the second SSD 3-2.

Discovery Log Entry 1 corresponds to the third SSD 3-3. Discovery Log Entry 1 includes subnqn "nqn.2014-08.com.example:nvme:nvm-subsystem-sn-fghij" and IP address "192.168.1.3" of the third SSD 3-3.

Note that the drive information provided by the drive management server 7 may have the same structure of the spare drive information of FIG. 2.

Figure 3:
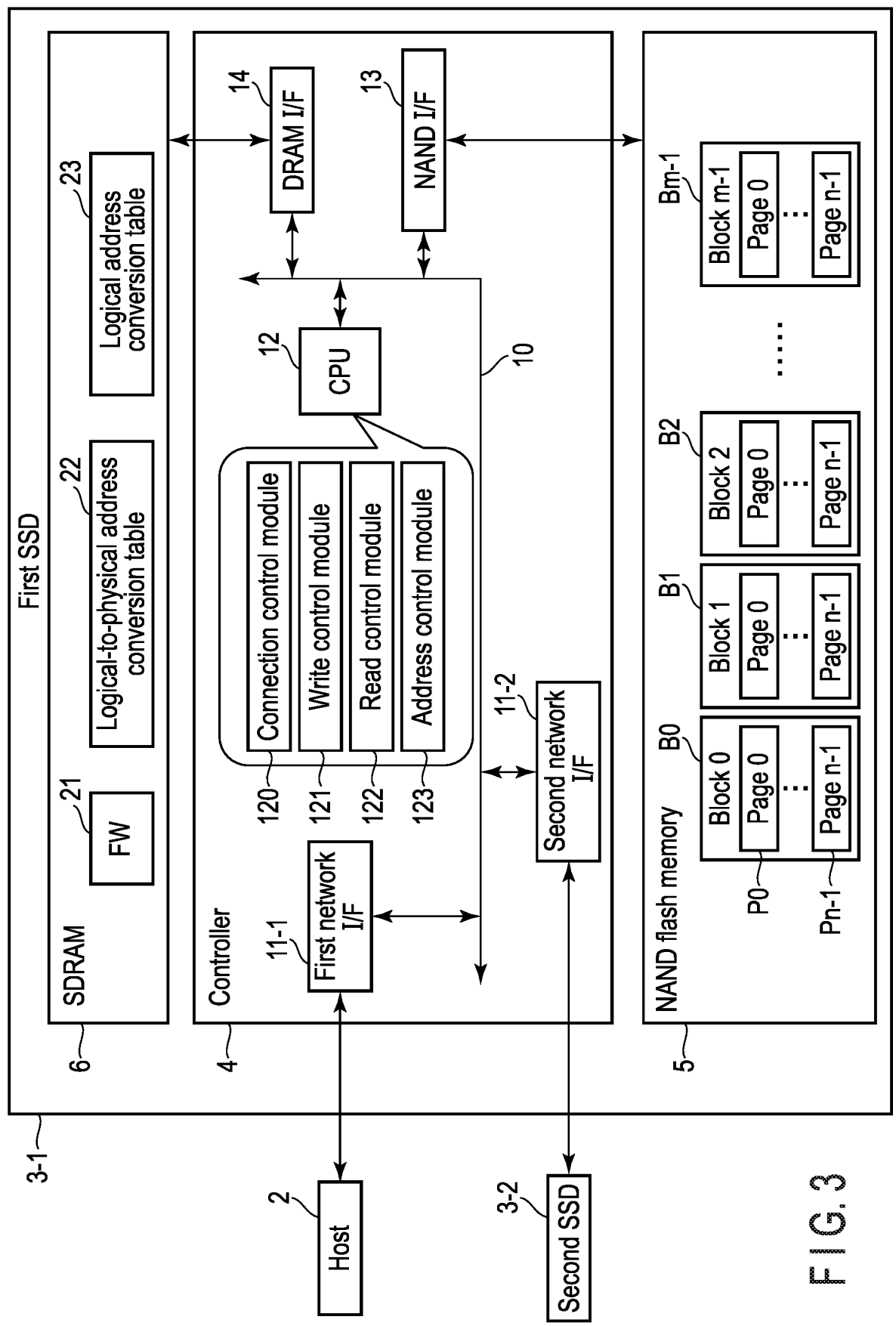
FIG. 3 is a block diagram illustrating a configuration example of the memory system of the first embodiment.

FIG. 3 is a block diagram illustrating a configuration example of the first SSD 3-1. Note that the second SSD 3-2 and the third SSD 3-3 may have the same configuration of the first SSD 3-1.

The first SSD 3-1 includes a NAND memory 5 and a controller 4. Furthermore, the first SSD 3-1 may include, for example, a synchronous dynamic random access memory (SDRAM) 6 as a random access memory (RAM), which is a volatile memory. Alternatively, a RAM such as static random access memory (SRAM) may be incorporated in the controller 4. Note that the SDRAM 6 may be incorporated in the controller 4.

In the RAM such as the SDRAM 6, for example, a storage area for a firmware (FW) 21 loaded from the NAND memory 5, a cache area for a logical-to-physical address conversion table 22 and a logical address conversion table 23, and a buffer area for temporality storing data to be written to the NAND memory 5 and data read from the NAND memory 5 are provided. The logical-to-physical address conversion table 22 will be explained later with reference to FIG. 4. The logical address conversion table 23 will be described later with reference to FIG. 5.

The NAND memory 5 includes physical blocks B0 to Bm-1. Each of the physical blocks B0 to Bm-1 includes pages P0 to Pn-1. The blocks each function as a minimum data erase unit. A physical block may be referred to as an erase block. Each of the pages P0 to Pn-1 includes memory cells connected to a single word line. The pages each function as a unit of a data write operation and a data read operation. Note that a word line may function as a unit of a data write operation and a data read operation.

The tolerable number of program/erase cycles (maximum number of P/E cycles) for each of the physical blocks B0 to Bm-1 is limited. One P/E cycle of a physical block includes an erase operation to erase data stored in all memory cells in the physical block and a data write operation to write data into each page of the physical blocks.

The controller 4 is a memory controller configured to control the NAND memory 5. The controller 4 may be realized as a semiconductor integrated circuit such as a system-on-a-chip (SoC).

The controller 4 may function as a flash translation layer (FTL) configured to execute data management and block management of the NAND memory 5. The data management executed by the FTL includes (1) management of mapping data indicative of relationship between each logical address and each physical address of the NAND memory 5 and (2) process to hide read/write operations executed in units of page and erase operations in units of block. The block management includes management of bad blocks, wear leveling, garbage collection, and refresh.

A logical address is an address used for specifying a location in a logical address space provided by an SSD 3 (that is, addressing). In the following description, a logical address space provided by a single SSD 3 will be referred to as a private logical address space. Furthermore, a logical address for specifying a location in the private logical address space will be referred to as a private logical address. As the private logical address, a logical block address (LBA) will be used, for example.

Management of mapping between each private logical address and each physical address is performed by using a logical-to-physical address conversion table 22. The controller 4 uses the logical-to-physical address conversion table 22 to manage each private logical address and each physical address with a certain size unit. A physical address corresponding to a private logical address indicates a physical memory location in the NAND memory 5 to which data of the private logical address is written. The logical-to-physical address conversion table 22 may be loaded from the NAND memory 5 to the SDRAM 6 when the first SSD 3-1 is powered on. The logical-to-physical address conversion table 22 is realized as a lookup table (LUT), for example.

FIG. 4 illustrate a configuration example of the logical-to-physical address conversion table 22. As illustrated in FIG. 4, the logical-to-physical address conversion table 22 is used for managing mapping between each private logical address and each physical address of the NAND memory 5.

Data write to one page is executable only once in a single P/E cycle. Thus, the controller 4 writes updated data corresponding to a private logical address not into an original physical memory location in which previous data corresponding to the private logical address is stored but into a different physical memory location. Then, the controller 4 updates the logical-to-physical address conversion table 22 to associate the private logical address with the different physical memory location and to invalidate the previous data. In the following description, data referred with the logical-to-physical address conversion table 22 (that is, data associated with a private logical address) will be referred to as valid data. Furthermore, data that is not associated with any private logical address will be referred to as invalid data. The valid data is data that may be read by the host 2. The invalid data is data that is no longer read by the host 2.

As illustrated in FIG. 3, the controller 4 may further manage a logical address space over the SSDs 3. The logical address space over the SSDs 3 will be referred to as a public logical address space. Furthermore, a logical address for specifying a location in the public logical address space will be referred to as a public logical address. The public logical address is an address used by the host 2 for addressing the SSDs 3.

Furthermore, the controller 4 uses a logical address conversion table 23 to manage relationship between the private logical address spaces, which correspond to the SSDs 3, respectively, and the public logical address space over the SSDs 3. That is, the logical address conversion table 23 includes information to manage relationship between the private logical address spaces each having a size that corresponds to a capacity of the NAND memory 5 in each of the SSDs 3 and the public logical address space having a size that corresponds to a sum of the capacities of the NAND memories 5 in the SSDs 3. The controller 4 may generate the logical address conversion table 23 when a connection between the first SSD 3-1 and the second SSD 3-2 via the second network 9-2 is established.

FIG. 5 illustrate a configuration example of the logical address conversion table 23. The logical address conversion table 23 includes entries corresponding to public logical addresses. The entries each include fields of a public logical address, drive identification information and a private logical address, an empty flag, and the number of accesses.

Information indicated in each field in an entry corresponding to a public logical address will be explained. The field of public logical address indicates the public logical address itself.

The field of drive identification information and private logical address indicates a combination of drive identification information and a private logical address that corresponds to the public logical address. The drive identification information is information that can specify, for example, any one of the SSDs 3. The private logical address is a private logical address in the SSD 3 specified by the drive identification information.

The field of empty flag indicates whether or not the public logical address is an empty public logical address. The empty public logical address is a public logical address in which valid data is not stored (that is, a public logical address which is not associated with data stored in any physical address). Note that a public logical address in which valid data is stored (that is, public logical address which is associated with data stored in a physical address) may be referred to as a mapped public logical address.

When the public logical address is an empty public logical address, "1" is set in the field of empty flag, for example. A combination of drive identification information and a private logical address associated with the empty public logical address indicates an empty private logical address.

When the public logical address is a mapped public logical address, "0" is set in the field of empty flag, for example. A combination of drive identification information and a private logical address associated with the mapped public logical address indicates a mapped private logical address.

The field of number of accesses indicates the number of times the host 2 accesses (for example, write accesses and read accesses) the public logical address.

In the example of FIG. 5, the logical address conversion table 23 includes entries corresponding to public logical addresses in the public logical address space over the first SSD 3-1 and the second SSD 3-2. For example, a public logical address **0000h is associated with a private logical address 0000h of the first SSD 3-1. The public logical address 0000h is a mapped public logical address and the number of accesses by the host 2** is five.

For example, a public logical address **XX00h is associated with a private logical address 0000h of the second SSD 3-2. The public logical address XX00h is an empty public logical address and the number of accesses by the host 2** is zero.

FIG. 6A illustrates an example of a storage state of data with respect to the private logical addresses of the first SSD 3-1. The storage state corresponds to the logical address conversion table 23 illustrated in FIG. 5.

That is, private logical addresses **0000h to 0060h, which are associated with the mapped public logical addresses 0000h to 0060h, respectively, in the logical address conversion table 23 of FIG. 5, store data0 to data6, respectively. That is, the private logical addresses 0000h to 0060h of the first SSD 3-1 are mapped private logical addresses. Furthermore, a private logical address 0070h, which is associated with an empty public logical address 0070h in the logical address conversion table 23, does not store data. That is, the private logical address 0070h of the first SSD 3-1** is an empty private logical address.

FIG. 6B illustrates an example of a storage state of data with respect to the private logical addresses of the second SSD 3-2. The storage state corresponds to the logical address conversion table 23 illustrated in FIG. 5.

That is, private logical addresses **0000h to 0070h, which are associated with empty public logical addresses XX00h to XX70h, respectively, in the logical address conversion table 23 of FIG. 5, do not store data. That is, the private logical addresses 0000h to 0070h of the second SSD 3-2** are empty private logical addresses.

As illustrated in FIG. 3, the controller 4 includes a first network interface (first network I/F) 11-1, a second network interface (second network I/F) 11-2, a CPU 12, a NAND interface (NAND I/F) 13, and a DRAM interface (DRAM I/F) 14. The first network I/F 11-1, the second network I/F 11-2, the CPU 12, the NAND I/F 13, and the DRAM I/F 14 are mutually connected via a bus 10.

The first network I/F 11-1 and the second network I/F 11-2 are hardware interfaces to perform communication between the first SSD 3-1 and an external information processing apparatus. The first network I/F 11-1 is used for, for example, communication with the host 2. In this case, the first network I/F 11-1 functions as a circuit to receive various commands and data from the host 2 and to transmit responses and data corresponding to the commands to the host 2. The commands received from the host 2 include, for example, a write command, a read command, and an unmap command (trim command). The first network I/F 11-1 may be used for communication with the drive management server V.

The second network I/F 11-2 is used for, for example, communication with another SSD 3 (the second SSD 3-2 in FIG. 3). In this case, the second network I/F 11-2 functions as a circuit to transmit various commands and data to the other SSD 3 and to receive responses and data corresponding to the commands from the other SSD 3. The commands transmitted from the first SSD 3-1 include, for example, a write command, a read command, and an unmap command. The second network I/F 11-2 may be used for communication with the spare drive management server 8.

With the network I/Fs 11-1 and 11-2 in the controller 4, a route used for access to the first SSD 3-1 from the host 2 and a route used for access to another SSD 3 from the first SSD 3-1 can be set separately. Furthermore, three or more network I/Fs may be included in the controller 4.

Alternatively, only one network I/F may be provided with the controller 4. In this case, the network I/F is chronologically switched between the route used for access to the first SSD 3-1 from the host 2 and the route used for access to another SSD 3 from the first SSD 3-1.

The CPU 12 may be realized as at least one processor. The CPU 12 may be a processing circuit such as an SoC. The CPU 102 controls operations of each component in the controller 4.

The CPU 12 is a processor configured to control the first network I/F 11-1, the second network I/F 11-2, the NAND I/F 13, and the DRAM I/F 14. The CPU 12 executes the FW 21 loaded to the SDRAM 6 to perform various processes. That is, the FW 21 is a control program to control operations of the CPU 12. The CPU 12 may perform, in addition to the aforementioned FTL processes, command processes to process various commands from the host 2. Note that part of or the entire FTL processes and the command processes may be executed by a dedicated hardware in the controller 4.

The CPU 12 may function as a connection control module 120, a write control module 121, a read control module 122, and an address control module 123. The CPU 102 realizes operations of each module by executing programs such as the FW 21. Various operations of the connection control module 120, the write control module 121, the read control module 122, and the address control module 123 will be described later.

The NAND I/F 13 is a hardware interface that performs communication between the controller 4 and the NAND memory 5. The NAND I/F 13 functions as a NAND control circuit configured to control the NAND memory 5. The NAND I/F 13 conforms to an interface standard such as a toggle DDR and an open NAND flash interface (ONFI).

The NAND I/F 13 may be connected to each of NAND memory chips in the NAND memory 5 via multiple channels (Ch). By operating the NAND memory chips in parallel via the channels (Ch), it is possible to broaden an access bandwidth to the NAND memory 5.

The DRAM I/F 14 functions as a DRAM control circuit configured to control access to the SDRAM 6. Memory areas of the SDRAM 6 may be allocated to an area for storing the FW 21 and system data loaded from the NAND memory 5, a cache area of data used for processing by the CPU 102, and a buffer area used as a write buffer, a read buffer, and the like. The data used for the processing by the CPU 102 includes, for example, the logical-to-physical address conversion table 22 and the logical address conversion table 23. Furthermore, the write buffer is an area for storing user data to be written into the NAND memory 5. The read buffer is an area for storing user data read from the NAND memory 5.

As mentioned above, the CPU 12 functions as the connection control module 120, the write control module 121, the read control module 122, and the address control module 123. The operations of each module will be explained.

The connection control module 120 controls establishment of a connection between the first SSD 3-1 and the host 2, and establishment of a connection between the first SSD 3-1 and another SSD 3. Specifically, the connection control module 120 establishes a connection with the host 2 via the first network I/F 11-1 in accordance with, for example, a request from the host 2.

Furthermore, when a predetermined condition is satisfied while the connection between the host 2 and the first SSD 3-1 is being established, the connection control module 120 establishes a connection with a new blank SSD 3 via the second network I/F 11-2. The condition is a condition to increase a physical storage capacity that can be used by the host 2 (hereinafter referred to as first condition). The first condition is that an available capacity of the NAND memory 5 in the first SSD 3-1 is below a threshold value, or that a ratio of the available capacity to the total capacity of the NAND memory 5 is below a threshold value, for example. Furthermore, if connections between the first SSD 3-1 and one or more SSDs 3 are established, the first condition may be that a sum of available capacities of NAND memories 5 provided with the first SSD 3-1 and the one or more SSDs 3 is below a threshold value, or that a ratio of the available capacities to the total capacity of the NAND memories 5 is below a threshold value, for example.

When the first condition is satisfied, the connection control module 120 receives spare drive information from the spare drive management server 8 and establishes a connection with a new blank SSD 3 using the spare drive information. Thus, a physical storage capacity that can be used by the host 2 can increase if needed in a case where the available capacity of the first SSD 3-1 is decreased and the like. Thereafter, the physical storage capacity may be referred to as storage capacity. In the following description, a case where the connection control module 120 establishes a connection with the second SSD 3-2 via the second network I/F 11-2 will be mainly exemplified.

The write control module 121 performs a process for writing data of a private logical address. Specifically, for example, when writing first data of a first private logical address, the write control module 121 determines a physical address to which the first data is written. The write control module 121 instructs the NAND memory 5 to write (specifically, program) the first data to the physical address via the NAND I/F 13. Thus, the first data is written to the physical address in the NAND memory 5. Then, the write control module 121 updates the logical-to-physical address conversion table 22 to associate the physical address with the first private logical address. Thus, the first data is written to the first private logical address.

The read control module 122 performs a process for reading data of a private logical address. Specifically, when reading first data of a first private logical address, the read control module 122 specifies a physical address corresponding to the first private logical address using the logical-to-physical address conversion table 22. Then, the read control module 122 instructs the NAND memory 5 to read the first data from the physical address via the NAND I/F 13. Thus, the first data is read from the first private logical address. Note that, if the reading is performed in accordance with a read command from the host 2, the read control module 122 transmits the read first data to the host 2 via the first network I/F 11-1.

The address control module 123 receives various commands and data from the host 2 via the first network I/F 11-1. The address control module 123 transmits responses and data corresponding to the commands to the host 2 via the first network I/F 11-1.

Furthermore, the address control module 123 may access to a storage area of the NAND memory 5 in the second SSD 3-2 via the second network I/F 11-2. Specifically, the address control module 123 transmits various commands and data to the second SSD 3-2 via the second network I/F 11-2. Furthermore, the address control module 123 receives responses and data corresponding to the commands from the second SSD 3-2 via the second network I/F 11-2.

The address control module 123 manages the logical address conversion table 23. For example, when the connection control module 120 establishes a connection between the first SSD 3-1 and the second SSD 3-2, the address control module 123 generates the logical address conversion table 23. The logical address conversion table 23 indicates correspondences between private logical addresses and public logical addresses. The private logical addresses include first private logical addresses and second private logical addresses. Each of the first private logical addresses is a logical address to specify a location in a private logical address space that has a size corresponding to the capacity of the NAND memory 5 of the first SSD 3-1. Each of the second private logical addresses is a logical address to specify a location in a private logical address space that has a size corresponding to the capacity of the NAND memory 5 of the second SSD 3-2. Each of the public logical addresses is a logical address to specify a location in a public logical address space that has a size corresponding to the sum of the capacities of the NAND memories 5 of the first SSD 3-1 and the second SSD 3-2.

The address control module 123 changes the storage capacity that can be used by the host 2 from the storage capacity of the NAND memory 5 of the first SSD 3-1 to the sum of storage capacities of the NAND memories 5 of the first SSD 3-1 and the second SSD 3-2. The address control module 123 may notify the host 2 of the changed storage capacity.

Note that, before a connection between the first SSD 3-1 and another blank SSD 3 is established, if a maximum storage capacity can be estimated from the maximum number of SSDs 3 that are capable of establishing connections with the first SSD 3-1, the address control module 123 may notify the host 2 of the maximum storage capacity.

Specifically, in NVMe-oF, for example, a queue is created in accordance with establishment of a connection between devices (that is, NVM subsystems), and the connection is managed using the queue. Each queue includes multiple entries. The number of entries that are assignable to one or more queues created by one device is limited. When the number of entries assigned to a queue is increased, a performance related to the connection using the queue is improved. However, in that case, the number of queues that can be created decreases, and thus, the number of other devices that can be connected with the device (that is, the number of connections) decreases.

Thus, by determining the maximum numbers of queues and the numbers of connections that can be created by each SSD 3 in the information processing system 1, the maximum storage capacity that can be used by the host 2 can be estimated. The maximum numbers of queues and the numbers of connections may be determined in consideration of a balance with the performance.

For example, a case where the maximum number of queues that can be created by the first SSD 3-1 is eight including one for a connection with the host 2, and seven for connections with different SSDs 3 will be explained. Furthermore, the storage capacity of each of the SSDs 3 including the first SSD 3-1 is 8 TB.

In this case, the maximum storage capacity that can be used by the host 2 is 64 TB (=8 TB×8) obtained by the first SSD 3-1 connecting with the different seven SSDs 3. The first SSD 3-1 notifies the host 2 of the maximum storage capacity that can be used by the host 2 by using, for example, drive information provided by the drive management server 7. The drive information includes, for example, "nqn.2-14-08.com.example:nvme:nvm-subsystem-sn-klmno-8tb-64tb" as identification information (subnqn) of the first SSD 3-1. At the end of the identification information, "8tb" indicative of the storage capacity of the first SSD 3-1 and "64tb" indicative of the maximum storage capacity obtained by connections between the first SSD 3-1 with the different seven SSDs 3 are included. The host 2 may recognize the maximum storage capacity that can be used by the host 2 using the information at the end of the identification information.

The address control module 123 may receive a write command or a read command designating a public logical address from the host 2. The write command is a command to request writing user data that corresponds to a first public logical address and is received from the host 2 along with the write command. Furthermore, the read command is a command to request reading user data that corresponds to a first public logical address. Note that, in the following description, writing user data that corresponds to a logical address may be referred to as writing user data to a logical address. Furthermore, reading user data that corresponds to a logical address may be referred to as reading user data from a logical address.

The address control module 123 uses the logical address conversion table 23 to specify a third private logical address corresponding to the first public logical address. When the third private logical address is included in the first private logical addresses in the private logical address space corresponding to the first SSD 3-1, the write control module 121 and the read control module 122 perform a write process and a read process with respect to the third private logical address. That is, when the first public logical address corresponds to a private logical address of the first SSD 3-1, the write control module 121 and the read control module 122 performs a write process and a read process with respect to the NAND memory 5 of the first SSD 3-1.

In contrast, when the third private logical address is included in the second private logical addresses in the private logical address space corresponding to the second SSD 3-2, the address control module 123 transmits a write command or a read command designating the third private logical address to the second SSD 3-2. That is, when the first public logical address corresponds to a private logical address of the second SSD 3-2, the address control module 123 transmits a request intended by the write command or the read command received from the host 2 to the second SSD 3-2.

In the second SSD 3-2, in accordance with the write command or the read command designating the third private logical address, a write process or a read process with respect to the NAND memory 5 in the second SSD 3-2 is performed. Specifically, a write control module 121 of the second SSD 3-2 performs, in accordance with the write command, a process to write the user data, which is received from the first SSD 3-1 along with the write command, to the third private logical address. The write control module 121 of the second SSD 3-2 transmits a response to the write command to the first SSD 3-1.

Furthermore, a read control module 122 of the second SSD 3-2 performs, in accordance with the read command, a process to read user data from the third private logical address. The read control module 122 of the second SSD 3-2 transmits the read user data to the first SSD 3-1.

The address control module 123 of the first SSD 3-1 receives responses and data corresponding to commands from the second SSD 3-2 via the second network I/F 11-2. The address control module 123 transmits the responses and data to the host 2. Thus, even if the first public logical address corresponds to a private logical address of the second SSD 3-2, the host 2 can receive responses corresponding to the transmitted write command, or user data read corresponding to the transmitted read command.

Note that the address control module 123 uses the first network I/F 11-1 for the communication with the host 2 and uses the second network I/F 11-2 for the communication with the second SSD 3-2. As above, different communication routes are used between the communication with the host 2 and the communication with the second SSD 3-2, and thus, degradation in performance can be suppressed in the process including transmission (transfer) of commands and data to the second SSD 3-2.

Furthermore, the address control module 123 and the read control module 122 may migrate data from the NAND memory 5 of the first SSD 3-1 to the NAND memory 5 of the second SSD 3-2. Furthermore, the address control module 123 and the write control module 121 may migrate data from the NAND memory 5 of the second SSD 3-2 to the NAND memory 5 of the first SSD 3-1. The address control module 123 updates the logical address conversion table 23 in accordance with the migration of data.

In the following description, operation examples of the first SSD 3-1 and the second SSD 3-2 will be explained using storage states of data of the first SSD 3-1 and the second SSD 3-2.

(Write Operation Example 1)

An example of a write operation in a case where a write command is received from the host 2 will be explained with reference to FIGS. 7 and 8. In this example, the write operation performed in a case where a public logical address designated in the write command is associated with a private logical address of the first SSD 3-1 is explained.

Figure 7:
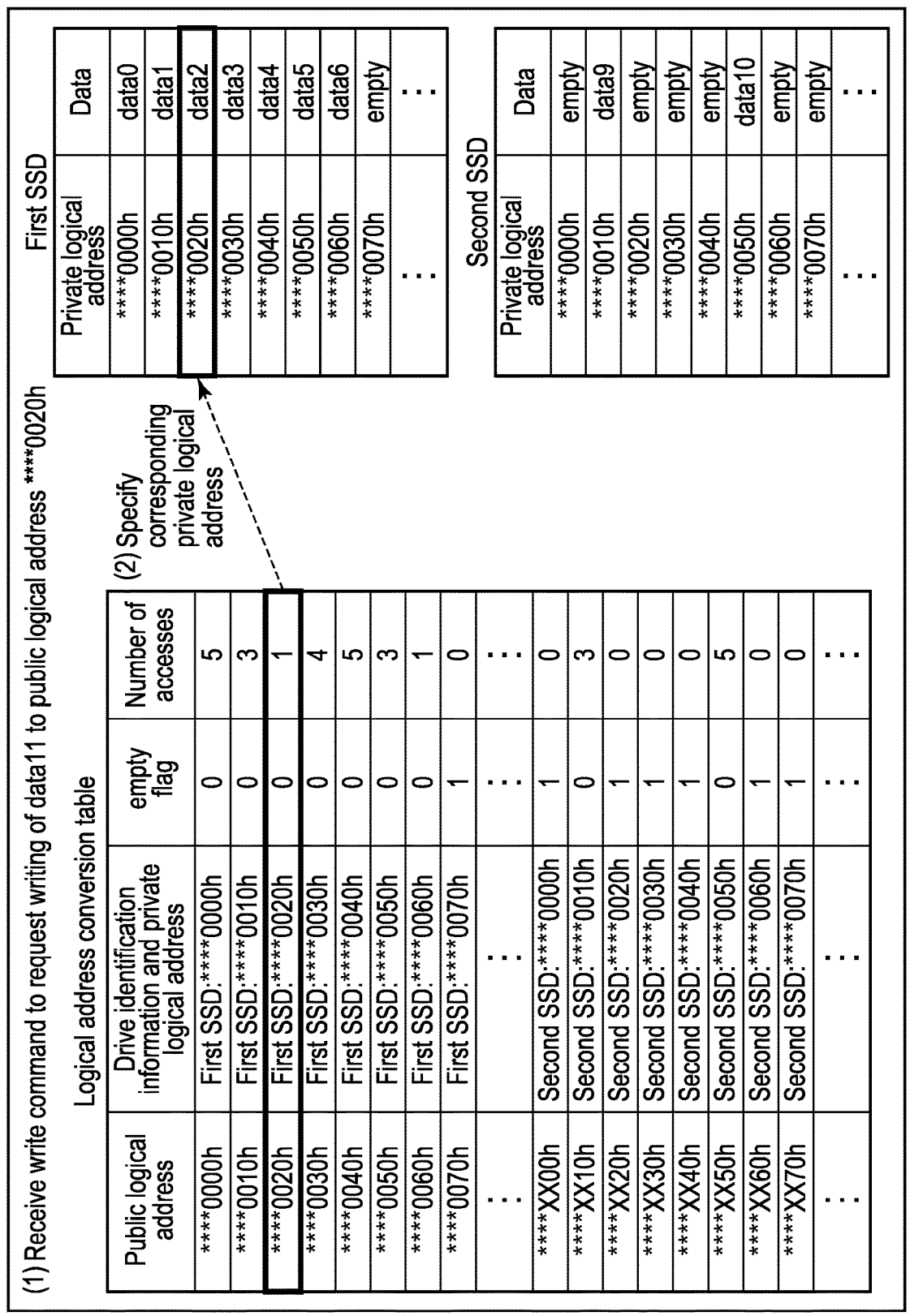
FIG. 7 is a diagram illustrating an example of an operation in accordance with a write request with respect to the memory system of the first embodiment.

Specifically, as illustrated in FIG. 7, the address control module 123 of the first SSD 3-1 receives, for example, a write command to request writing of data11 to a public logical address **0020h from the host 2 via the first network I/F 11-1. The address control module 123 specifies a private logical address 0020h of the first SSD 3-1 corresponding to the public logical address 0020h by using the logical address conversion table 23**.

Then, as illustrated in FIG. 8, the write control module 121 writes the data11 to the private logical address **0020h. Specifically, the write control module 121 determines a physical address of the NAND memory 5 to which the data11 is to be written and writes the data11 to the physical address. The write control module 121 updates the logical-to-physical address conversion table 22 to associate the physical address with the private logical address **0020h.

Then, the address control module 123 updates the logical address conversion table 23 to change the number of accesses of the public logical address **0020h from 1 to 2 by adding 1. Furthermore, the address control module 123 notifies the host 2 that the writing of the data11 corresponding to the public logical address **0020h is completed.

Through the above write operation, the address control module 123 and the write control module 121 can write data to the NAND memory 5 of the first SSD 3-1 when the public logical address designated by the write command from the host 2 is associated with the private logical address of the first SSD 3-1.

(Write Operation Example 2)

Another example of a write operation in a case where a write command is received from the host 2 will be explained with reference to FIGS. 9 and 10. In this example, the write operation performed in a case where a public logical address designated in the write command is associated with a private logical address of the second SSD 3-2 is explained.

Figure 9:
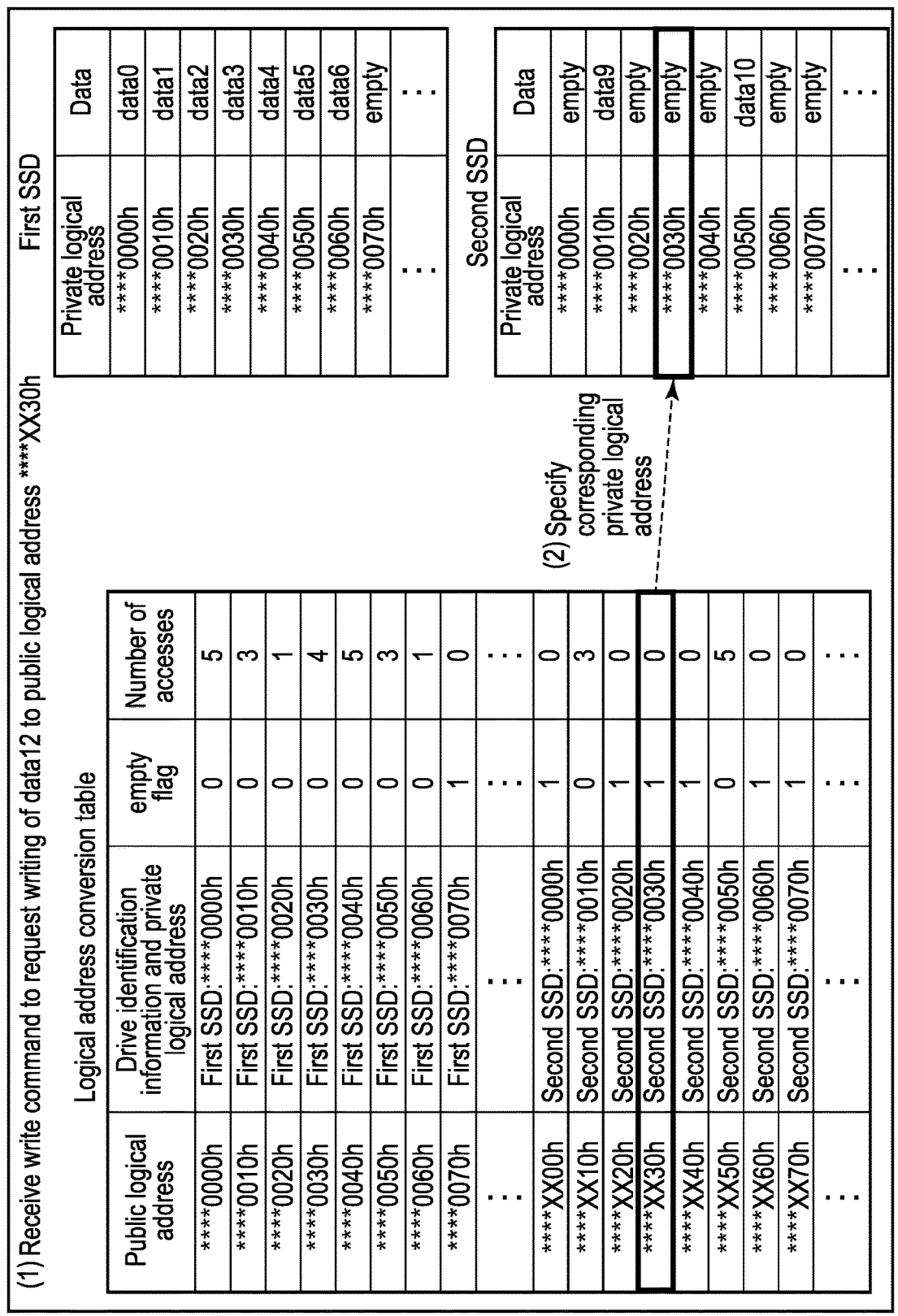
FIG. 9 is a diagram illustrating another example of an operation in accordance with a write request with respect to the memory system of the first embodiment.

Specifically, as illustrated in FIG. 9, the address control module 123 of the first SSD 3-1 receives, for example, a write command to request writing of data12 to a public logical address **XX30h from the host 2 via the first network I/F 11-1. The address control module 123 specifies a private logical address 0030h of the second SSD 3-2 corresponding to the public logical address **XX30h by using the logical address conversion table 23.

Figure 10:
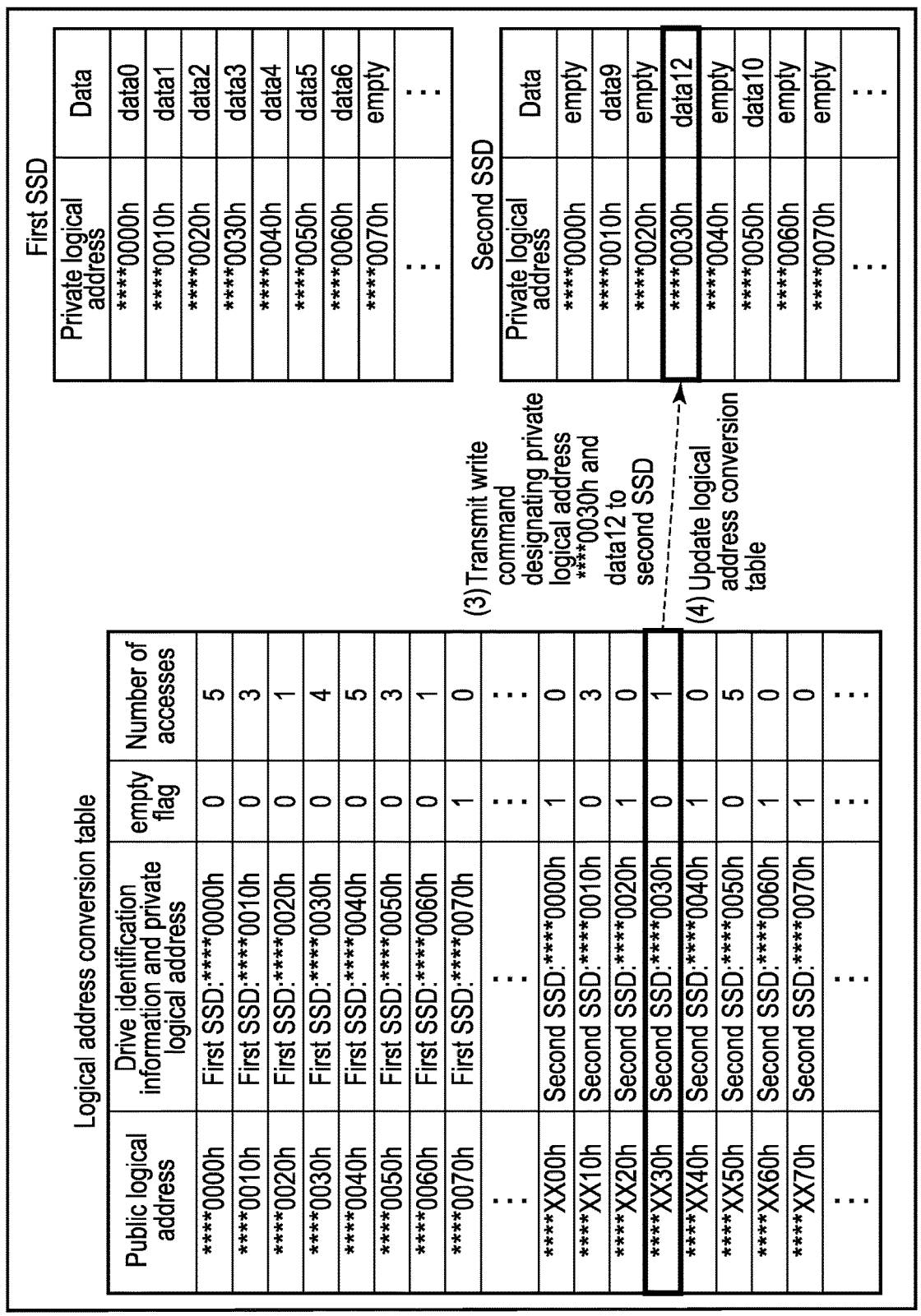
FIG. 10 is a diagram illustrating an example of an operation subsequent to the operation of FIG. 9.

Then, as illustrated in FIG. 10, the address control module 123 transmits a write command to request writing of the data12 to the private logical address **0030h, to the second SSD 3-2 via the second network I/F 11-2. Specifically, the address control module 123 transmits the write command designating the private logical address **0030h and the data12 to the second SSD 3-2.

In the second SSD 3-2, the data12 is written to the private logical address **0030h in accordance with the write command. Specifically, the write control module 121 of the second SSD 3-2 determines a physical address of the NAND memory 5 of the second SSD 3-2 to which the data12 is to be written. The write control module 121 writes the data 12 to the physical address. The write control module 121 updates a logical-to-physical address conversion table 22 in the second SSD 3-2 to associate the physical address with the private logical address 0030h. Thus, the data12 is written to the private logical address 0030h of the second SSD 3-2. Then, the write control module 121 notifies the first SSD 3-1 that writing of the data12 corresponding to the private logical address **0030h is completed.

The address control module 123 of the first SSD 3-1 receives the notification indicative of completion of writing of the data12 corresponding to the private logical address **0030h from the second SSD 3-2. The address control module 123 notifies the host 2, in response to the notification, that writing of the data12 corresponding to the public logical address XX30h is completed. Furthermore, the address control module 123 updates the logical address conversion table 23 to change the empty flag of the public logical address XX30H from 1 to 0 and change the number of accesses of the public logical address **XX30h from 0 to 1 by adding 1.

Through the above write operation, the address control module 123 of the first SSD 3-1 can write data to the NAND memory 5 of the second SSD 3-2 when the public logical address designated by the write command from the host 2 is associated with the private logical address of the second SSD 3-2.

(Write Operation Example 3)

Another example of a write operation in a case where a write command is received from the host 2 will be explained with reference to FIGS. 11 and 12. In this example, the write operation performed in a case where a public logical address designated in the write command is associated with a private logical address of the second SSD 3-2 is explained.

Figure 11:
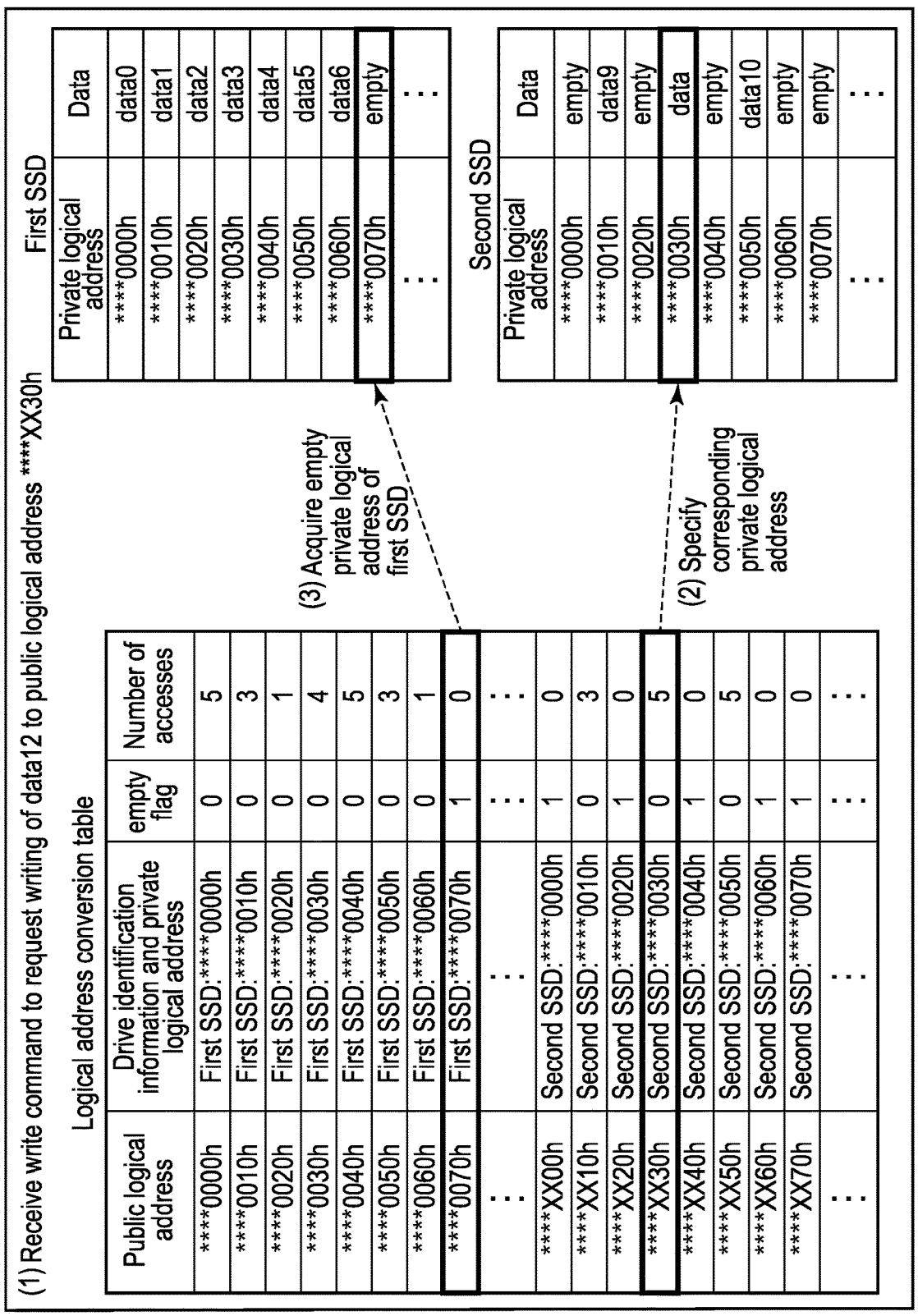
FIG. 11 is a diagram illustrating yet another example of an operation in accordance with a write request with respect to the memory system of the first embodiment.

In the example of FIG. 11, the address control module 123 of the first SSD 3-1 receives a write command from the host 2 and specifies a private logical address **0030h of the second SSD 3-2 corresponding to the public logical address **XX30h designated in the write command as in the above-described operation with reference to FIG. 9.

The address control module 123 determines that the data12 received with the write command is hot data. The data12 is updated data of the data stored in the private logical address ****0030h of the second SSD 3-2. The hot data is data having a relatively high possibility or frequency to be accessed by the host 2 as compared to the other data. Specifically, the hot data is data associated with a public logical address with high access frequency. The public logical address with high access frequency is a public logical address the number of accesses of which is above a threshold value, for example.

Between access to the NAND memory 5 of the first SSD 3-1 and access to the NAND memory 5 of the second SSD 3-2 in accordance with a command from the host 2, latencies differ. That is, the access to the NAND memory 5 of the second SSD 3-2 has a longer latency than the access to the NAND memory 5 of the first SSD 3-1. This is because, the access to the NAND memory 5 of the second SSD 3-2 is performed after performing a process of the command by the address control module 123 of the first SSD 3-1 (for example, a process to specify a private logical address corresponding to a public logical address designated in a command and to transmit the command designating the private logical address to the second SSD 3-2), and responses and data corresponding to the command are transmitted to the host 2 via the first SSD 3-1.

The data12 received along with the write command is data accessed with relatively high frequency by the host 2 as compared to the other data, and thus, is estimated as hot data. Thus, it is desired to store the data12 in the first SSD 3-1 with shorter latency in the access time. Thus, when the private logical address corresponding to the public logical address ****XX30h designated in the write command is a private logical address of the second SSD 3-2 in the logical address conversion table 23, the address control module 123 of the first SSD 3-1 controls the data12 to be written to the first SSD 3-1 instead of the second SSD 3-2.

Specifically, the address control module 123 acquires an empty private logical address of the first SSD 3-1. The empty private logical address is a private logical address that is not associated with any data. The address control module 123 uses the logical address conversion table 23 to select one of entries each having the field of empty flag in which 1 is set, from entries that include the private logical addresses of the first SSD 3-1, respectively. That is, the private logical address indicated in the selected entry is an empty private logical address of the first SSD 3-1. In this example, the address control module 123 selects the private logical address ****0070h of the first SSD 3-1.

Then, as illustrated in FIG. 12, the write control module 121 of the first SSD 3-1 writes the data12 to the private logical address **0070h of the first SSD 3-1. Specifically, the write control module 121 determines a physical address in the NAND memory 5 to which the data12 is to be written, and writes the data12 to the physical address. The write control module 121 updates the logical-to-physical address conversion table 22 to associate the physical address with the private logical address **0070h.

The first SSD 3-1 invalidates data stored in the private logical address **0030h of the second SSD 3-2. Specifically, the address control module 123 transmits, for example, an unmap command designating the private logical address 0030h to the second SSD 3-2**.

In the second SSD 3-2, in accordance with the unmap command, the data stored in the private logical address **0030h is invalidated. For example, the address control module 123 of the second SSD 3-2 updates the logical-to-physical address conversion table 22 in the second SSD 3-2 such that the private logical address **0030h is not associated with any physical address.

Then, the address control module 123 of the first SSD 3-1 notifies the host 2 that the writing of the data12 corresponding to the public logical address **XX30h is completed. Furthermore, the address control module 123 updates the logical address conversion table 23 to change the correspondence between the public logical addresses and the private logical addresses. Specifically, the address control module 123 associates the private logical address 0030h of the second SSD 3-2 with the public logical address 0070h. The address control module 123 associates the private logical address 0070h of the first SSD 3-1 with the public logical address XX30h. The address control module 123 maintains 0 in the empty flag field in the entry including the public logical address XX30h in order to indicate the public logical address currently being used (mapped). Furthermore, the address control module 123 changes the number of accesses field in this entry from 5 to 6 by adding 1. Note that the address control module 123 does not change the empty flag or the number of accesses in the entry including the public logical address **0070h.

Through the above write operation, the address control module 123 and the write control module 121 can store data (hot data) to the first SSD 3-1 instead of the second SSD 3-2 even if the public logical address designated in the write command from the host 2 is associated with the private logical address of the second SSD 3-2. Furthermore, the address control module 123 associates the public logical address designated in the write command with the private logical address of the first SSD 3-1 to which the data is actually written. Thus, the corresponding data can be stored in the first SSD 3-1 without any changing of the public logical addresses recognized by the host 2. Thus, the latency of the access with respect to the data by the host 2 can be shortened as compared to a case where the data is stored in the second SSD 3-2.

As above, the address control module 123 can change a physical storage destination of data in units of memory system (for example, SSD) in accordance with the attribute of data such as hot data. At that time, the host 2 (or user using the host 2) can access the data even if the physical storage destination of the data is changed over the memory systems without recognizing such a state.

(Read Operation Example 1)

An example of a read operation in a case where a read command is received from the host 2 will be explained with reference to FIGS. 13 and 14. In this example, the read operation in a case where a public logical address designated in the read command is associated with a private logical address of the first SSD 3-1 will be explained.

Figure 13:
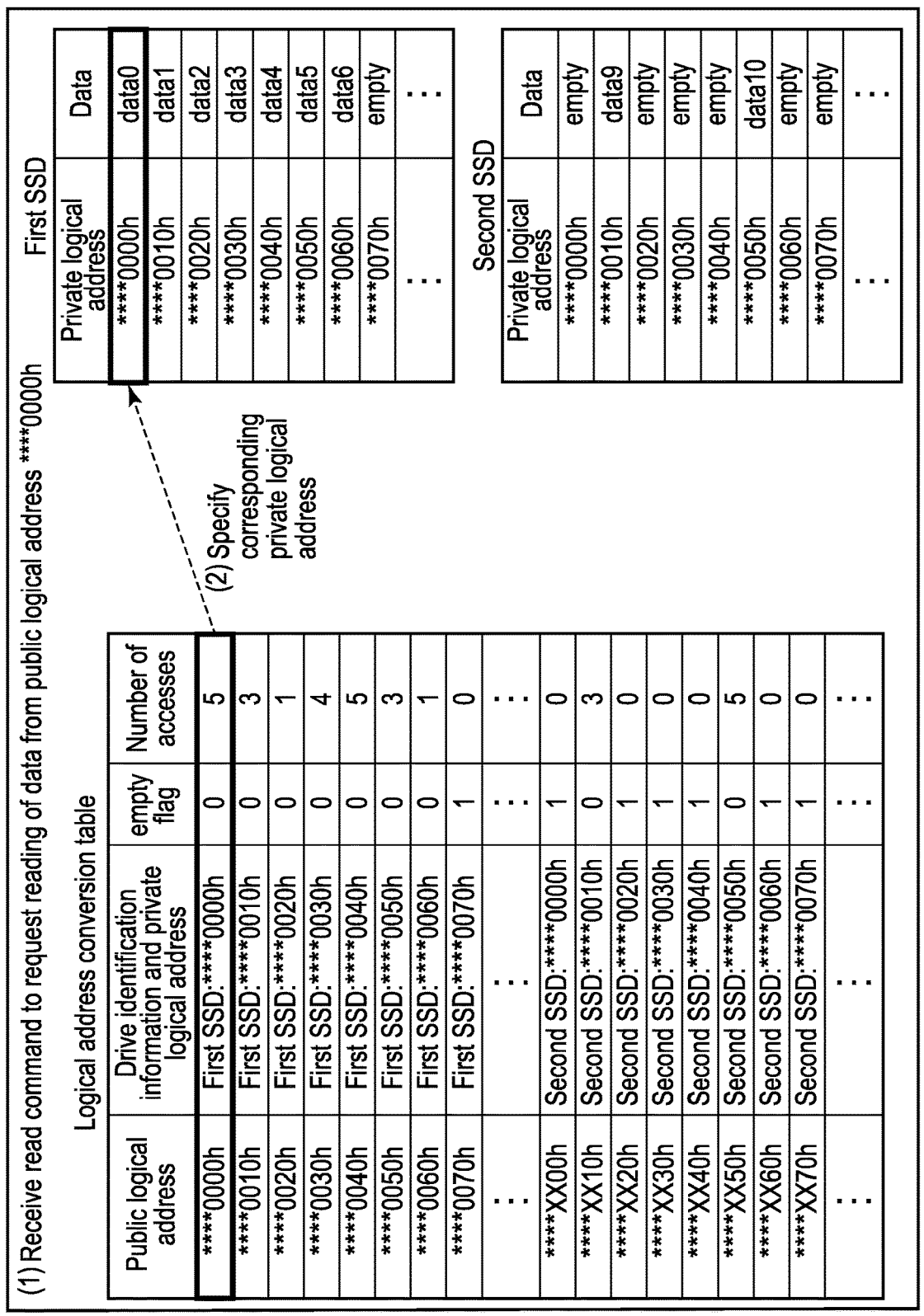
FIG. 13 is a diagram illustrating an example of an operation in accordance with a read request with respect to the memory system of the first embodiment.

Specifically, as illustrated in FIG. 13, the address control module 123 of the first SSD 3-1 receives a read command, which requests, for example, reading of data from a public logical address **0000h, from the host 2 via the first network I/F 11-1. The address control module 123 specifies a private logical address 0000h of the first SSD 3-1 corresponding to the public logical address 0000h by using the logical address conversion table 23**.

Then, as illustrated in FIG. 14, the read control module 122 reads data from the private logical address **0000h and transmits the data to the host 2. Specifically, the read control module 122 specifies a physical address in the NAND memory 5 corresponding to the private logical address 0000h by using the logical-to-physical address conversion table 22. The read control module 122 reads data0 from the physical address. The read control module 122 transmits the data0 to the host 2 via the first network I/F 11-1**.

Then, the address control module 123 updates the logical address conversion table 23 to change the number of accesses of the public logical address ****0000h from 5 to 6 by adding 1.

Through the read operation, the address control module 123 and the read control module 122 can read data from the NAND memory 5 of the first SSD 3-1 when the public logical address designated in the read command from the host 2 is associated with the private logical address of the first SSD 3-1.

(Read Operation Example 2)

Another example of a read operation in a case where a read command is received from the host 2 will be explained with reference to FIGS. 15 and 16. In this example, the read operation in a case where a public logical address designated in the read command is associated with a private logical address of the second SSD 3-2 will be explained.

Specifically, as illustrated in FIG. 15, the address control module 123 of the first SSD 3-1 receives a read command, which requests, for example, reading of data from a public logical address **XX10h, from the host 2 via the first network I/F 11-1. The address control module 123 specifies a private logical address 0010h of the second SSD 3-2 corresponding to the public logical address XX10h by using the logical address conversion table 23**.

Figure 16:
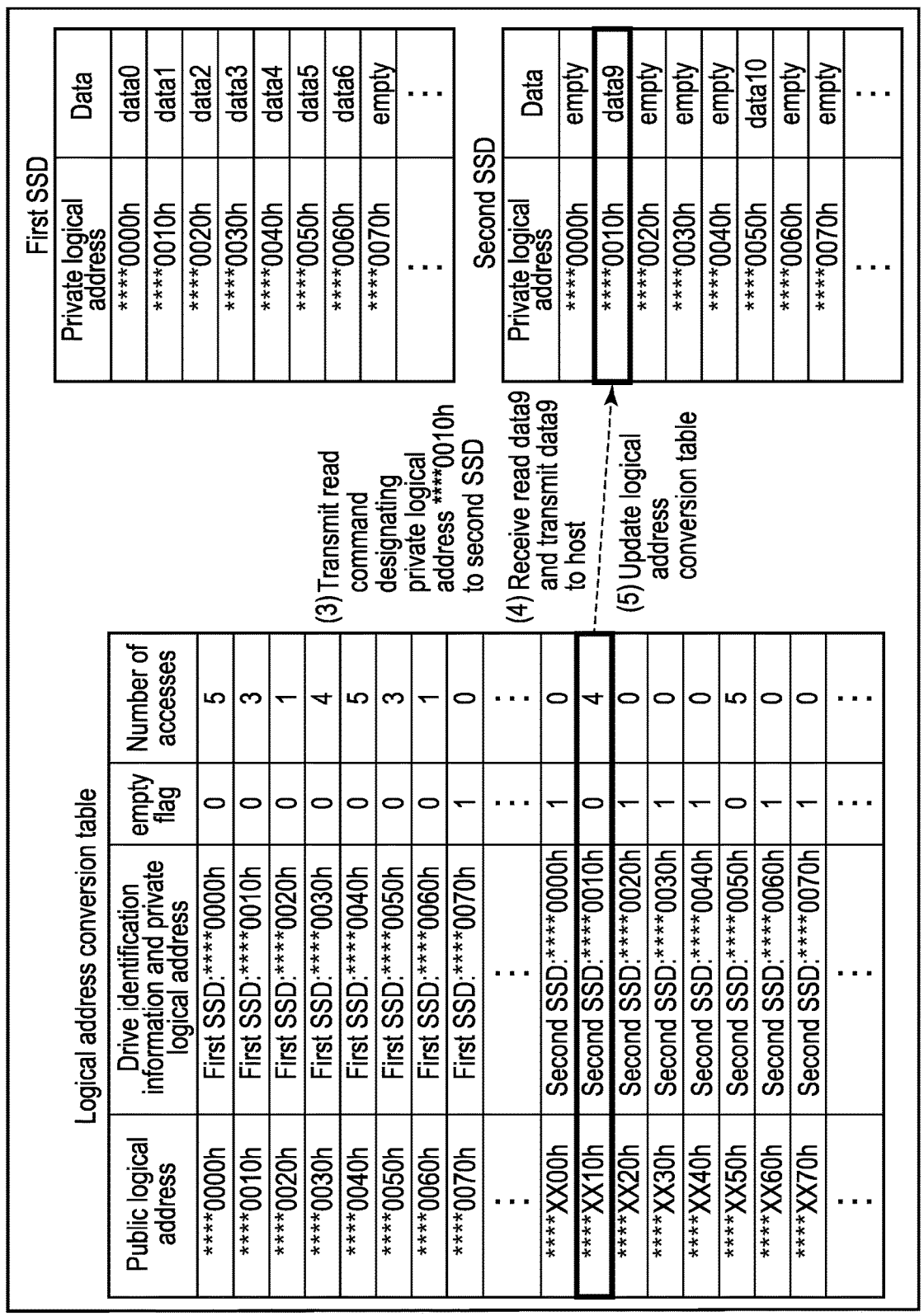
FIG. 16 is a diagram illustrating an example of an operation subsequent to the operation of FIG. 15.

Then, as illustrated in FIG. 16, the address control module 123 transmits a read command, which requests reading of data from the private logical address **0010h, to the second SSD 3-2. That is, the address control module 123 transmits the read command designating the private logical address 0010h to the second SSD 3-2**.

In the second SSD 3-2, data9 is read from the private logical address **0010h in accordance with the read command. Specifically, a read control module 122 of the second SSD 3-2 specifies a physical address of the NAND memory 5 of the second SSD 3-2 corresponding to the private logical address 0010h by using the logical-to-physical address conversion table 22 in the second SSD 3-2. The read control module 122 reads the data9 from the physical address. Then, the read control module 122 transmits the read data9 to the first SSD 3-1**.

The address control module 123 of the first SSD 3-1 receives the data9 from the second SSD 3-2 via the second network I/F 11-2. The address control module 123 transmits the received data9 to the host 2 via the first network I/F 11-1. Then, the address control module 123 updates the logical address conversion table 23 to change the number of accesses of the public logical address ****XX10h from 3 to 4 by adding 1.

Through the above read operation, the address control module 123 reads the data from the NAND memory 5 of the second SSD 3-2 when the public logical address designated in the read command from the host 2 is associated with the private logical address of the second SSD 3-2.

Note that the address control module 123 may determine that the data read from the second SSD 3-2 is hot data, and migrate the data to the first SSD 3-1.

An example of an operation to migrate data, which is read from the second SSD 3-2, to the first SSD 3-1 (hereinafter may be referred to as migrate operation) will be explained with reference to FIGS. 17 and 18. The address control module 123 may perform the migration operation after the read operation explained with reference to FIGS. 15 and 16. That is, the address control module 123 may perform the migrate operation as a part of the read operation.

Figure 17:
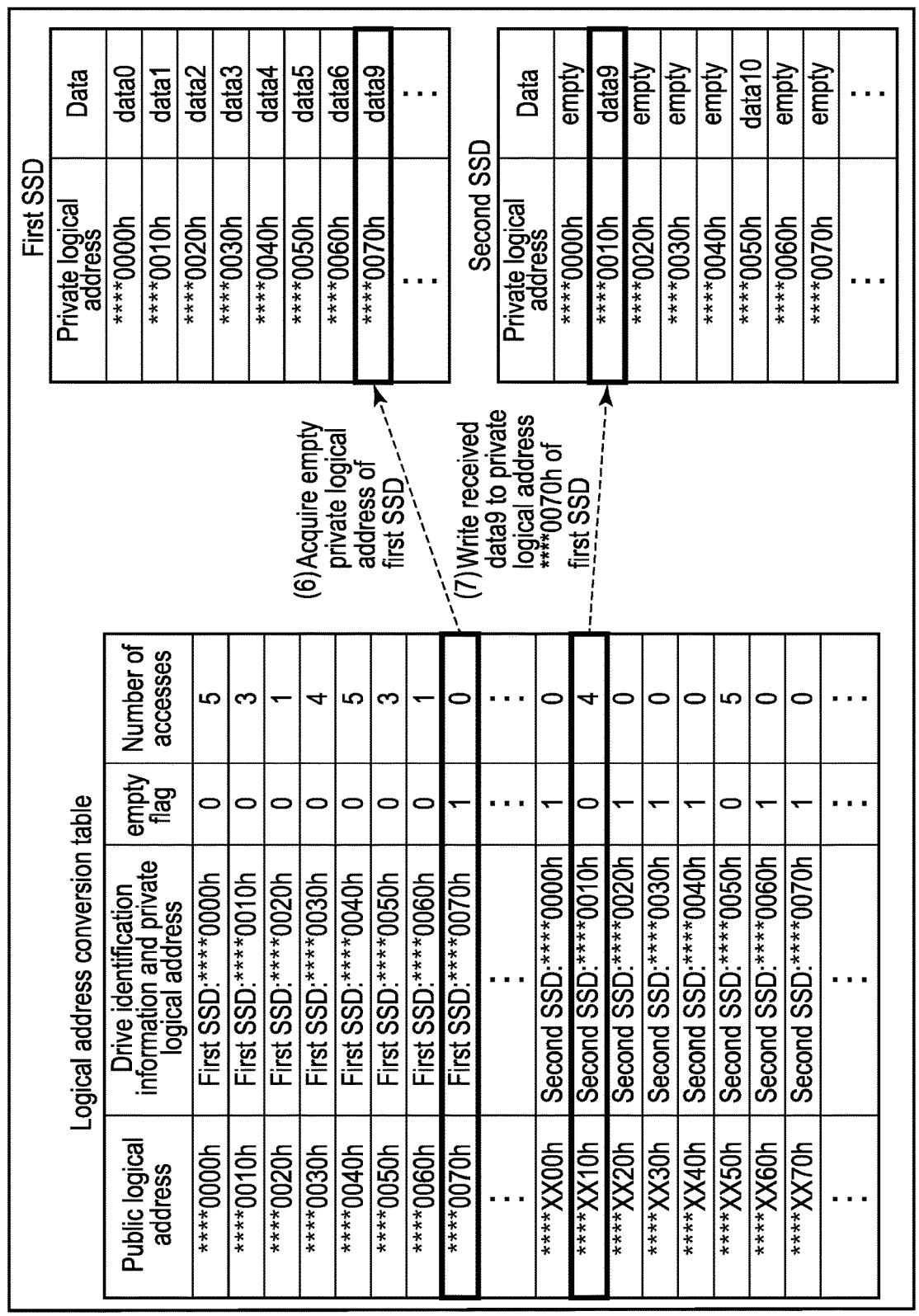
FIG. 17 is a diagram illustrating an example of an operation subsequent to the operation of FIG. 16.

Specifically, as illustrated in FIG. 17, the address control module 123 of the first SSD 3-1 acquires an empty private logical address of the first SSD 3-1. In this example, the address control module 123 selects a private logical address **0070h of the first SSD 3-1**.

The write control module 121 writes the data9 to the private logical address **0070h of the first SSD 3-1. Specifically, the write control module 121 determines a physical address in the NAND memory 5 to which the data9 is to be written and writes the data9 to the physical address. The data9 is kept in the read buffer. Thus, when the data9 is written to the NAND memory 5, the write control module 121 simply reads the data9 from the read buffer. The write control module 121 updates the logical-to-physical address conversion table 22 such that the physical address is associated with the private logical address **0070h.

Figure 18:
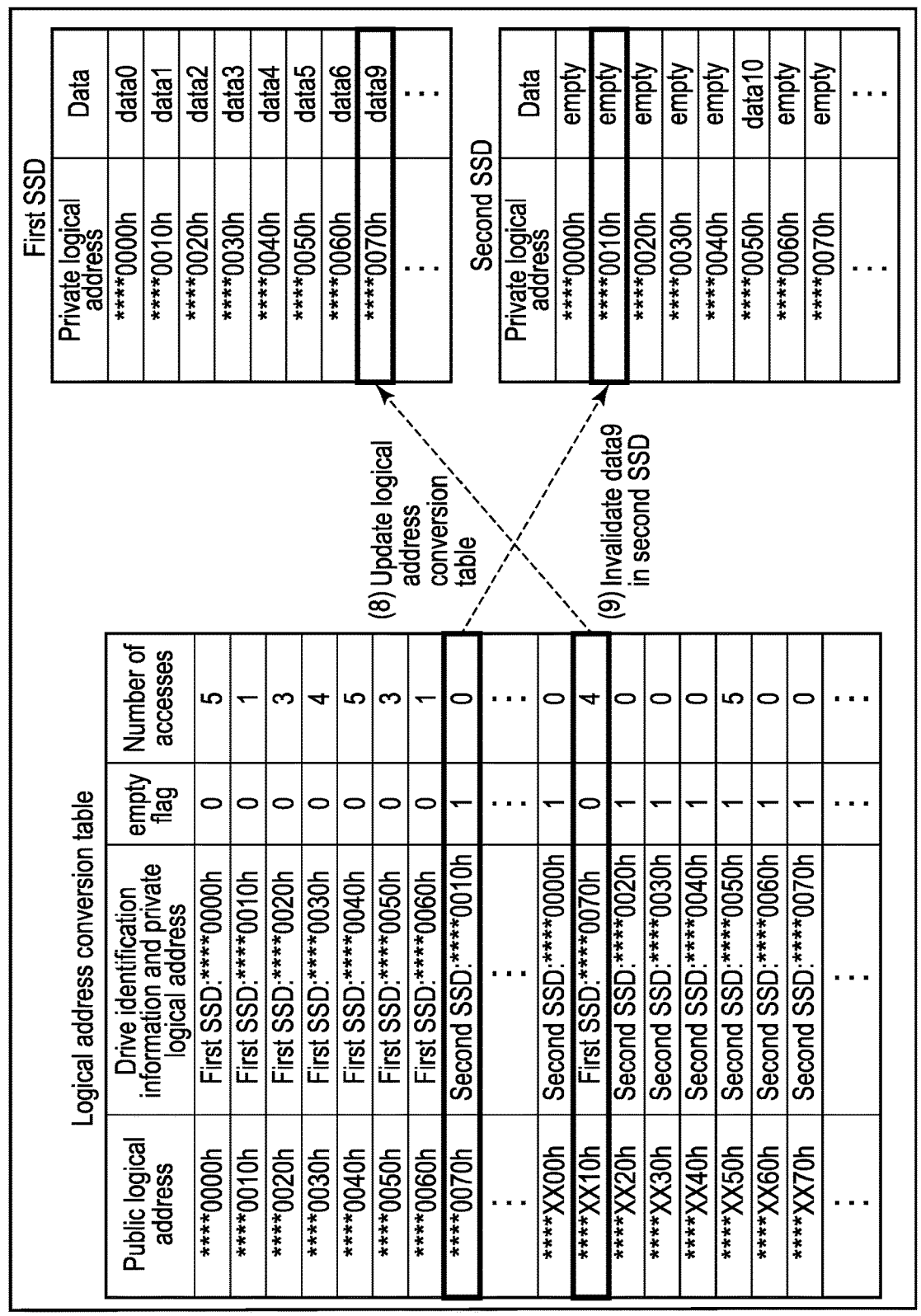
FIG. 18 is a diagram illustrating an example of an operation subsequent to the operation of FIG. 17.

Then, as illustrated in FIG. 18, the address control module 123 updates the logical address conversion table 23 to change the correspondence between the public logical addresses and the private logical addresses. Specifically, the address control module 123 associates the private logical address **0010h of the second SSD 3-2 with the public logical address 0070h. The address control module 123 associates the private logical address 0070h of the first SSD 3-1 with the public logical address XX10h. Note that the address control module 123 does not update the empty flag or the number of accesses in the entry including the public logical address *0070h, and the empty flag or the number of accesses in the entry including the public logical address ****XX10h.

Furthermore, the address control module 123 invalidates the data9 stored in the private logical address **0010h of the second SSD 3-2. Specifically, the address control module 123 transmits, for example, an unmap command designating the private logical address 0010h to the second SSD 3-2**.

In the second SSD 3-2, in accordance with the unmap command, the data9 stored in the private logical address **0010h is invalidated. For example, the address control module 123 of the second SSD 3-2 updates the logical-to-physical address conversion table 22 in the second SSD 3-2 such that the private logical address **0010h is not associated with any physical address.

Through the above migrate operation, the address control module 123 and the write control module 121 can migrate, even if the public logical address designated in the read command from the host 2 is associated with the private logical address of the second SSD 3-2, the data (host data) stored in the private logical address from the second SSD 3-2 to the first SSD 3-1. Furthermore, the address control module 123 associates the public logical address designated in the read command with the private logical address of the first SSD 3-1 to which the data is migrated. Thus, the corresponding data can be migrated to the first SSD 3-1 without changing the public logical address recognized by the host 2. Thus, latency of access by the host 2 with respect to the data can be shortened as compared to a case where the data is stored in the second SSD 3-2.

(Example of Migrate Operation of Cold Data)

The address control module 123 and the read control module 122 may migrate cold data from the first SSD 3-1 to the second SSD 3-2. The cold data is data having a relatively low possibility or frequency to be accessed by the host 2 as compared to the other data. Specifically, the cold data is data associated with a public logical address with low access frequency. The public logical address with low access frequency is, for example, a public logical address the number of accesses of which is below a threshold value.

By migrating the cold data to the second SSD 3-2, a free area to store data can be secured in the first SSD 3-1 in which the latency of access by the host 2 is shorter. The address control module 123 and the read control module 122 migrates the cold data from the first SSD 3-1 to the second SSD 3-2 when the available capacity of the first SSD 3-1 becomes less (for example, becomes below a threshold value).

Figure 19:
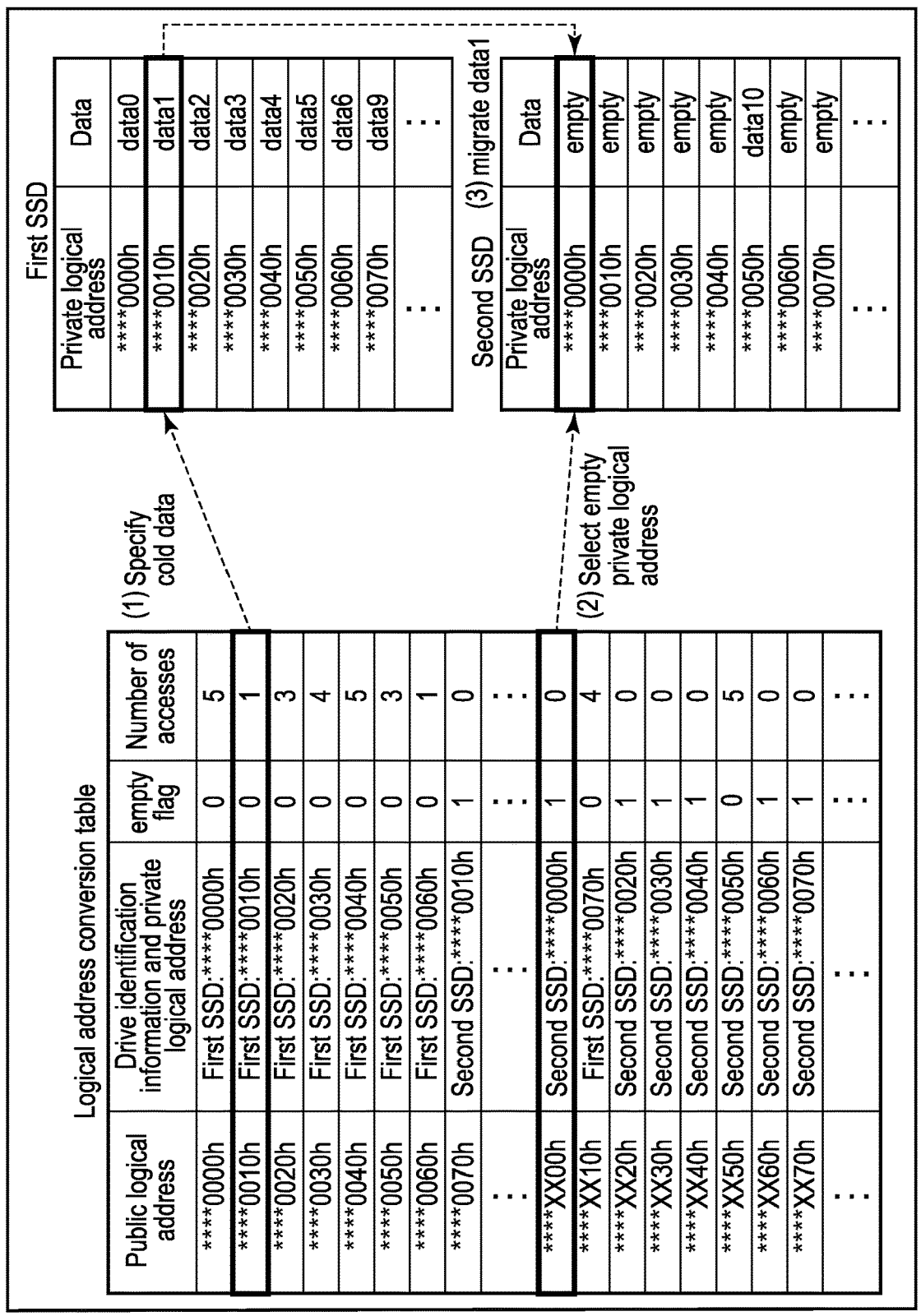
FIG. 19 is a diagram illustrating an operation to migrate cold data from the memory system to another memory system according to the first embodiment.
Figure 20:
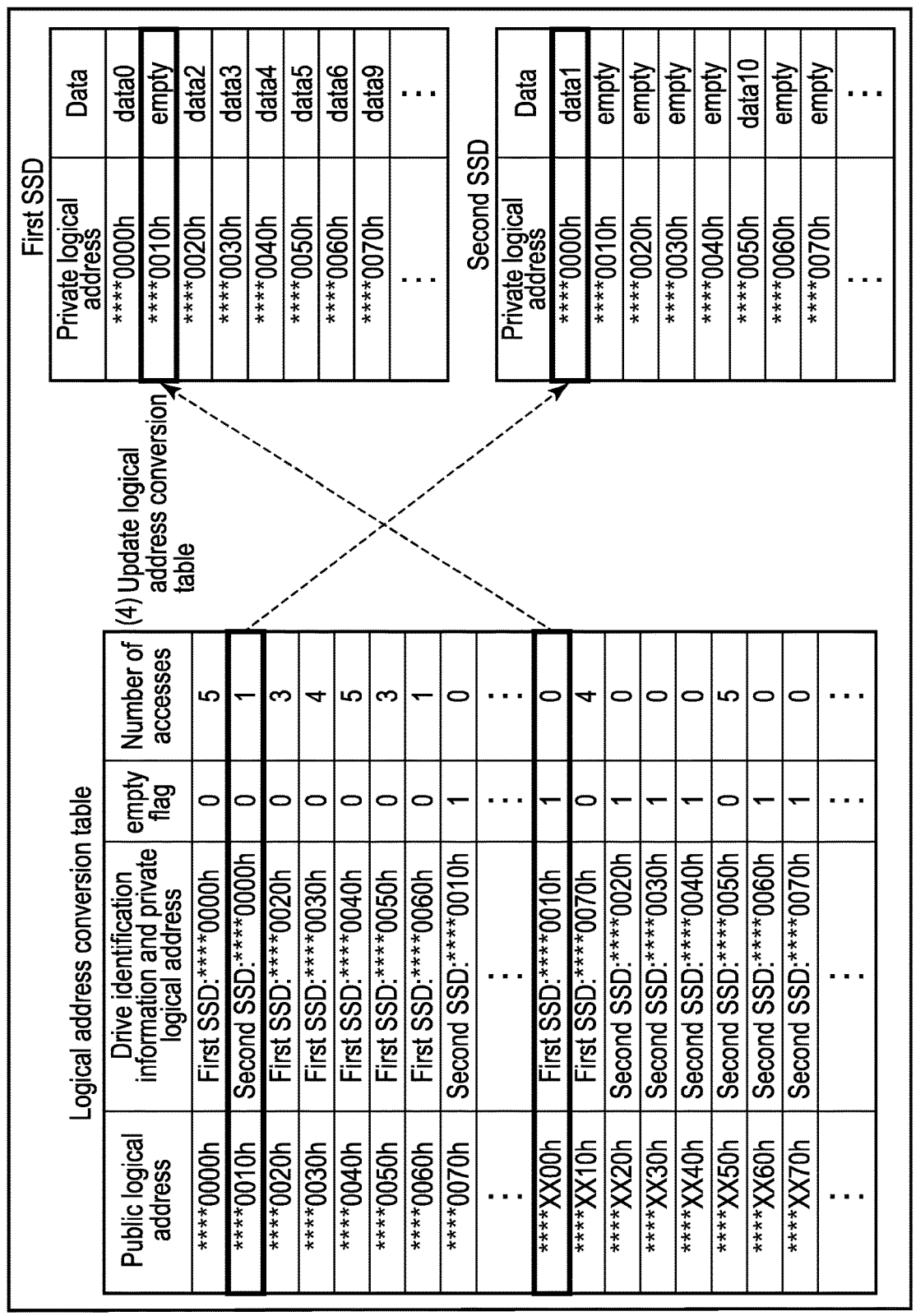
FIG. 20 is a diagram illustrating an example of an operation subsequent to the operation of FIG. 19.

An example of an operation to migrate cold data from the first SSD 3-1 to the second SSD 3-2 with reference to FIGS. 19 and 20.

Firstly, the address control module 123 of the first SSD 3-1 uses the logical address conversion table 23 to specify cold data in the first SSD 3-1. Specifically, the address control module 123 selects, from the entries in the logical address conversion table 23 each including the private logical address of the first SSD 3-1, one of the entries each including the number of accesses below a threshold value. That is, data stored in the private logical address, which is indicated in the selected entry, is cold data. In this example, the address control module 123 specifies data stored in the private logical address **0010h of the first SSD 3-1 (i.e., data1) as cold data. Note that the address control module 123** may specify cold data using various statistics related to access frequency with respect to each public logical address instead of the number of accesses.

Then, the address control module 123 uses the logical address conversion table 23 to select an empty private logical address of the second SSD 3-2. In this example, the address control module 123 selects a private logical address **0000h of the second SSD 3-2** as an empty private logical address.

The address control module 123 and the read control module 122 migrate the data1, which is stored in the private logical address **0010h of the first SSD 3-1, to the private logical address 0000h of the second SSD 3-2. Specifically, the read control module 122 reads the data1 from the private logical address 0010h of the first SSD 3-1. Then, the address control module 123 transmits a write command designating the private logical address 0000h and the read data1 to the second SSD 3-2. Thus, the data1 is written to the private logical address 0000h in the second SSD 3-2**.

Then, the address control module 123 invalidates the data1 stored in the private logical address **0010h of the first SSD 3-1. Specifically, the address control module 123 updates the logical-to-physical address conversion table 22 such that the private logical address 0010h is not associated with any physical address. As above, the data1 is migrated from the first SSD 3-1 to the second SSD 3-2**.

Then, as illustrated in FIG. 20, the address control module 123 updates the logical address conversion table 23 to change the correspondence between the public logical addresses and the private logical addresses. Specifically, the address control module 123 associates the private logical address \*\*\*\*0000h of the second SSD 3-2 with the public logical address \*\*\*\*0010h. The address control module 123 associates the private logical address \*\*\*\*0010h of the first SSD 3-1 with the public logical address \*\*\*\*XX00h. Note that the address control module 123 does not update the empty flag and the number of accesses in the entry including the public logical address \*\*\*\*0010h, and the empty flag and the number of accesses in the entry including the public logical address \*\*\*\*XX00h.

Through the above operation, the address control module 123 and the read control module 122 migrate the cold data in the first SSD 3-1 to the second SSD 3-2. Thus, a free area to store data can be secured in the first SSD 3-1.

(Example of Migrate Operation of Hot Data)

The address control module 123 and the write control module 121 may migrate hot data from the second SSD 3-2 to the first SSD 3-1. By migrating the hot data to the first SSD 3-1, latency of access to the hot data by the host 2 can be shortened.

Figure 22:
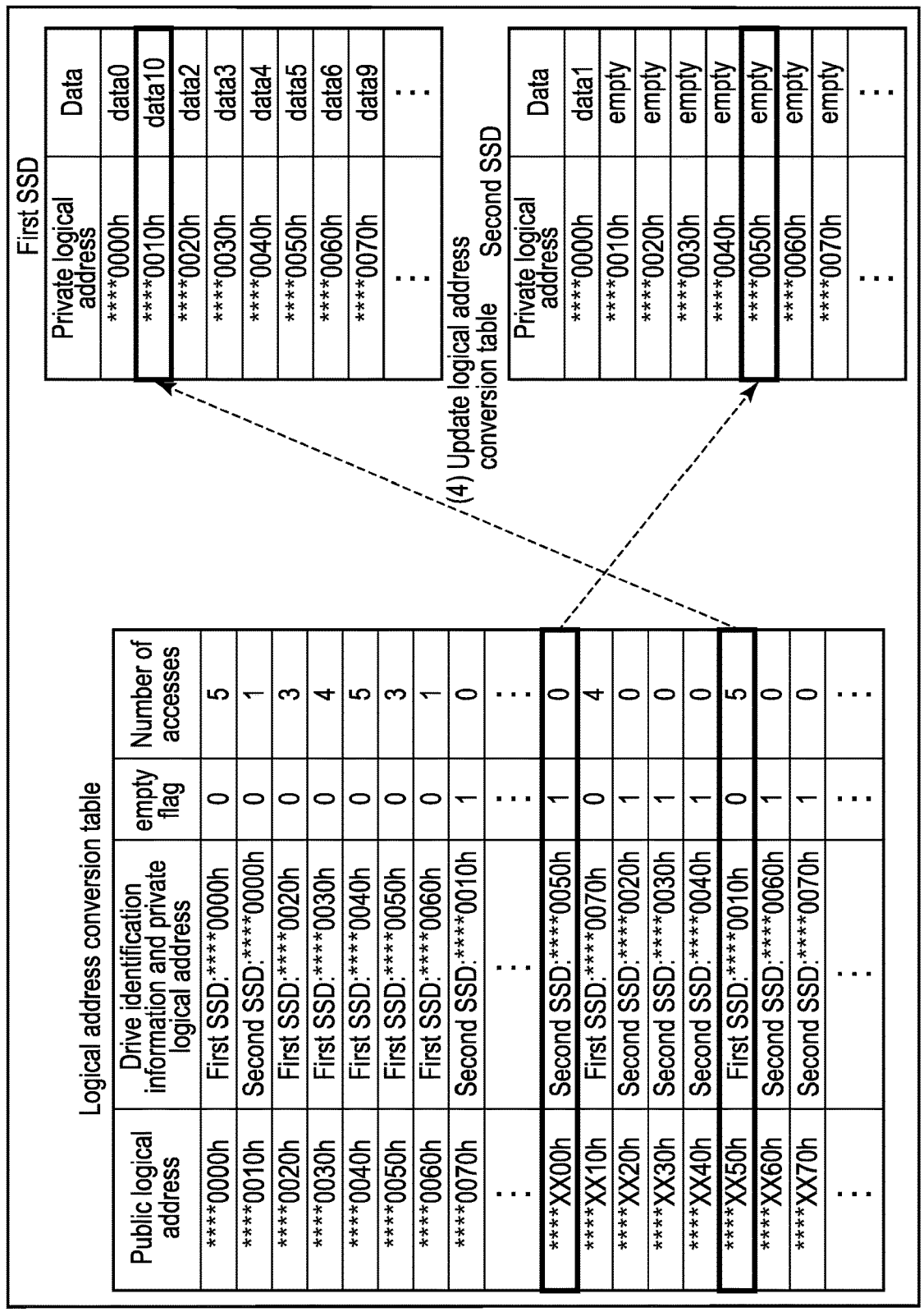
FIG. 22 is a diagram illustrating an example of an operation subsequent to the operation of FIG. 21.

An example of an operation to migrate hot data from the second SSD 3-2 to the first SSD 3-1 with reference to FIGS. 21 and 22.

Firstly, the address control module 123 of the first SSD 3-1 uses the logical address conversion table 23 to specify hot data in the second SSD 3-2. Specifically, the address control module 123 selects, from entries in the logical address conversion table 23 each including a private logical address of the second SSD 3-2, one of the entries each including the number of accesses that exceeds a threshold value. That is, data stored in the private logical address indicated in the selected entry is hot data. In this example, the address control module 123 specifies data stored in a private logical address \*\*\*\*0050h of the second SSD 3-2 (i.e., data10) as hot data. Note that the address control module 123 may specify the hot data using various statistics related to access frequency with respect to each public logical address instead of the number of accesses.

Then, the address control module 123 uses the logical address conversion table 23 to select an empty private logical address of the first SSD 3-1. In this example, the address control module 123 selects a private logical address \*\*\*\*0010h of the first SSD 3-1 as an empty private logical address.

The address control module 123 and the write control module 121 migrate the data10, which is stored in private logical address \*\*\*\*0050h of the second SSD 3-2, to the private logical address \*\*\*\*0010h of the first SSD 3-1. Specifically, the address control module 123 transmits a read command designating the private logical address \*\*\*\*0050h to the second SSD 3-2. Thus, in the second SSD 3-2, the data10 is read from the private logical address \*\*\*\*0050h and is transmitted to the first SSD 3-1. The address control module 123 receives the data10 from the second SSD 3-2. Then, the write control module 121 writes the received data10 to the private logical address \*\*\*\*0010h.

Then, the address control module 123 invalidates the data10 stored in the private logical address \*\*\*\*0050h of the second SSD 3-2. Specifically, the address control module 123 transmits, for example, an unmap command designating the private logical address \*\*\*\*0050h to the second SSD 3-2.

In the second SSD 3-2, the data10 stored in the private logical address \*\*\*\*0050h is invalidated in accordance with the unmap command. For example, the address control module 123 of the second SSD 3-2 updates the logical-to-physical address conversion table 22 in the second SSD 3-2 such that the private logical address \*\*\*\*0050h is not associated with any physical address. As above, the data10 is migrated from the second SSD 3-2 to the first SSD 3-1.

Then, as illustrated in FIG. 22, the address control module 123 updates the logical address conversion table 23 to change the correspondence of the public logical addresses and the private logical addresses. Specifically, the address control module 123 associates the private logical address \*\*\*\*0050h of the second SSD 3-2 with the public logical address \*\*\*\*XX00h. The address control module 123 associates the private logical address \*\*\*\*0010h of the first SSD 3-1 with the public logical address \*\*\*\*XX50h. Note that the address control module 123 does not update the empty flag or the number of accesses in the entry including the public logical address \*\*\*\*XX00h, and the empty flag or the number of the entry including the public logical address \*\*\*\*XX50h.

Through the above operation, the address control module 123 and the write control module 121 migrate hot data in the second SSD 3-2 to the first SSD 3-1. Thus, the latency of access to the data by the host 2 can be shortened as compared to a case where the data is stored in the second SSD 3-2.

(Detachment of SSD Storing Only Cold Data)

An SSD 3 may store only cold data. For example, through the aforementioned migration of cold data from the first SSD 3-1 to the second SSD 3-2 and the aforementioned migration of hot data from the second SSD 3-2 to the first SSD 3-1, the second SSD 3-2 may become a state of storing only cold data.

FIG. 23 illustrates an example where the second SSD 3-2 stores only cold data. For example, when all the numbers of accesses of entries each including a private logical address of the second SSD 3-2 in the logical address conversion table 23 are below a threshold value, the address control module 123 determines that the second SSD 3-2 stores only cold data. In the example of FIG. 23, when all the numbers of accesses in entries each including a private logical address of the second SSD 3-2 are below 3, the address control module 123 determines that the second SSD 3-2 stores only cold data.

When the second SSD 3-2 storing only cold data is detached from the networks 9-1 and 9-2, the address control module 123 deletes the private logical addresses of the second SSD 3-2 from the logical address conversion table 23.

FIG. 24 illustrates an example where the private logical addresses of the second SSD 3-2 are deleted from the logical address conversion table 23 and the second SSD 3-2 is detached from the networks 9-1 and 9-2. In the example of FIG. 24, the private logical addresses of the second SSD 3-2 are deleted from the entries of the public logical addresses \*\*\*\*0010h, \*\*\*\*0040h to \*\*\*\*0070h, \*\*\*\*XX00h, \*\*\*\*XX30h, and \*\*\*\*XX60h in the logical address conversion table 23. Note that the information of the empty flag and the number of accesses may further be deleted from these entries.

Then, the connection control module 120 disconnects the connection with the second SSD 3-2 via the second network I/F 11-2. The connection control module 120 uses, for example, a Disconnect command of NVMe-oF to disconnect the connection with the second SSD 3-2. Thus, the second network I/F 11-2 used for the connection with the second SSD 3-2 is released, and may be used for a connection with another SSD 3, for example. Furthermore, the second SSD 3-2 may be physically detached from the networks 9-1 and 9-2. Note that, since the cold data is maintained in the second SSD 3-2, it can be used for data maintenance.

With the above configuration, accesses by the host 2 to the SSDs 3 on the networks 9-1 and 9-2 can be facilitated. The controller 4 of the first SSD 3-1 manages the logical address conversion table 23 indicative of a correspondence between first private logical addresses and second private logical addresses, and public logical addresses. Each of the first private logical addresses is a logical address to specify a location in the private logical address space that has a size corresponding to the capacity of the NAND memory 5 of the first SSD 3-1. Each of the second private logical addresses is a logical address to specify a location in the private logical address space that has a size corresponding to the capacity of the NAND memory 5 of another SSD 3. Each of the public logical addresses is a logical address to specify a location in the public logical address space that has a size corresponding to the sum of the capacities of the NAND memories 5 of the first SSD 3-1 and the other SSD 3. Then, upon receipt of an access request (for example, a write command or a read command) from the host 2, the controller 4 performs either a process corresponding to the access request to the NAND memory 5 of the first SSD 3-1 or a process to transmit the access request to the other SSD 3, by using the logical address conversion table 23. Thus, by establishing the connection with the first SSD 3-1, the host 2 can use not only the storage area of the NAND memory 5 of the first SSD 3-1 but also the storage area of the NAND memory 5 of the other SSD 3 that is connected with the first SSD 3-1. Thus, accesses to the SSDs 3 on the networks 9-1 and 9-2 by the host 2 can be facilitated.

FIG. 25 is a flowchart illustrating an example of a procedure of a connection control process executed by the CPU 12 of the first SSD 3-1. The CPU 12 starts the connection control process in accordance with, for example, a connection request by the host 2.

The CPU 12 establishes a connection with the host 2 via the first network I/F 11-1 (S101). Thus, the CPU 12 receives various commands from the host 2 and transmits data and responses corresponding to the received commands to the host 2 via the first network I/F 11-1.

Then, the CPU 12 determines whether a condition to connect a new blank SSD 3 (that is, spare drive) is satisfied (S102). The condition is, for example, the aforementioned first condition.

When the condition to connect a new blank SSD 3 is not satisfied (NO in S102), the CPU 12 returns to S102, and whether the condition to connect a new blank SSD 3 is satisfied is again determined.

When the condition to connect to a new blank SSD 3 is satisfied (YES in S102), the CPU 12 receives spare drive information from the spare drive management server 8 (S103). The spare drive information includes information of blank SSDs 3 on the second network 9-2 (for example, the second SSD 3-2 and the third SSD 3-3). Using the spare drive information, the CPU 12 establishes a connection with a new blank SSD 3 (for example, the second SSD 3-2) (S104). The CPU 12 establishes the connection with the SSD 3 via, for example, the second network I/F 11-2.

Then, the CPU 12 generates a logical address conversion table 23 corresponding to a public logical address space over the first SSD 3-1 and the new blank SSD 3 (S105). For example, in a case where the connection with the second SSD 3-2 is newly established in S104, the CPU 12 generates the logical address conversion table 23 corresponding to the public logical address space over the first SSD 3-1 and the second SSD 3-2. The public logical address space includes the private logical address space of the first SSD 3-1 and the private logical address space of the second SSD 3-2. The logical address conversion table 23 includes entries that corresponds to public logical addresses in the public logical address space, respectively.

Note that, in a case where a connection with the third SSD 3-3 is further established after establishing the connection with the second SSD 3-2 and generating the logical address conversion table 23, the CPU 12 may expand the logical address conversion table 23 to correspond to the public logical address space over the first SSD 3-1, second SSD 3-2 and third SSD 3-3. Specifically, the CPU 12 adds entries, which correspond to public logical addresses included in the expanded part, respectively, to the logical address conversion table 23 in order to expand the public logical address space such that the public logical address space further includes the third SSD 3-3.

After generating or expanding the logical address conversion table 23, the CPU 12 returns to S102. Thus, the CPU 12 may further establish a connection to a new blank SSD 3 in accordance with a result of determination whether the condition to connect a new blank SSD 3 is satisfied.

Through the above connection control process, the CPU 12 establishes a connection between the first SSD 3-1 and a new blank SSD 3 in accordance with a storage state of the NAND memory 5 of the first SSD 3-1, or storage states of the NAND memories 5 provided with the first SSD 3-1 and one or more SSDs 3 connected with the first SSD 3-1. When the connection with the blank SSD 3 is newly established, the CPU 12 generates or expands the logical address conversion table 23.

Figure 26:
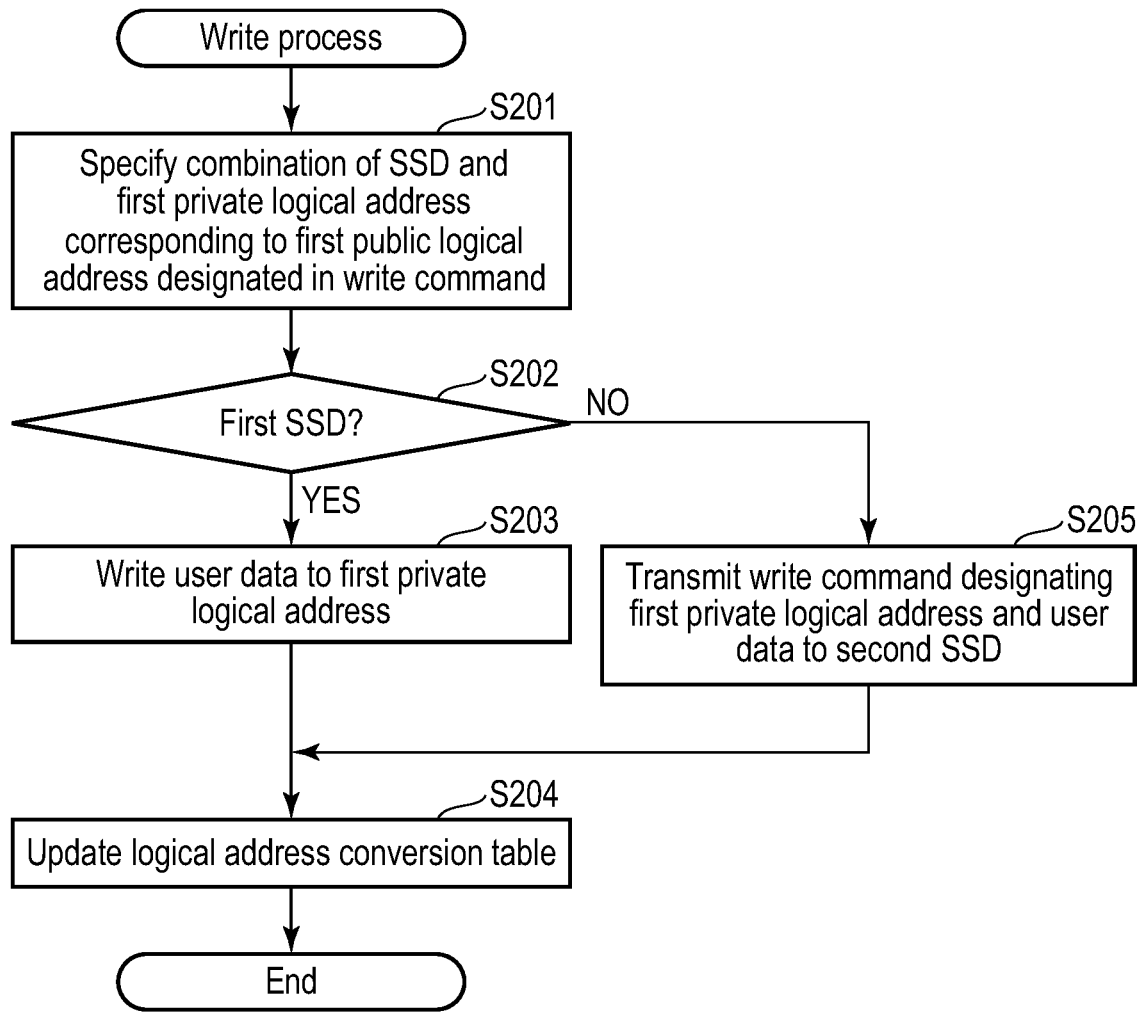
FIG. 26 is a flowchart illustrating an example of a procedure of a write process executed in the memory system of the first embodiment.

FIG. 26 is a flowchart illustrating an example of a procedure of a write process executed by the CPU 12 of the first SSD 3-1. Upon receipt of a write command from the host 2 via the first network I/F 11-1, the CPU 12 starts the execution of the write process. In this example, a case where the CPU 12 has established a connection between the first SSD 3-1 and the second SSD 3-2 via the second network I/F 11-2 will be explained.

The CPU 12 specifies a combination of an SSD 3 and a private logical address (hereinafter referred to as first private logical address) corresponding to a public logical address designated in the received write command (hereinafter referred to as first public logical address) by using the logical address conversion table 23 (S201). The CPU 12 determines whether the specified SSD 3 is the first SSD 3-1 (S202).

When the specified SSD 3 is the first SSD 3-1 (YES in S202), the CPU 12 writes user data, which is received with the write command, to the first private logical address (S203). Specifically, the CPU 12 determines a physical address in the NAND memory 5 to which the user data is to be written. The CPU 12 writes the user data to the determined physical address. Then, the CPU 12 updates the logical-to-physical address conversion table 22 such that the first private logical address is associated with the physical address.

Then, the CPU 12 updates the logical address conversion table 23 to increase the number of accesses to the designated first public logical address by one (S204), and ends the write process.

When the specified SSD 3 is not the first SSD 3-1 (NO in S202), that is, when the specified SSD 3 is the second SSD 3-2, the CPU 12 transmits, to the second SSD 3-2, a write command designating the first private logical address and the user data received with the write command from the host 2 (S205). In the second SSD 3-2, in accordance with the write command, the user data is written to the designated first private logical address with the procedure in a similar way of S203. Then, the CPU 12 updates the logical address conversion table 23 to increase the number of accesses to the designated first public logical address by one (S204), and ends the write process.

Through the write process, the CPU 12 can execute different procedures based on whether the first public logical address designated in the write command corresponds to a private logical address of the first SSD 3-1 or to a private logical address of the second SSD 3-2. Specifically, when the first public logical address corresponds to the first private logical address of the first SSD 3-1, the CPU 12 writes the user data to the first private logical address. On the other hand, when the first public logical address corresponds to the first private logical address of the second SSD 3-2, the CPU 12 transmits a write command designating the first private logical address and the user data to the second SSD 3-2. Thus, the user data is written to the first private logical address of the second SSD 3-2.

With the operation of the CPU 12 of the first SSD 3-1, when the host 2 transmits a write command designating a public logical address to the first SSD 3-1, user data is stored in the SSDs 3 connected via the network 9-2. That is, the CPU 12 of the first SSD 3-1 can provide the host 2 with a function to use the multiple physical SSDs 3 as a single logical storage.

Figure 27:
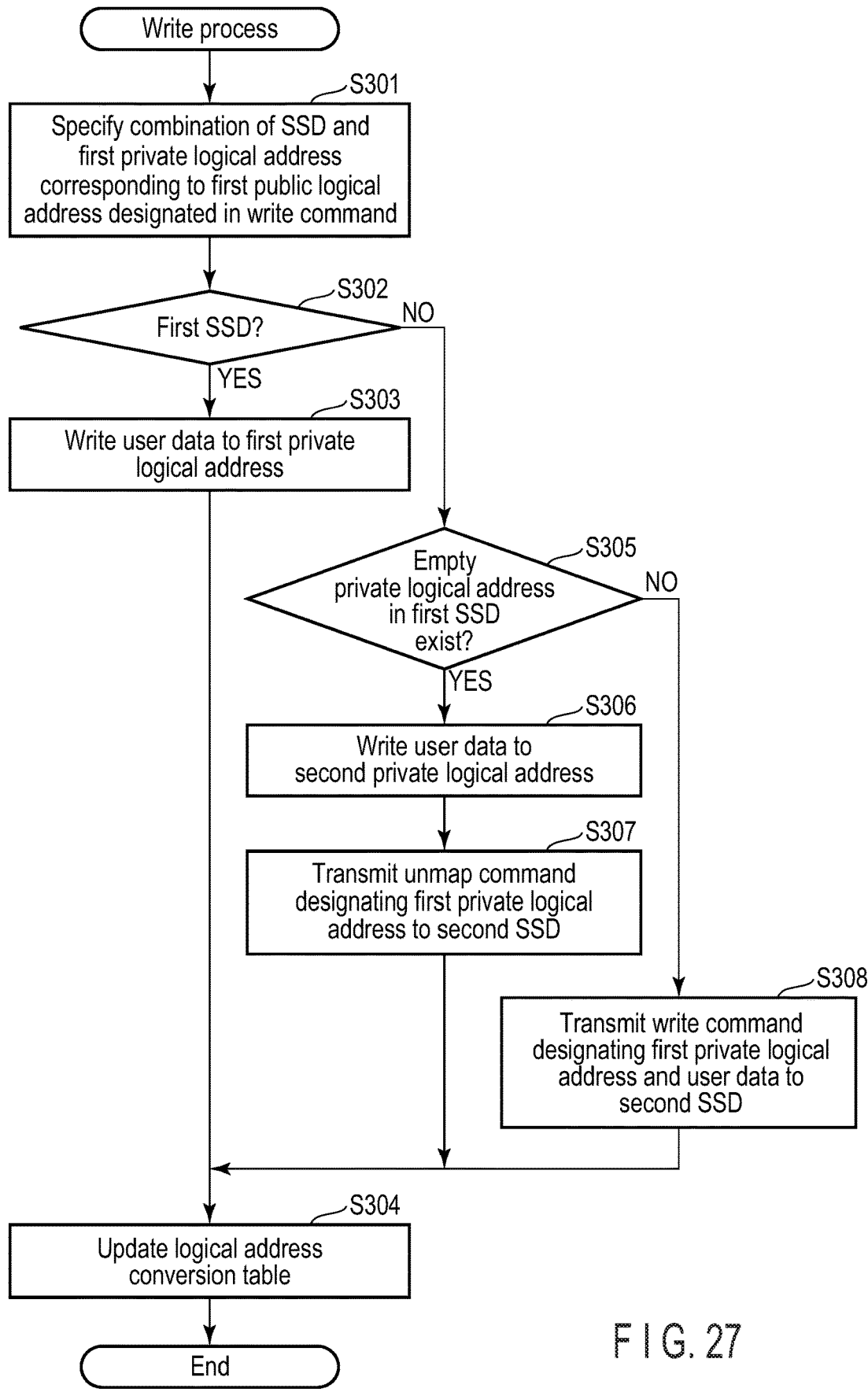
FIG. 27 is a flowchart illustrating another example of a procedure of a write process executed in the memory system of the first embodiment.

FIG. 27 is a flowchart illustrating another example of a procedure of a write process executed by the CPU 12 of the first SSD 3-1. The CPU 12 may execute the write process instead of executing the write process of FIG. 26. In the write process, the CPU 12 controls hot data to be written to a private logical address of the first SSD 3-1. In the other example, when a public logical address designated in a write command corresponds to a private logical address of the second SSD 3-2, the CPU 12 determines that user data received with the write command is hot data.

Steps S301 to S304 are the same as the steps S201 to S204 described above with reference to the flowchart of FIG. 26.

When the SSD 3 corresponding to the first public logical address designated in the received write command is not the first SSD 3-1 (NO in S302), that is, when the SSD 3 corresponding to the first public logical address is the second SSD 3-2, the CPU 12 determines whether there is an empty private logical address in the first SSD 3-1 (S305).

When there is an empty private logical address in the first SSD 3-1 (hereinafter referred to as second private logical address) (YES in S305), the CPU 12 writes user data, which is received with the write command, to the second private logical address (S306). Specifically, the CPU 12 determines a physical address in the NAND memory 5 to which the user data is to be written. The CPU 12 writes the user data to the determined physical address. Then, the CPU 12 updates the logical-to-physical address conversion table 22 such that the second private logical address is associated with the physical address. Note that, before the user data is written, the second private logical address is associated with a second public logical address that is different from the first public logical address in the logical address conversion table 23.

Then, the CPU 12 transmits an unmap command designating the first private logical address to the second SSD 3-2 (S307). Then, the CPU 12 updates the logical address conversion table 23 (S304), and ends the write process. Specifically, the CPU 12 updates the logical address conversion table 23 to associate the first public logical address with the second private logical address of the first SSD 3-1, associate the second public logical address with the first private logical address of the second SSD 3-2, and increase the number of accesses of the first public logical address by one. Note that, if the first private logical address is an empty private logical address of the second SSD 3-2, the CPU 12 may not transmit the unmap command to the second SSD 3-2 in S307.

Furthermore, when there is not an empty private logical address in the first SSD 3-1 (NO in S305), the CPU 12 transmits, to the second SSD 3-2, a write command designating the first private logical address and the user data that is received with the write command from the host 2 (S308). In the second SSD 3-2, in accordance with the write command, the user data is written to the designated first private logical address. Then, the CPU 12 updates the logical address conversion table 23 to increase the number of accesses to the first public logical address by one (S304), and ends the write process.

Through the write process, when the first public logical address designated in the write command corresponds to the first private logical address of the second SSD 3-2, the CPU 12 can write the user data to the empty second private logical address of the first SSD 3-1 instead of the first private logical address of the second SSD 3-2. The CPU 12 updates the logical address conversion table 23 such that the first public logical address is associated with the second private logical address of the first SSD 3-1 to which the user data is written, and the second public logical address, which was associated with the second private logical address, is associated with the first private logical address of the second SSD 3-2.

As above, the CPU 12 stores user data to be written in accordance with a write command (that is, hot data) to the first SSD 3-1 directly connected to the host 2 via the first network 9-1 instead of the second SSD 3-2 connected to the first SSD 3-1 via the second network 9-2. Thus, as compared to a case where the user data is stored in the second SSD 3-2, latency of accesses to the user data by the host 2 can be shortened.

Figure 28:
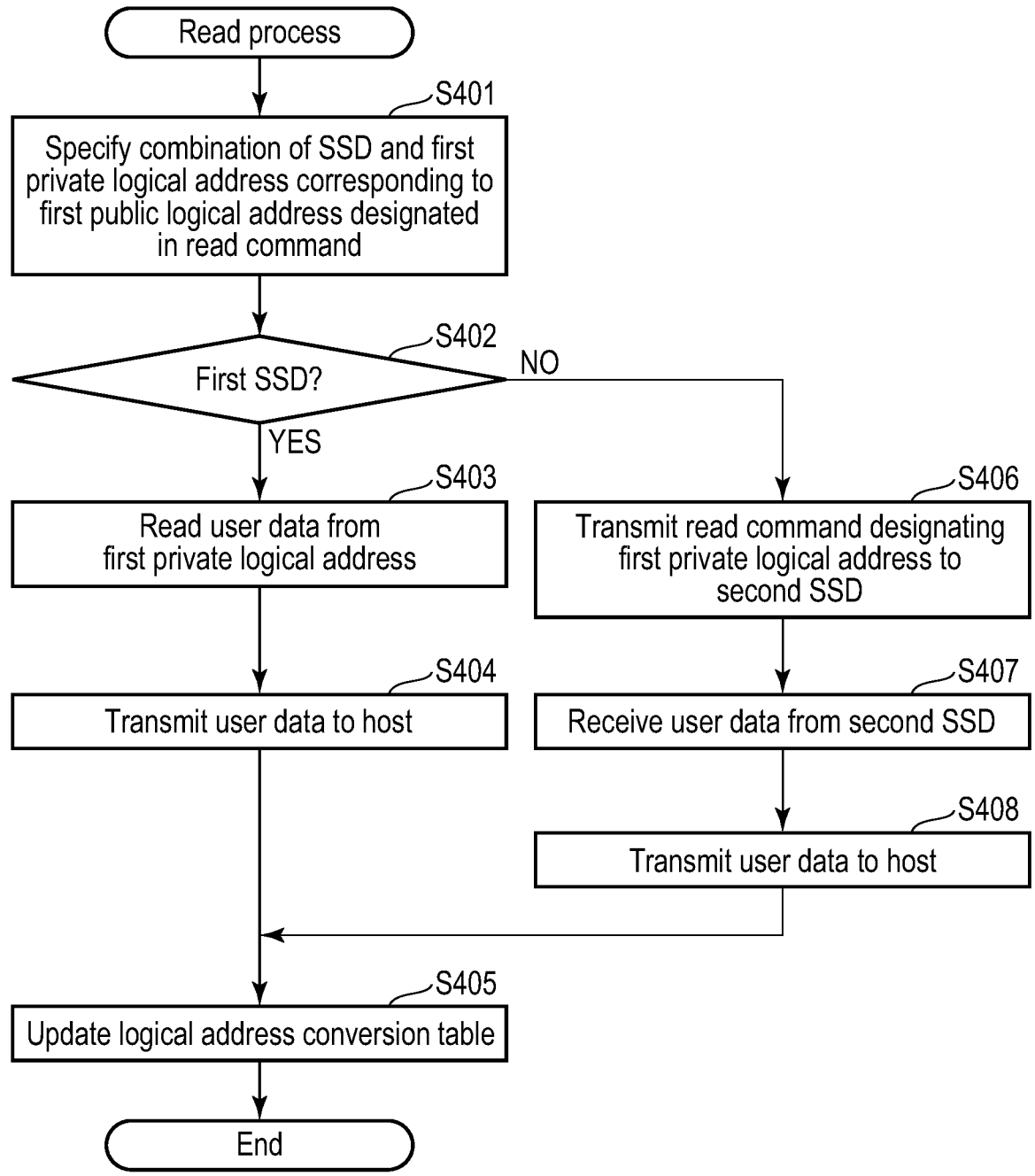
FIG. 28 is a flowchart illustrating an example of a procedure of a read process executed in the memory system of the first embodiment.

FIG. 28 is a flowchart illustrating an example of a procedure of a read process executed by the CPU 12 of the first SSD 3-1. The CPU 12 starts the execution of the read process upon receipt of a read command from the host 2 via the first network I/F 11-1. In this example, a case where the CPU 12 has established a connection between the first SSD 3-1 and the second SSD 3-2 via the second network I/F 11-2 will be explained.

The CPU 12 specifies a combination of an SSD 3 and a private logical address (hereinafter referred to as first private logical address) corresponding to a public logical address designated in the received read command (hereinafter referred to as first public logical address) by using the logical address conversion table 23 (S401). The CPU 12 determines whether the specified SSD 3 is the first SSD 3-1 (S402).

When the specified SSD 3 is the first SSD 3-1 (YES in S402), the CPU 12 reads user data from the first private logical address (S403). Specifically, the CPU 12 uses the logical-to-physical address conversion table 22 to specify the physical address in the NAND memory 5 corresponding to the first private logical address. Then, the CPU 12 reads the user data from the physical address.

Then, the CPU 12 transmits the read user data to the host 2 via the first network I/F 11-1 (S404). Then, the CPU 12 updates the logical address conversion table 23 to increase the number of accesses to the first public logical address by one (S405), and ends the read process.

Furthermore, when the specified SSD 3 is not the first SSD 3-1 (NO in S402), that is, when the specified SSD 3 is the second SSD 3-2, the CPU 12 transmits a read command designating the first private logical address to the second SSD 3-2 (S406). In the second SSD 3-2, in accordance with the read command, user data is read from the first private logical address and is transmitted to the first SSD 3-1 through the procedure in a similar way of S403 and S404.

The CPU 12 receives the user data from the second SSD 3-2 (S407). The CPU 12 transmits the received user data to the host 2 (S408). Then, the CPU 12 updates the logical address conversion table 23 to increase the number of accesses to the first public logical address by one (S405), and ends the read process.

Through the above read process, the CPU 12 can execute different procedures based on whether the public logical address designated by the read command corresponds to the private logical address of the first SSD 3-1 or to the private logical address of the second SSD 3-2. Specifically, when the public logical address corresponds to the private logical address of the first SSD 3-1, the CPU 12 reads the user data from the private logical address. On the other hand, when the public logical address corresponds to the private logical address of the second SSD 3-2, the CPU 12 transmits the read command designating the private logical address to the second SSD 3-2. Thus, the user data is read from the private logical address of the second SSD 3-2, and is transmitted to the first SSD 3-1.

With the above operation of the CPU 12 of the first SSD 3-1, when the host 2 transmits a read command designating a public logical address to the first SSD 3-1, user data is read from the SSDs 3 mutually connected via the network 9-2. That is, the CPU 12 of the first SSD 3-1 can provide the host 2 with a function for using the multiple physical SSDs 3 as a single logical storage.

Figure 29:
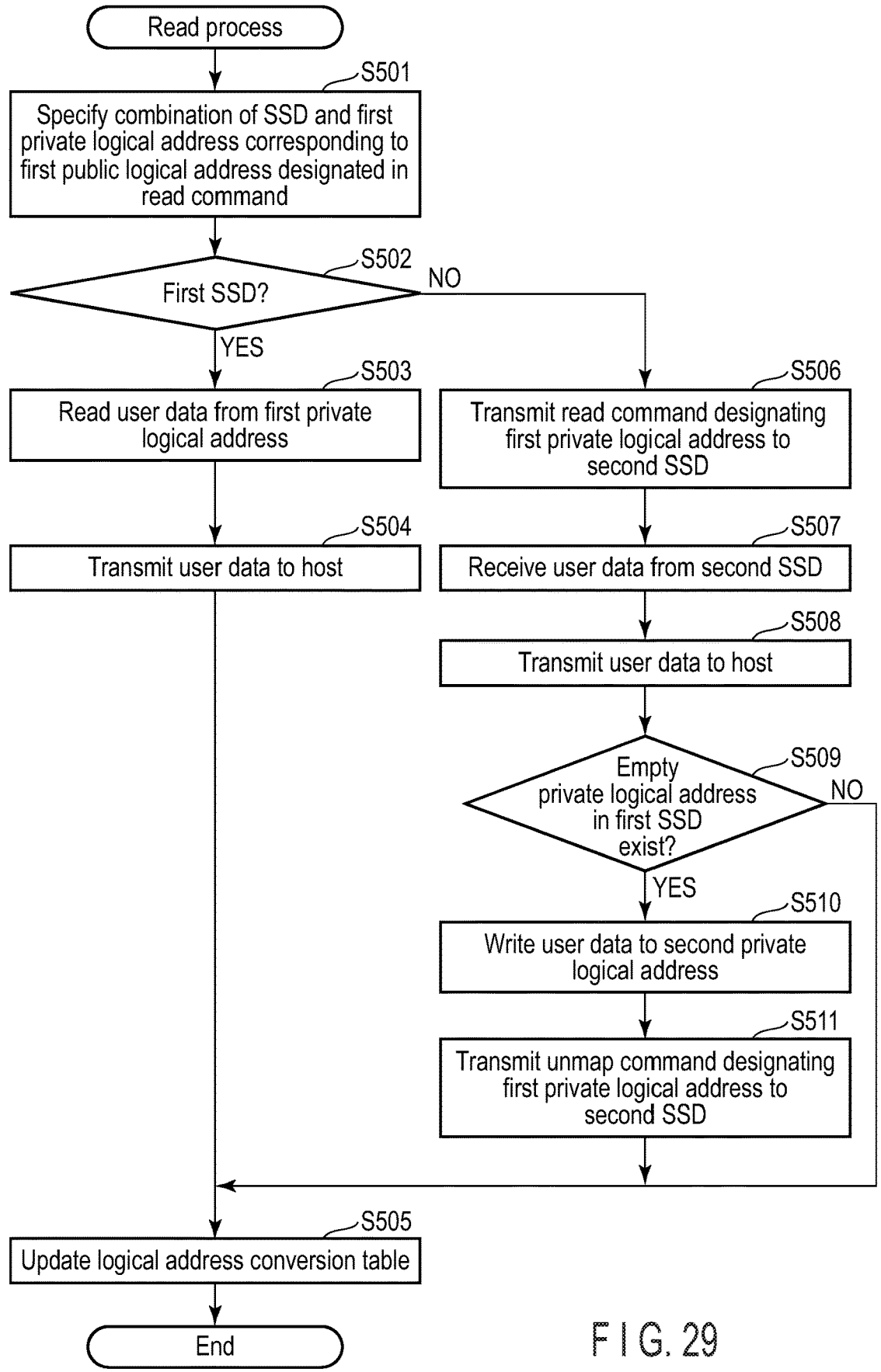
FIG. 29 is a flowchart illustrating another example of a procedure of a read process executed in the memory system of the first embodiment.

FIG. 29 is a flowchart illustrating another example of a procedure of a read process executed by the CPU 12 of the first SSD 3-1. The CPU 12 may execute the read process instead of executing the read process of FIG. 28. In this read process, the CPU 12 controls hot data, which is read in accordance with a read command, to be written to a private logical address of the first SSD 3-1. In the other example, when a public logical address designated in the read command corresponds to a private logical address of the second SSD 3-2, the CPU 12 determines that user data read from the private logical address is hot data.

Steps S501 to S508 are the same as S401 to S408 described above with reference to the flowchart of FIG. 28.

After transmitting the user data, which is read from the first private logical address of the second SSD 3-2, to the host 2 in S508, the CPU 12 determines whether there is an empty private logical address in the first SSD 3-1 (S509).

When there is an empty private logical address in the first SSD 3-1 (hereinafter referred to as second private logical address) (YES in S509), the CPU 12 writes the read user data to the second private logical address (S510). Specifically, the CPU 12 determines a physical address in the NAND memory 5 to which the user data is to be written. The CPU 12 writes the user data to the determined physical address. Then, the CPU 12 updates the logical-to-physical address conversion table 22 such that the second private logical address is associated with the physical address. Note that, before the user data is written, the second private logical address is associated with a second public logical address that is different from the first public logical address, in the logical address conversion table 23.

Then, the CPU 12 transmits an unmap command designating the first private logical address to the second SSD 3-2 (S511). Thus, in the second SSD 3-2, the user data associated with the first private logical address is invalidated. That is, the logical-to-physical address conversion table 22 used in the second SSD 3-2 is updated such that no physical address is associated with the first private logical address.

Then, the CPU 12 updates the logical address conversion table 23 (S505), and ends the read process. Specifically, the CPU 12 updates the logical address conversion table 23 to associate the first public logical address with the second private logical address of the first SSD 3-1, associate the second public logical address with the first private logical address of the second SSD 3-2, and increase the number of accesses to the first public logical address by one.

When there is not an empty private logical address in the first SSD 3-1 (NO in S509), the CPU 12 updates the logical address conversion table 23 to increase the number of accesses to the first public logical address by one (S505), and ends the read process.

Through the above read process, when the public logical address designated in the read command corresponds to the first private logical address of the second SSD 3-2, the CPU 12 can write the user data read from the first private logical address to an empty second private logical address of the first SSD 3-1. The CPU 12 updates the logical address conversion table 23 such that the first public logical address is associated with the second private logical address and the second public logical address, which was associated with the second private logical address, is associated with the first private logical address of the second SSD 3-2.

As above, the CPU 12 stores the user data, which is read in accordance with the read command (that is, hot data), to the first SSD 3-1 directly connected to the host 2 via the first network 9-1 instead of the second SSD 3-2 connected to the first SSD 3-1 via the second network 9-2. Thus, latency of access to the user data by the host 2 can be shortened as compared to a case where the user data is stored in the second SSD 3-2.

FIG. 30 illustrates an example of a procedure of a cold data migration process executed by the CPU 12 of the first SSD 3-1. The cold data migration process is a process to migrate cold data from the first SSD 3-1 to the second SSD 3-2. The CPU 12 executes the cold data migration process when, for example, the first SSD 3-1 is in an idle state and cold data is stored in a private logical address of the first SSD 3-1. The idle state is, for example, a state in which the load of the process by the first SSD 3-1 (specifically, the controller 4) is below a threshold value. Note that it is assumed that there is an empty private logical address in the second SSD 3-2.

The CPU 12 selects a private logical address (hereinafter referred to as first private logical address) associated with cold data stored in the NAND memory 5 of the first SSD 3-1 (S601). Specifically, the CPU 12 select, from entries each including a private logical address of the first SSD 3-1, one of entries each including the number of accesses below a threshold value, by using the logical address conversion table 23. The private logical address indicated in the selected one entry is a private logical address of cold data. In the logical address conversion table 23, the first private logical address is associated with a first public logical address.

The CPU 12 reads cold data from the first private logical address (S602). Specifically, the CPU 12 uses the logical-to-physical address conversion table 22 to specify the physical address in the NAND memory 5 corresponding to the first private logical address. Then, the CPU 12 reads the cold data from the specified physical address.

Then, the CPU 12 acquires an empty private logical address of the second SSD 3-2 (hereinafter referred to as second private logical address) (S603). In the logical address conversion table 23, the second private logical address is associated with a second public logical address. The CPU 12 transmits a write command designating the second private logical address and the read cold data to the second SSD 3-2 (S604). Thus, in the second SSD 3-2, the cold data is written to the second private logical address.

The CPU 12 updates the logical address conversion table 23 such that the first public logical address is associated with the second private logical address and the second public logical address is associated with the first private logical address (S605). Then, the CPU 12 invalidates the cold data stored in the first private logical address of the first SSD 3-1 (S606). Specifically, the CPU 12 updates the logical-to-physical address conversion table 22 such that the first private logical address is not associated with any physical address. Thus, the first private logical address becomes an empty private logical address.

Then, the CPU 12 determines whether there is another private logical address storing cold data in the first SSD 3-1 (S607). When there is another private logical address storing cold data (YES in S607), the CPU 12 returns to S601 to perform a process to migrate the cold data to the second SSD 3-2.

When there is not another private logical address storing cold data (NO in S607), the CPU 12 ends the cold data migration process.

Through the above cold data migration process, the CPU 12 migrates one or more pieces of cold data stored in the first SSD 3-1 to the second SSD 3-2. Thus, the CPU 12 secures a free area in the first SSD 3-1.

Figure 31:
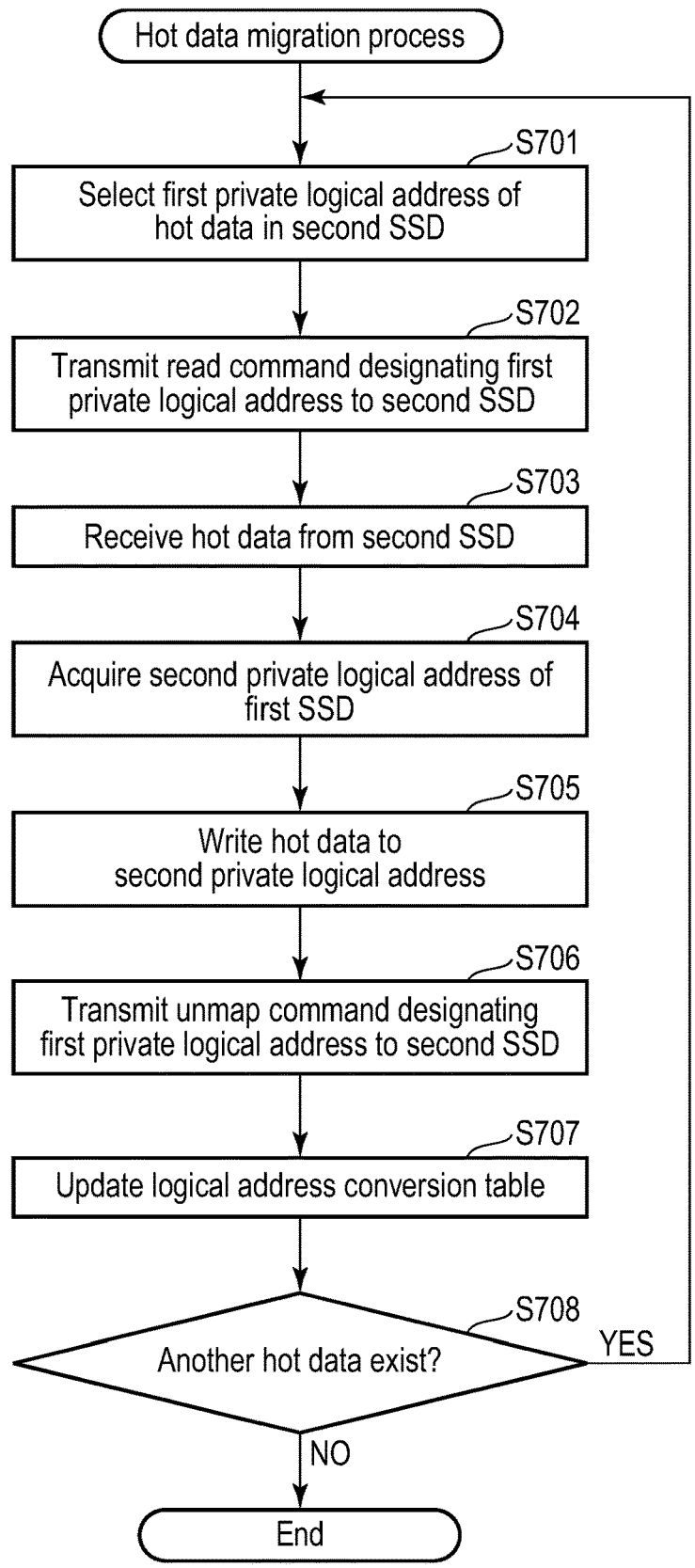
FIG. 31 is a flowchart illustrating an example of a procedure of a hot data migration process executed in the memory system of the first embodiment.

FIG. 31 illustrates an example of a procedure of a hot data migration process executed by the CPU 12 of the first SSD 3-1. The hot data migration process is a process to migrate hot data from the second SSD 3-2 to the first SSD 3-1. The CPU 12 executes the hot data migration process when, for example, the first SSD 3-1 is in an idle state and hot data is stored in a private logical address of the second SSD 3-2. Note that it is assumed that there is an empty private logical address in the first SSD 3-1.

The CPU 12 selects a private logical address associated with hot data stored in the NAND memory 5 of the second SSD 3-2 (hereinafter referred to as first private logical address) (S701). Specifically, the CPU 12 selects, from entries each including a private logical address of the second SSD 3-2, one of entries each including the number of accesses that exceeds a threshold value, by using the logical address conversion table 23. The private logical address indicated in the selected one entry is a private logical address of hot data. In the logical address conversion table 23, the first private logical address is associated with a first public logical address.

The CPU 12 transmits a read command designating the first private logical address to the second SSD 3-2 (S702). In the second SSD 3-2, in accordance with the read command, user data is read from the first private logical address and is transmitted to the first SSD 3-1. The CPU 12 receives the read hot data from the second SSD 3-2 (S703).

Then, the CPU 12 acquires an empty private logical address of the first SSD 3-1 (hereinafter referred to as second private logical address) (S704). In the logical address conversion table 23, the second private logical address is associated with a second public logical address. The CPU 12 writes the received hot data to the second private logical address (S705). Specifically, the CPU 12 determines a physical address in the NAND memory 5 to which the hot data is to be written. The CPU 12 writes the hot data to the determined physical address. Then, the CPU 12 updates the logical-to-physical address conversion table 22 such that the physical address is associated with the second private logical address.

Then, the CPU 12 transmits an unmap command designating the first private logical address to the second SSD 3-2 (S706). Thus, in the second SSD 3-2, the hot data associated with the first private logical address is invalidated. That is, the logical-to-physical address conversion table 22 used in the second SSD 3-2 is updated such that any physical address is not associated with the first private logical address. Thus, the first private logical address becomes an empty private logical address.

The CPU 12 updates the logical address conversion table 23 such that the first public logical address is associated with the second private logical address and the second public logical address is associated with the first private logical address (S707).

Then, the CPU 12 determines whether there is another private logical address storing hot data in the second SSD 3-2 (S708). When there is another private logical address storing hot data (YES in S708), the CPU 12 returns to S701 to perform a process to migrate the hot data to the first SSD 3-1.

When there is not another private logical address storing hot data (NO in S708), the CPU 12 ends the hot data migration process.

Through the above hot data migration process, the CPU 12 can migrate one or more pieces of hot data stored in the second SSD 3-2 to the first SSD 3-1. Thus, the CPU 12 can shorten latency of access to the hot data by the host 2.

Second Embodiment

In the first embodiment, in order to increase a physical storage capacity that can be used by the host 2, the first SSD 3-1 establishes a connection with a blank second SSD 3-2 and manages a public logical address space over the first SSD 3-1 and the second SSD 3-2. The public logical address space recognized by the host 2 corresponds to a space over the private logical address space of the first SSD 3-1 and the private logical address space of the second SSD 3-2.

In contrast, in a second embodiment, a first SSD 3-1 establishes a connection with a blank second SSD 3-2 and performs data migration from the first SSD 3-1 to the second SSD 3-2. The public logical address space recognized by the host 2 transitions from a state corresponding to the private logical address space of the first SSD 3-1 to a state corresponding to the private logical address space of the second SSD 3-2, in accordance with the data migration.

The configuration of the information processing system 1 according to the second embodiment is the same as the information processing system 1 of the first embodiment. The second embodiment and the first embodiment differ only in the configuration in which the first SSD 3-1 uses the connected second SSD 3-2 as a data migration destination. Hereinafter, the differences from the first embodiment will be mainly described.

The connection control module 120 establishes, when the first SSD 3-1 satisfies a condition to connect a new blank SSD 3 (spare drive) (hereinafter referred to as second condition), a connection with another SSD (for example, second SSD 3-2). The second condition is a condition in which the CPU 12 starts data migration from the first SSD 3-1 to the other SSD 3. The second condition is, for example, a degree of wear-out of the NAND memory 5 in the first SSD 3-1 that exceeds a threshold value. The degree of wear-out is statistics of the number of P/E cycles of each block in the NAND memory 5. The statistics may be, for example, a total value of P/E cycles executed in the NAND memory 5, that is, a sum of the numbers of P/E cycles of all blocks in the NAND memory 5, or may be an average value of the numbers of P/E cycles of all block in the NAND memory 5. In this example, all blocks in the NAND memory 5 may be all blocks other than blocks storing only management data. Furthermore, the statistics may be a maximum value or a minimum value of the numbers of the P/E cycles of all blocks in the NAND memory 5.

The connection control module 120 receives spare drive information from the spare drive management server 8. The connection control module 120 establishes a connection with a blank SSD 3 via the second network I/F 11-2 by using the spare drive information. In the following description, a case where the connection control module 120 establishes a connection with the second SSD 3-2 will be explained. The second SSD 3-2 is used as a data migration destination SSD 3 to which data stored in the worn first SSD 3-1 is migrated.

FIG. 32 indicates an example of a correspondence between public logical addresses and private logical addresses before data migration. In the logical address conversion table 23 of FIG. 32, all public logical addresses are associated with any of the private logical addresses of the first SSD 3-1. That is, the public logical address space recognized by the host 2 corresponds to the private logical address space of the first SSD 3-1. The address control module 123 generates the logical address conversion table 23 in accordance with the establishment of the connection with the second SSD 3-2 by the connection control module 120.

Furthermore, in the currently used first SSD 3-1, data is stored in several private logical addresses. In the blank second SSD 3-2, data is not stored in any private logical address.

In the following description, several operation examples of the first SSD 3-1 and the second SSD 3-2 will be explained by using the logical address conversion table 23 and storage states of the first SSD 3-1 and the second SSD 3-2.

(Write Operation Example)

An example of a write operation in a case where a write command is received from the host 2 will be explained with reference to FIGS. 33 and 34. In this example, the write operation in a case where a public logical address designated in the write command is associated with a private logical address of the first SSD 3-1 will be explained.

Figure 33:
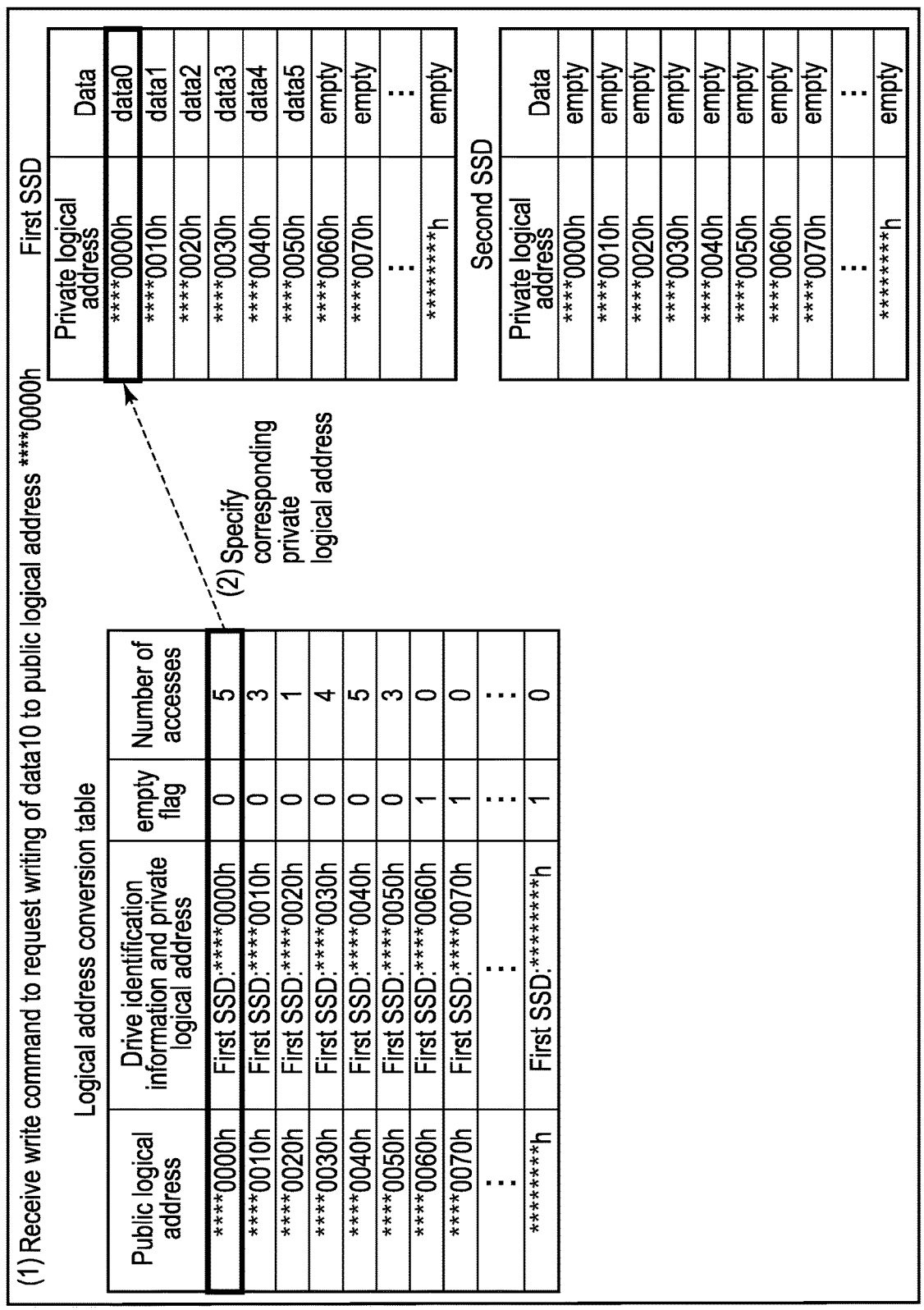
FIG. 33 is a diagram illustrating an example of an operation in accordance with a write request with respect to the memory system of the second embodiment.

Specifically, as illustrated in FIG. 33, the address control module 123 of the first SSD 3-1 receives, for example, a write command, which requests writing of data10 to a public logical address **0000h, from the host 2 via the first network I/F 11-1. The address control module 123 uses the logical address conversion table 23 to specify a private logical address 0000h of the first SSD 3-1 corresponding to the public logical address **0000h.

Figure 34:
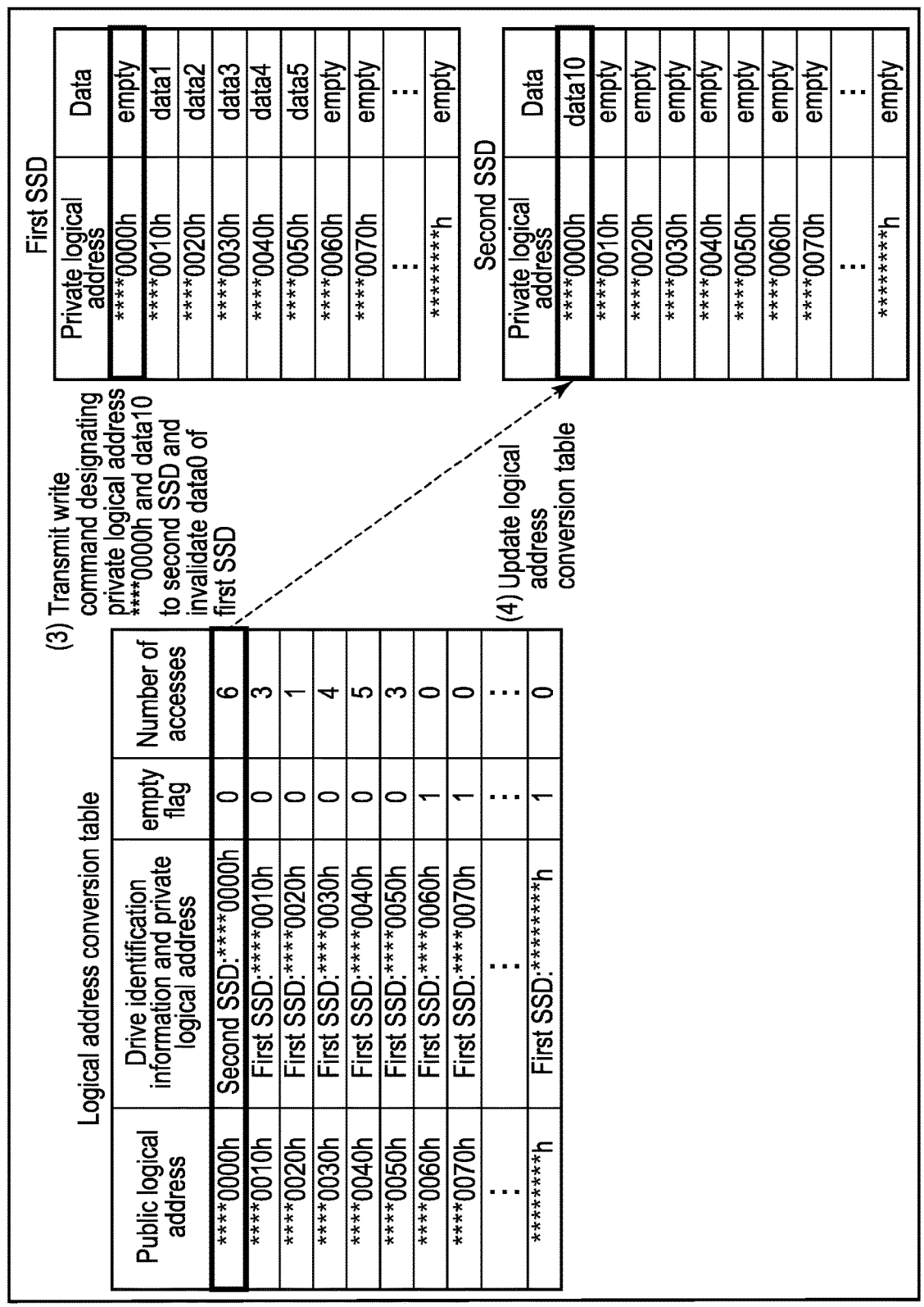
FIG. 34 is a diagram illustrating an example of an operation subsequent to the operation of FIG. 33.

Then, as illustrated in FIG. 34, the address control module 123 transmits a write command, which requests writing of the data 10 to the private logical address **000h, to the second SSD 3-2 via the second network I/F 11-2. Specifically, the address control module 123 transmits the write command designating the private logical address 0000h and the data10 to the second SSD 3-2**.

In the second SSD 3-2, in accordance with the write command, the data10 is written to the private logical address **000h. Specifically, the write control module 121 of the second SSD 3-2 determines a physical address in the NAND memory 5 to which the data10 is to be written. The write control module 121 writes the data10 to the physical address. The write control module 121 updates the logical-to-physical address conversion table 22 in the second SSD 3-2 such that the physical address is associated with the private logical address 0000h. Thus, the data10 is written to the private logical address 0000h of the second SSD 3-2**.

The private logical address **0000h of the first SSD 3-1 corresponding to the public logical address 0000h and the private logical address 0000h designated in the write command transmitted to the second SSD 3-2 are, for example, the same private logical address. Thus, the data10 to be written to a logical storage area in the first SSD 3-1 (for example, private logical address 0000h) can be written to a logical storage area of the second SSD 3-2 (for example, private logical address 0000h of the second SSD 3-2**).

Then, the address control module 123 invalidates data0 stored in the private logical address **0000h of the first SSD 3-1. Specifically, the address control module 123 updates the logical-to-physical address conversion table 22 such that any physical address is not associated with the private logical address 0000h. Since the data0 is not associated with any private logical address, the data0** becomes invalid data.

Then, the address control module 123 updates the logical address conversion table 23 to associate the public logical address **0000h with the private logical address 0000h of the second SSD 3-2 and change the number of accesses of the public logical address **0000h from 5 to 6 by adding 1.

Through the above write operation, when a public logical address designated in a write command from the host 2 is associated with a private logical address of the first SSD 3-1, the address control module 123 can write data, which is requested to be written, to the NAND memory 5 of the second SSD 3-2. That is, the address control module 123 can perform data migration from the first SSD 3-1 to the second SSD 3-2 in the write operation corresponding to the write command. The address control module 123 can change a write destination of data to the second SSD 3-2 from the first SSD 3-1 by changing the correspondence between the public logical addresses and the private logical addresses without changing the public logical addresses recognized by the host 2 at all.

Note that a write operation performed in a case where a public logical address designated in a write command is associated with a private logical address of the second SSD 3-2 is the same as explained above with reference to FIGS. 9 and 10 in the first embodiment.

(Read Operation Example)

A read operation performed in a case where a read command is received from the host 2 is the same as explained above with reference to FIGS. 13 to 16 in the first embodiment.

(Data Migration Operation Example)

An example of an operation to migrate data associated with a private logical address of the first SSD 3-1 to the second SSD 3-2 (hereinafter referred to as data migration operation) will be explained with reference to FIGS. 35 and 36. The address control module 123 and the read control module 122 performs the data migration operation at a time with less load, for example, while the first SSD 3-1 is in an idle state.

The address control module 123 selects a mapped private logical address of the first SSD 3-1 using the logical address conversion table 23. Specifically, the address control module 123 selects, from entries in the logical address conversion table 23 each including a private logical address of the first SSD 3-1, one of entries each including the empty flag field in which 0 is set. That is, the private logical address in the selected entry is a mapped private logical address of the first SSD 3-1. In the example of FIG. 35, the address control module 123 selects a private logical address ****0010h of the first SSD 3-1.

Then, the address control module 123 and the read control module 122 migrate data1 stored in the private logical address **0010h of the first SSD 3-1 to a corresponding private logical address 0010h of the second SSD 3-2. Specifically, the read control module 122 reads the data1 from the private logical address 0010h of the first SSD 3-1. The address control module 123 transmits a write command designating the private logical address 0010h and the read data1 to the second SSD 3-2. Thus, the data1 is written to the private logical address 0010h of the second SSD 3-2. Then, the address control module 123 of the first SSD 3-1 updates the logical-to-physical address conversion table 22 such that private logical address **0010h is not associated with any physical address to invalidate the data1 stored in the first SSD 3-1.

Figure 36:
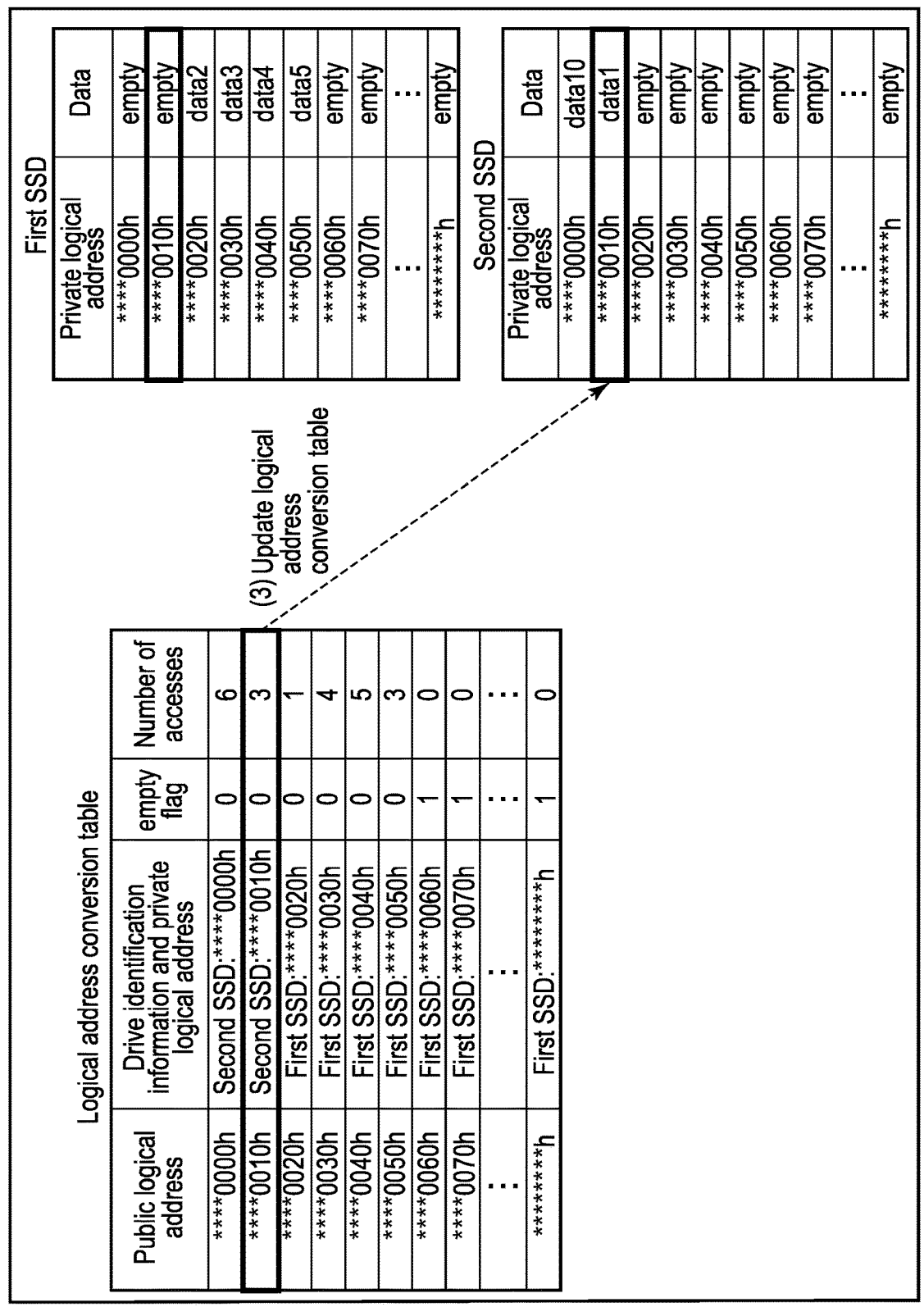
FIG. 36 is a diagram illustrating an example of an operation subsequent to the operation of FIG. 35.

Then, as illustrated in FIG. 36, the address control module 123 updates the logical address conversion table 23 such that public logical address **0010h is associated with private logical address **0010h of the second SSD 3-2.

By performing the above operation with respect to each of all pieces of valid data stored in the first SSD 3-1, the address control module 123 and the read control module 122 can complete migration of the pieces of valid data from the first SSD 3-1 to the second SSD 3-2.

Note that, in each entry including an empty private logical address of the first SSD 3-1 in the logical address conversion table 23, the empty private logical address of the first SSD 3-1 is replaced with a corresponding private logical address of the second SSD 3-2. Specifically, the address control module 123 selects, from the entries each including the private logical address of the first SSD 3-1 in the logical address conversion table 23, one of entries each including the empty flag field in which 1 is set. The private logical address in the selected entry is an empty private logical address of the first SSD 3-1 (for example, in FIG. 36, a private logical address ****0060h of the first SSD 3-1).

Then, the address control module 123 sets, in the field of a combination of drive identification information and a private logical address in the selected entry, the corresponding private logical address of the second SSD 3-2. For example, in a case where first SSD:**0060h is set in the field of a combination of drive identification information and a private logical address of the selected entry, the address control module 123 overwrites the field with second SSD: **0060h.

By performing the above operation with respect to each entry including an empty private logical address of the first SSD 3-1 in the logical address conversion table 23, the address control module 123 can associate all public logical addresses in the logical address conversion table 23 with any of private logical addresses of the second SSD 3-2. Thus, the data migration including migration of valid data and update of the logical address conversion table 23 can be completed.

Figure 37:
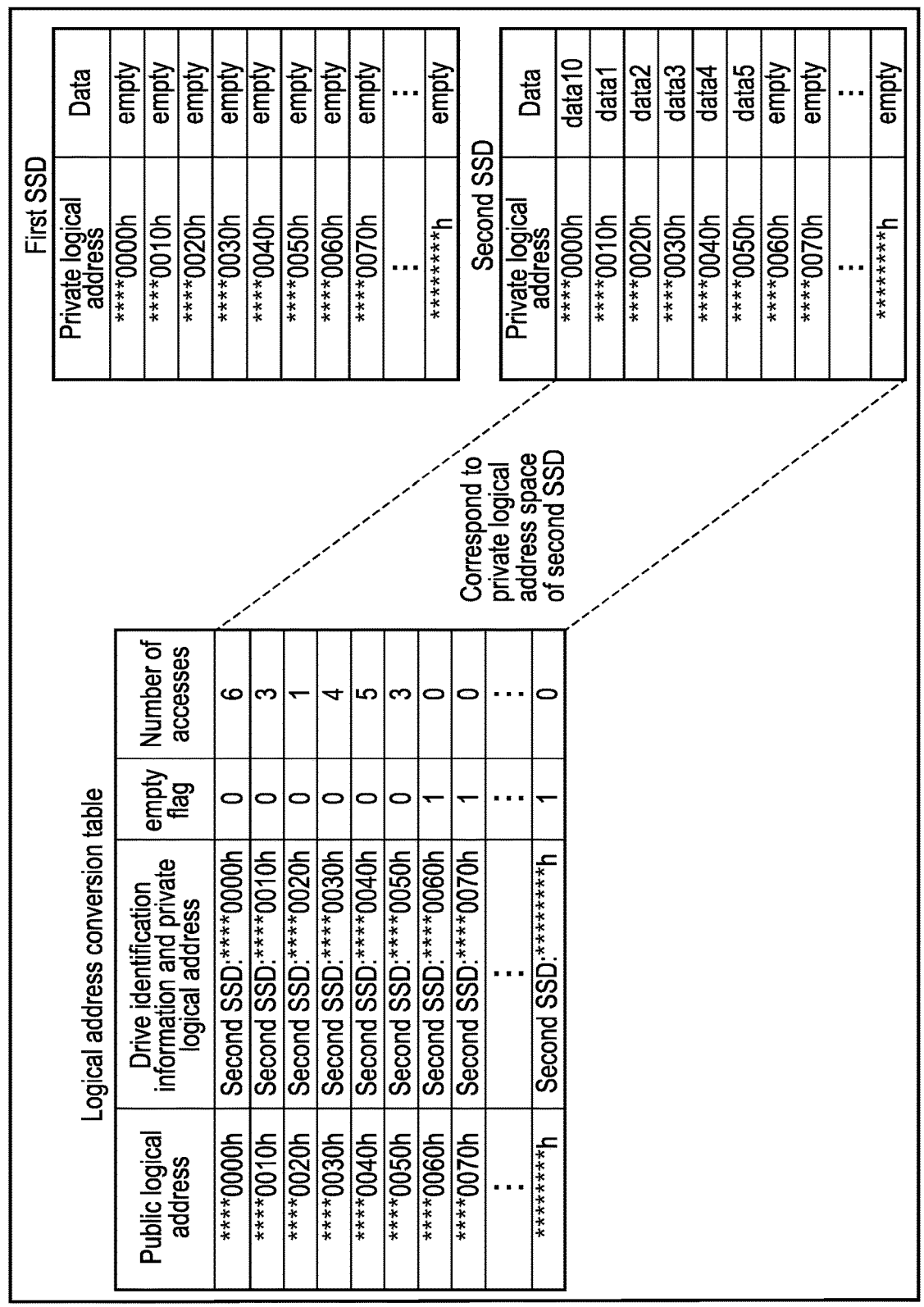
FIG. 37 is a diagram illustrating an example of a relationship of logical addresses after data migration in the memory system and another memory system according to the second embodiment.

FIG. 37 illustrates an example of a correspondence between public logical addresses and private logical addresses after the data migration. In the logical address conversion table 23 of FIG. 37, all public logical addresses are associated with any of private logical addresses of the second SSD 3-2. That is, the public logical address space recognized by the host 2 corresponds to the private logical address space of the second SSD 3-2.

Furthermore, in the first SSD 3-1, data is not stored in any private logical address. In the second SSD 3-2, data is stored in several private logical addresses.

Thus, the address control module 123 and the read control module 122 migrate all valid data from the first SSD 3-1 to the second SSD 3-2, and change the logical address conversion table 23 such that each public logical address corresponds to any of private logical addresses of the second SSD 3-2. In that case, actual write and read operations of data, which are performed in accordance with accesses to the first SSD 3-1 from the host 2, are all performed in the second SSD 3-2. In that case, the destination of access by the host 2 can be transitioned from the worn first SSD 3-1 to the blank second SSD 3-2 without changing the public logical addresses recognized by the host 2 at all.

Figure 38:
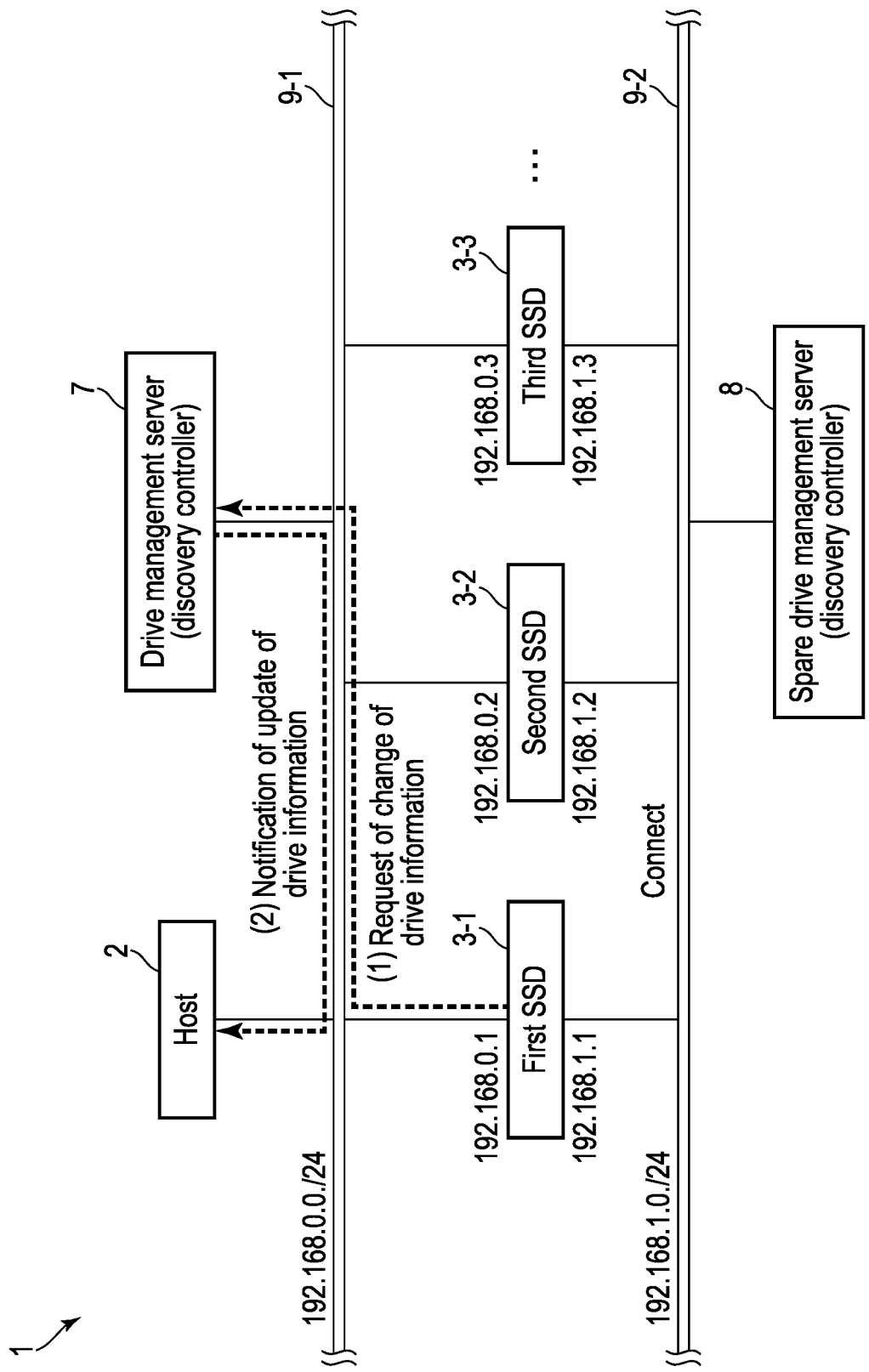
FIG. 38 is a diagram illustrating an example of an operation after the data migration in an information processing system including the memory system of the second embodiment.

FIGS. 38 and 39 illustrate an example of an operation to change a destination of accesses by the host 2 from the first SSD 3-1 to the second SSD 3-2.

As illustrated in FIG. 38, when all public logical addresses in the logical address conversion table 23 are associated with any of private logical addresses of the second SSD 3-2, the connection control module 120 of the first SSD 3-1 sets the identification information (e.g., subnqn) of the first SSD 3-1 as the identification information of the second SSD 3-2. Then, the connection control module 120 requests the drive management server 7 to provide not the drive information of the first SSD 3-1 but the drive information of the second SSD 3-2 in the discovery service by the drive management server 7.

In accordance with the request, the drive management server 7 provides the nodes on the first network 9-1 with the drive information of the second SSD 3-2 instead of the drive information of the first SSD 3-1. The drive management server 7 transmits information indicative of an asynchronous event to the nodes on the first network 9-1 in accordance with the update of the drive information.

The host 2 can detect, when monitoring information indicative of an asynchronous event transmitted through the first network 9-1, the update of the drive information and acquire the updated drive information from the drive management server 7.

As illustrated in FIG. 39, the host 2 disconnects the connection with the first SSD 3-1 and establishes a connection with the second SSD 3-2 at any timing by using the updated drive information, that is, using the drive information of the second SSD 3-2. Thus, accesses to the first SSD 3-1 by the host 2 is stopped, and the first SSD 3-1 can be replaced with another SSD 3, for example.

With the above configuration, the data migration from the worn first SSD 3-1 to the blank second SSD 3-2 can be achieved without changing the public logical addresses recognized by the host 2 at all. For example, if a condition to start the data migration is predetermined in the first SSD 3-1, transition from the worn first SSD 3-1 to the blank second SSD 3-2 can be automatically performed.

Note that the controller 4 of the first SSD 3-1 is operable in either a first mode to increase the physical storage capacity that can be used by the host 2 as described in the first embodiment or a second mode to perform the data migration as described in the second embodiment. In the first mode, for example, the number of public logical addresses each specifying a location in a public logical address space is equal to the sum of the number of private logical addresses each specifying a location in a private logical address space corresponding to the first SSD 3-1 (the number of first private logical addresses) and the number of private logical addresses each specifying a location in a private logical address space corresponding to at least one SSD 3 connected to the first SSD 3-1 (the number of second private logical addresses). In contrast, in the second mode, the number of first private logical addresses is equal to the number of second private logical addresses.

The controller 4 may operate in the first mode when a specific operation (hereinafter may be referred to as first operation) by a user is performed, or when a condition to increase the physical storage capacity that can be used by the host 2 (for example, the aforementioned first condition) is satisfied. The first operation is, for example, an operation in which a user selects the first mode on the host 2. The controller 4 operates in the first mode when information indicative of the first operation is received from the host 2 via the first network I/F 11-1. Alternatively, the controller 4 may operate in the first mode when the first condition explained in the first embodiment is satisfied.

Furthermore, the controller 4 operates in the second mode when another specific operation by a user (hereinafter may be referred to as second operation) is performed, or when a condition to start data migration (for example, the aforementioned second condition) is satisfied. The second operation is, for example, an operation in which a user selects the second mode on the host 2. The controller 4 operates in the second mode when information indicative of the second operation is received from the host 2 via the first network I/F 11-1. Alternatively, the controller 4 may operate in the second mode when the second condition explained in the second embodiment is satisfied.

Figure 40:
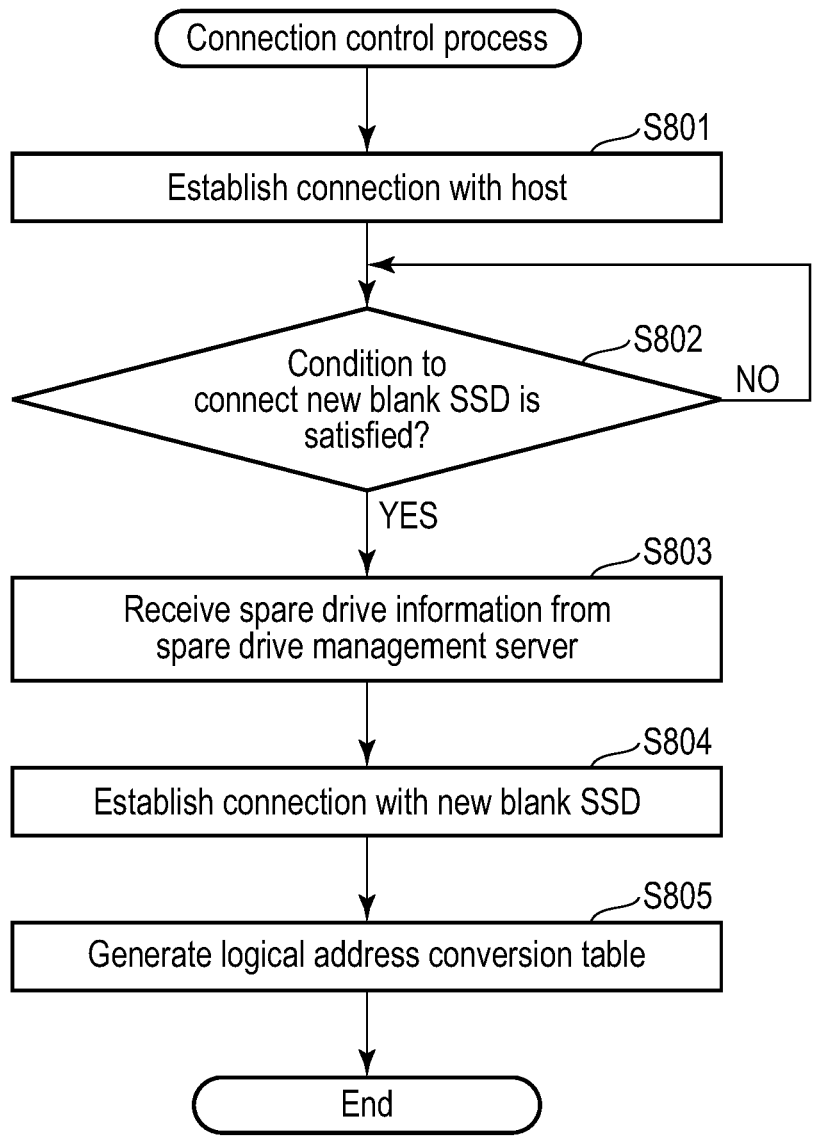
FIG. 40 is a flowchart illustrating an example of a procedure of a connection control process executed in the memory system of the second embodiment.

FIG. 40 is a flowchart illustrating an example of a procedure of a connection control process executed by the CPU 12 of the first SSD 3-1. The CPU 12 starts execution of the connection control process in accordance with, for example, a connection request by the host 2. The procedure of S801 to S805 of the connection control process of FIG. 40 are basically the same as the procedure of S101 to S105 of the connection control process of FIG. 25. The connection control process of FIG. 40 and the connection control process of FIG. 25 differ in a condition to connect a new blank SSD 3 used in S802 and S102, and the configuration of the logical address conversion table 23 generated in S805 and S105.

Specifically, in S102 of the connection control process of FIG. 25, a condition to increase the physical storage capacity that can be used by the host (first condition) is used while, in S802 of the connection control process of FIG. 40, a condition to start data migration from the first SSD 3-1 to another SSD 3 (second condition) is used. Furthermore, in S105 of the connection control process of FIG. 25, the logical address conversion table 23 corresponding to the public logical address space over the first SSD 3-1 and a new blank SSD 3 is generated while, in S805 of the connection control process of FIG. 40 the logical address conversion table 23 corresponding to the public logical address space of the first SSD 3-1. The public logical address space of the first SSD 3-1 corresponds to the private logical address space of the first SSD 3-1. That is, public logical addresses in the public logical address space correspond to private logical addresses in the private logical address space of the first SSD 3-1, respectively. The logical address conversion table 23 includes entries corresponding to the public logical addresses, respectively.

Through the above connection control process, the CPU 12 can establish the connection between the first SSD 3-1 and a new blank SSD 3 in accordance with the degree of wear-out of the NAND memory 5 of the first SSD 3-1. The CPU 12 generates the logical address conversion table 23 when the connection with the blank SSD 3 is newly established.

Figure 41:
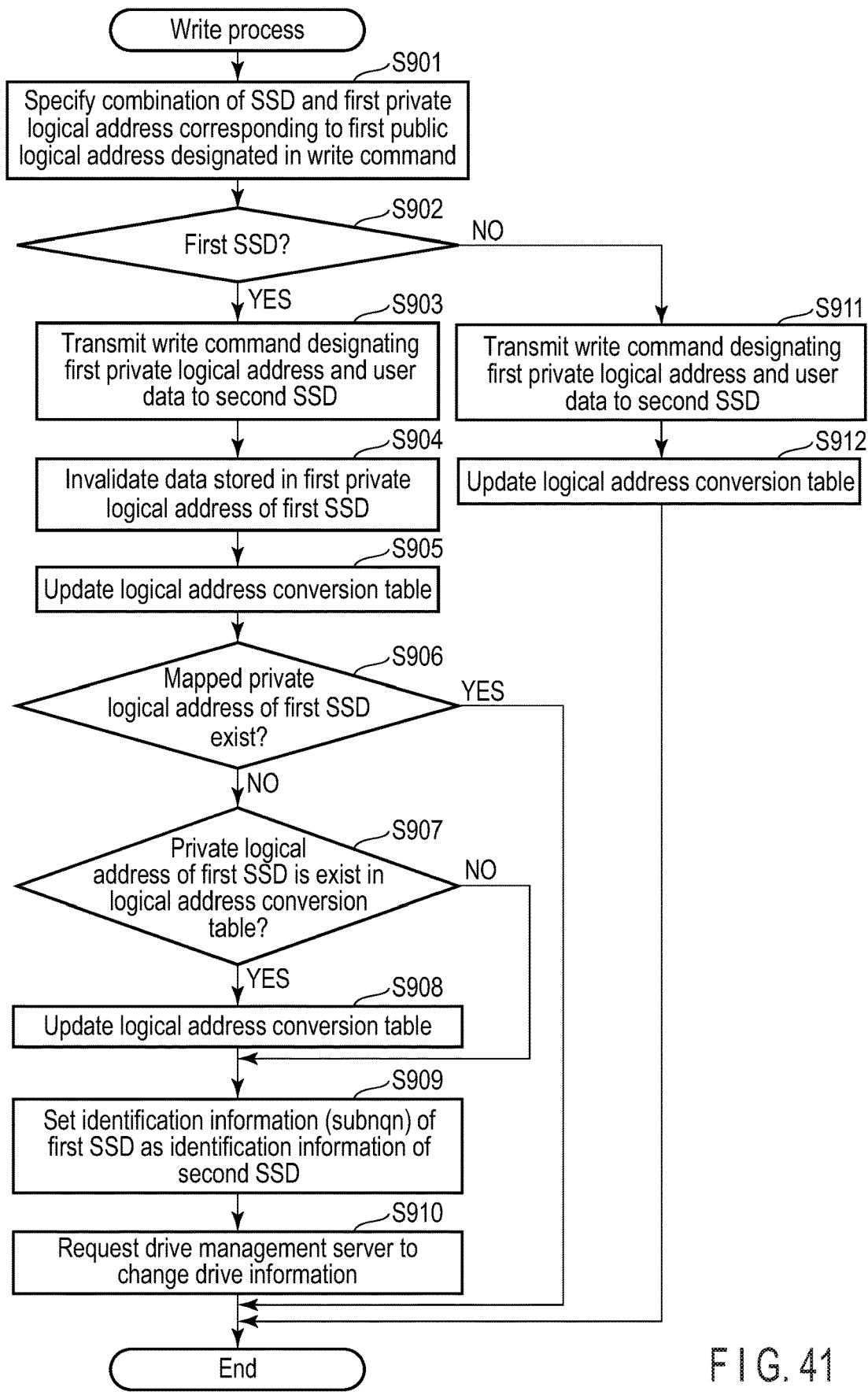
FIG. 41 is a flowchart illustrating an example of a procedure of a write process executed in the memory system of the second embodiment.

FIG. 41 is a flowchart illustrating an example of a procedure of a write process executed by the CPU 12 of the first SSD 3-1. The CPU 12 starts the write process in accordance with a write command from the host 2 via the first network I/F 11-1. Here, it is assumed that the CPU 12 has already established a connection between the first SSD 3-1 and the second SSD 3-2 via the second network I/F 11-2.

The CPU 12 specifies a combination of an SSD 3 and a private logical address (hereinafter referred to as first private logical address) corresponding to a public logical address designated in the received write command (hereinafter referred to as first public logical address) by using the logical address conversion table 23 (S901). The CPU 12 determines whether the specified SSD 3 is the first SSD 3-1 (S902).

When the specified SSD 3 is the first SSD 3-1 (YES in S902), the CPU 12 transmits a write command, which designates the first private logical address, and user data, which is received with the write command from the host 2, to the second SSD 3-2 (S903). The CPU 12 invalidates data stored in the first private logical address of the first SSD 3-1 (S904). Specifically, the CPU 12 updates the logical-to-physical address conversion table 22 such that any physical address is not associated with the first private logical address. Then, the CPU 12 updates the logical address conversion table 23 such that the first public logical address is associated with the first private logical address of the second SSD 3-2 and the number of accesses of the first public logical address increases by one (S905).

Then, the CPU 12 determines whether there is a mapped private logical address of the first SSD 3-1 by using the logical address conversion table 23 (S906). The mapped private logical address is a private logical address associated with data (i.e., physical address). When the logical address conversion table 23 includes an entry including a private logical address of the first SSD 3-1 and including the empty flag field in which 0 is set, the CPU 12 determines that there is a mapped private logical address in the first SSD 3-1. On the other hand, when 1 is set in the empty flag field in all entries each including a private logical address of the first SSD 3-1 in the logical address conversion table 23, the CPU 12 determines that there is not a mapped private logical address in the first SSD 3-1.

When there is a mapped private logical address of the first SSD 3-1 (YES in S906), the CPU 12 ends the write process.

When there is not a mapped private logical address of the first SSD 3-1 (NO in S906), the CPU 12 determines whether there is an entry including a private logical address of the first SSD 3-1 in the logical address conversion table 23 (S907). When there is an entry including a private logical address of the first SSD 3-1 (YES in S907), the CPU 12 updates the logical address conversion table 23 to replace the private logical address of the first SSD 3-1 with the corresponding private logical address of the second SSD 3-2 (S908) and proceeds to S909. Here, since the private logical address of the first SSD 3-1 is an empty private logical address, the CPU 12 does not need to perform a process to migrate user data from the first SSD 3-1 to the second SSD 3-2. That is, in S908, the CPU 12 rewrites, for the data migration, the private logical address, which is associated with the public logical address in the entry, by replacing the empty private logical address of the first SSD 3-1 with the corresponding (empty) private logical address of the second SSD 3-2. Note that, when there are multiple entries each including a private logical address of the first SSD 3-1 in the logical address conversion table 23, the CPU 12 replaces, in each of the entries, the private logical address of the first SSD 3-1 with the corresponding private logical address of the second SSD 3-2.

When there is not an entry including a private logical address in the first SSD 3-1 (NO in S907), the CPU 12 proceeds to S909.

Through the procedure of S901 to S908, the CPU 12 has completed migration of user data and update of the logical address conversion table 23 for the data migration. Thus, the CPU 12 sets the identification information (for example, subnqn) of the first SSD 3-1 as the identification information of the second SSD 3-2 (S909). The CPU 12 may transmit the identification information of the first SSD 3-1 to the second SSD 3-2 to set the identification information to the second SSD 3-2. Then, the CPU 12 requests the drive management server 7 to notify the nodes (for example, host 2) on the first network 9-1 of the drive information indicative of the second SSD 3-2 instead of the drive information indicative of the first SSD 3-1 (S910), and ends the write process. In accordance with the request, the drive management server 7 provides the drive information indicative of the second SSD 3-2 for the nodes (for example, host 2) on the first network 9-1. Note that the drive management server 7 may notify the node of the update of the drive information. Thus, on the basis of the new drive information, the host 2 may disconnect the connection with the first SSD 3-1 and establish a connection with the second SSD 3-2.

On the other hand, when the SSD 3 corresponding to the first public logical address designated in the received write command is not the first SSD 3-1 (NO in S902), that is, when the SSD 3 corresponding to the first public logical address is the second SSD 3-2, the CPU 12 transmits a write command, which designates the first private logical address, and the user data, which is received with the write command from the host 2, to the second SSD 3-2 (S911). Then, the CPU 12 updates the logical address conversion table 23 to increase the number of accesses of the first public logical address by one (S912), and ends the write process.

Through the above write process, when the first public logical address designated in the write command corresponds to the first private logical address of the first SSD 3-1, the user data can be written to the first private logical address of the second SSD 3-2 instead of the first private logical address of the first SSD 3-1. The CPU 12 updates the logical address conversion table 23 such that the first public logical address is associated with the first private logical address of the second SSD 3-2 to which the user data is written.

As described above, the CPU 12 writes the user data, which is to be written to the first SSD 3-1 in accordance with the write command, to the NAND memory 5 of the second SSD 3-2 instead of the NAND memory 5 of the first SSD 3-1 to migrate the user data from the first SSD 3-1 to the second SSD 3-2. That is, in the operation corresponding to the write command, the CPU 12 can perform the data migration from the first SSD 3-1 to the second SSD 3-2.

Furthermore, when the data migration is completed, the CPU 12 can change the drive information provided by the drive management server 7 such that the host 2 can access to the second SSD 3-2 instead of the first SSD 3-1.

FIG. 42 is a flowchart illustrating an example of a procedure of a migration process executed by the CPU 12 of the first SSD 3-1. The migration process is a process to migrate user data stored in the NAND memory 5 of the first SSD 3-1 to the NAND memory 5 of the second SSD 3-2. The CPU 12 executes the migration process when, for example, the first SSD 3-1 is in an idle state. Here, it is assumed that the CPU 12 has already established a connection between the first SSD 3-1 and the second SSD 3-2 via the second network I/F 11-2.

The CPU 12 selects a mapped private logical address of the first SSD 3-1 (hereinafter referred to as first private logical address) (S1001). Specifically, the CPU 12 selects, from one or more entries in the logical address conversion table 23 each including the private logical address of the first SSD 3-1, one of entries each including the empty flag field in which 0 is set. The private logical address in the selected entry is a mapped private logical address of the first SSD 3-1. Note that, in the logical address conversion table 23, the first private logical address is associated with a second public logical address.

The CPU 12 reads user data from the first private logical address (S1002). Specifically, the CPU 12 uses the logical-to-physical address conversion table 22 to specify the physical address in the NAND memory 5 corresponding to the first private logical address. Then, the CPU 12 reads the user data from the physical address.

Then, the CPU 12 transmits a write command designating the first private logical address and the read user data to the second SSD 3-2 (S1003). Thus, the user data is written to the first private logical address in the second SSD 3-2.

The CPU 12 invalidates the user data stored in the first private logical address of the first SSD 3-1 (S1004). That is, the CPU 12 updates the logical-to-physical address conversion table 22 such that any physical address is not associated with the first private logical address. Then, the CPU 12 updates the logical address conversion table 23 such that the first public logical address is associated with the first private logical address of the second SSD 3-2 (S1005).

Then, the CPU 12 determines whether there is another mapped private logical address of the first SSD 3-1 (S1006). When there is another mapped private logical address of the first SSD 3-1 (YES in S1006), the CPU 12 returns to S1001 to perform a process to migrate user data stored in the other mapped private logical address to the second SSD 3-2.

When there is not another mapped private logical address of the first SSD 3-1 (NO in S1006), the CPU 12 executes the procedure of S1007 to S1010. The procedure of S1007 to S1010 are the same as the aforementioned procedure of S907 to S910 explained with reference to the flowchart of FIG. 41.

Through the above migration process, the CPU 12 can perform the data migration from the first SSD 3-1 to the second SSD 3-2. When the data migration is completed, the CPU 12 can change the drive information provided by the drive management server 7 such that the host 2 accesses to the second SSD 3-2 instead of the first SSD 3-1.

As explained above, according to the first and second embodiments, accesses to multiple memory systems (for example, multiple SSDs 3) on the networks 9-1 and 9-2 by the host 2 can be facilitated.

The address control module 123 manages the logical address conversion table 23 including information indicative of a correspondence between private logical addresses and public logical addresses. The private logical addresses include first private logical addresses and second private logical addresses. Each of the first private logical addresses is a logical address to specify a location in a first logical address space that has a size corresponding to the capacity of the NAND memory 5 in the first SSD 3-1. Each of the second private logical addresses is a logical address to specify a location in the second logical address space that has a size corresponding to the capacity of the NAND memory 5 in the second SSD 3-2. Each of the public logical addresses is a logical address to specify a location in a third logical address space that has a size corresponding to the sum of the capacity of the NAND memory 5 in the first SSD 3-1 and the capacity of the NAND memory 5 in the second SSD 3-2. The address control module 123 receives, from the host 2, a first write request (for example, write command) or a first read request (for example, read command) designating a first public logical address. The address control module 123 specifies a third private logical address corresponding to the first public logical address. The write control module 121 and the read control module 122 perform, when the third private logical address is included in the first private logical addresses, a write process or a read process with respect to the third private logical address. The address control module 123 transmits, in a case where the third private logical address is included in the second private logical addresses, a second write request or a second read request designating the third private logical address to the second SSD 3-2.

With the above configuration, the host 2 can access the NAND memory 5 of the first SSD 3-1 and the NAND memory 5 of the second SSD 3-2 by using the public logical addresses. That is, the host 2 can access to the multiple SSDs 3-1 and 3-2 without consideration of whether a public logical address corresponds to a storage area in the first SSD 3-1 or a storage are in the second SSD 3-2. Thus, accesses to the SSDs 3-1 and 3-2 on the networks 9-1 and 9-2 by the host 2 can be facilitated.

Various functions of the first and second embodiments may be realized by a circuit (processing circuit). Examples of the processing circuit include a programmed processor such as a central processing unit (CPU). The processor executes each of the recited functions by executing a computer program (instructions) stored in a memory. The processor may be a microprocessor including an electrical circuit. The examples of the processing circuit also include a digital signal processor (DSP), an application specific integrated circuit (ASIC), a micro controller, an FPGA, and other electric circuit components. Each of other components than the CPU described in the embodiments may be realized as a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first nonvolatile memory; and
a controller configured to control the first nonvolatile memory and is capable of communicating with a host and a second memory system via a network, wherein the second memory system includes a second nonvolatile memory, wherein
the controller is configured to:
manage information indicative of correspondences between private logical addresses and public logical addresses, the private logical addresses including first private logical addresses and second private logical addresses, each of the first private logical addresses specifying a location in a first logical address space corresponding to the first nonvolatile memory, each of the second private logical addresses specifying a location in a second logical address space corresponding to the second nonvolatile memory, each of the public logical addresses specifying a location in a third logical address space over the first nonvolatile memory and the second nonvolatile memory;
receive a first write request designating a first public logical address or a first read request designating the first public logical address from the host;
specify a third private logical address corresponding to the first public logical address;
perform, responsive to determining the third private logical address is included in the first private logical addresses, a write process with respect to the third private logical address or a read process with respect to the third private logical address; and
transmit, responsive to determining the third private logical address is included in the second private logical addresses, a second write request designating the third private logical address or a second read request designating the third private logical address to the second memory system.

2. The memory system according to claim 1, wherein the controller comprises:
a first interface for communicating with the host via a first network, and
a second interface for communicating with the second memory system via a second network.

3. The memory system according to claim 1, wherein the information includes:
a correspondence between a second public logical address among the public logical addresses and a fourth private logical address among the first private logical addresses; and
a correspondence between a third public logical address among the public logical addresses and a fifth private logical address among the second private logical addresses, and
the controller is further configured to:
migrate data stored in the fourth private logical address to the fifth private logical address; and
update the information such that the second public logical address is associated with the fifth private logical address.

4. The memory system according to claim 3, wherein the controller is further configured to update the information such that the third public logical address is associated with the fourth private logical address.

5. The memory system according to claim 1, wherein the information includes a correspondence between a fourth public logical address among the public logical addresses and a sixth private logical address among the second private logical addresses, data being not stored in the sixth private logical address, and
the controller is further configured to:
specify a fifth public logical address from the public logical addresses, the fifth public logical address having an access frequency that is below a first threshold value and being associated with a seventh private logical address among the first private logical addresses;
migrate data stored in the seventh private logical address to the sixth private logical address; and
update the information such that the fourth public logical address is associated with the seventh private logical address and the fifth public logical address is associated with the sixth private logical address.

6. The memory system according to claim 1, wherein the controller is further configured to perform, in a case where access frequencies of public logical addresses that correspond to the second private logical addresses, respectively, are all below a second threshold value, deleting the second private logical addresses from the information and disconnecting a connection with the second memory system.

7. The memory system according to claim 1, wherein the information includes:
   a correspondence between a sixth public logical address among the public logical addresses and an eighth private logical address among the first private logical addresses; and
   a correspondence between a seventh public logical address among the public logical addresses and a ninth private logical address among the second private logical addresses, and
the controller is further configured to:
   migrate data stored in the ninth private logical address to the eighth private logical address; and
   update the information such that the sixth public logical address is associated with the ninth private logical address and the seventh public logical address is associated with the eighth private logical address.

8. The memory system according to claim 1, wherein the information includes a correspondence between an eighth public logical address among the public logical addresses and a tenth private logical address among the first private logical addresses, data being not stored in the tenth private logical address, and
the controller is further configured to:
   specify a ninth public logical address from the public logical addresses, the ninth public logical address having an access frequency exceeding a third threshold value and being associated with an eleventh private logical address among the second private logical addresses;
   migrate data stored in the eleventh private logical address to the tenth private logical address; and
   update the information such that the eighth public logical address is associated with the eleventh private logical address and the ninth public logical address is associated with the tenth private logical address.

9. The memory system according to claim 1, wherein the information includes a correspondence between a tenth public logical address among the public logical addresses and a twelfth private logical address among the first private logical addresses, data being not stored in the twelfth private logical address, and
the controller is further configured to:
   receive the first write request designating the first public logical address from the host; and
   perform, in a case where the third private logical address corresponding to the first public logical address is included in the second private logical addresses, writing first data which is received in accordance with the first write request, to the twelfth private logical address, and updating the information such that the tenth public logical address is associated with the third private logical address and the first public logical address is associated with the twelfth private logical address.

10. The memory system according to claim 1, wherein the information includes a correspondence between an eleventh public logical address among the public logical addresses and a thirteenth private logical address among the first private logical addresses, data being not stored in the thirteenth private logical address, and
the controller is further configured to:
   receive the first read request designating the first public logical address from the host; and
   perform, in a case where the third private logical address corresponding to the first public logical address is included in the second private logical addresses, transmitting the second read request designating the third private logical address to the second memory system, receiving second data which is read in accordance with the second read request from the second memory system, transmitting the second data to the host, writing the second data to the thirteenth private logical address, and updating the information such that the eleventh public logical address is associate with the third private logical address and the first public logical address is associated with the thirteenth private logical address.

11. The memory system according to claim 1, wherein the controller is operable in a first mode in which a number of the public logical addresses is equal to a sum of a number of the first private logical addresses and a number of the second private logical addresses, or in a second mode in which the number of the public logical addresses is equal to the number of the first private logical addresses, and
the controller is further configured to:
   operate in the first mode in a case where a first operation is performed by a user or a first condition is satisfied; and
   operate in the second mode in a case where a second operation is performed by the user or a second condition is satisfied.

12. The memory system according to claim 1, wherein the controller is further configured to:
   receive information indicative of the second memory system from a first server; and
   establish a connection with the second memory system using the information received from the first server.

13. A control method of a memory system that is capable of connecting with a host and a second memory system via a network, the memory system including a first nonvolatile memory and the second memory system including a second nonvolatile memory, the method comprising:
   managing information indicative of correspondences between private logical addresses and public logical addresses, the private logical addresses including first private logical addresses and second private logical addresses, each of the first private logical addresses specifying a location in a first logical address space corresponding to the first nonvolatile memory, each of the second private logical addresses specifying a location in a second logical address space corresponding to the second nonvolatile memory, each of the public logical addresses specifying a location in a third logical address space over the first nonvolatile memory and the second nonvolatile memory;
   receiving a first write request designating a first public logical address or a first read request designating the first public logical address from the host;
   specifying a third private logical address corresponding to the first public logical address;

performing, responsive to determining the third private logical address is included in the first private logical addresses, a write process with respect to the third private logical address or a read process with respect to the third private logical address; and transmitting, responsive to determining the third private logical address is included in the second private logical addresses, a second write request designating the third private logical address or a second read request designating the third private logical address to the second memory system.

14. The control method according to claim 13, wherein the information includes:
    a correspondence between a second public logical address among the public logical addresses and a fourth private logical address among the first private logical addresses; and
    a correspondence between a third public logical address among the public logical addresses and a fifth private logical address among the second private logical addresses, and wherein
    the method further comprises:
        migrating data stored in the fourth private logical address to the fifth private logical address; and
        updating the information such that the second public logical address is associated with the fifth private logical address.

15. The control method according to claim 13, wherein the information includes a correspondence between a fourth public logical address among the public logical addresses and a sixth private logical address among the second private logical addresses, data being not stored in the sixth private logical address, and wherein
    the method further comprises:
        specifying a fifth public logical address from the public logical addresses, the fifth public logical address having an access frequency that is below a first threshold value and being associated with a seventh private logical address among the first private logical addresses;
        migrating data stored in the seventh private logical address to the sixth private logical address; and
        updating the information such that the fourth public logical address is associated with the seventh private logical address and the fifth public logical address is associated with the sixth private logical address.

16. The control method according to claim 13 further comprising performing, in a case where access frequencies of public logical addresses that correspond to the second private logical addresses, respectively, are all below a second threshold value, deleting the second private logical addresses from the information and disconnecting the second memory system.

17. An information processing system including a host, a first memory system, and a second memory system that are mutually connectable via a network,
    the first memory system comprising a first nonvolatile memory, and
    the second memory system comprising a second nonvolatile memory, wherein the first memory system is configured to:
        manage information indicative of correspondences between private logical addresses and public logical addresses, the private logical addresses including first private logical addresses and second private logical addresses, the first private logical addresses specifying a location in a first logical address space corresponding to the first nonvolatile memory, the second private logical addresses specifying a location in a second logical address space corresponding to the second nonvolatile memory; the public logical addresses specifying a location in a third logical address space over the first nonvolatile memory and the second nonvolatile memory;
        receive a first write request designating a first public logical address or a first read request designating the first public logical address from the host;
        specify a third private logical address corresponding to the first public logical address;
        perform, responsive to determining the third private logical address is included in the first private logical addresses, a write process with respect to the third private logical address or a read process with respect to the third private logical address; and
        transmit, responsive to determining the third private logical address is included in the second private logical addresses, a second write request designating the third private logical address or a second read request designating the third private logical address to the second memory system.

18. The information processing system according to claim 17, wherein
    the information includes:
        a correspondence between a second public logical address among the public logical addresses and a fourth private logical address among the first private logical addresses; and
        a correspondence between a third public logical address among the public logical addresses and a fifth private logical address among the second private logical addresses, and
    the first memory system is further configured to:
        migrate data stored in the fourth private logical address to the fifth private logical address; and
        update the information such that the second public logical address is associated with the fifth private logical address.

19. The information processing system according to claim 17, wherein
    the information includes a correspondence between a fourth public logical address among the public logical addresses and a sixth private logical address among the second private logical addresses, data being not stored in the sixth private logical address, and
    the first memory system is further configured to:
        specify a fifth public logical address from the public logical addresses, the fifth public logical address having an access frequency that is below a first threshold value and being associated with a seventh private logical address among the first private logical addresses;
        migrate data stored in the seventh private logical address to the sixth private logical address; and
        update the information such that the fourth public logical address is associated with the seventh private logical address and the fifth public logical address is associated with the sixth private logical address.

20. The information processing system according to claim 17, wherein
    the first memory system is further configured to perform, in a case where access frequencies of public logical addresses that correspond to the second private logical addresses, respectively, are all below a second threshold value, deleting the second private logical addresses from the information and disconnecting the second memory system.

\* \* \* \* \*